US012574315B2

(12) United States Patent
An

(10) Patent No.: US 12,574,315 B2
(45) Date of Patent: Mar. 10, 2026

(54) NETWORK PATH PERFORMANCE MEASUREMENTS BY UTILIZING MULTI-LAYER TUNNELING TECHNIQUES

(71) Applicant: Oracle International Corporation, Redwood Shores, CA (US)

(72) Inventor: Yafan An, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/296,201

(22) Filed: Apr. 5, 2023

(65) Prior Publication Data

US 2024/0340234 A1     Oct. 10, 2024

(51) Int. Cl.
H04L 45/12     (2022.01)
H04L 45/00     (2022.01)
H04L 45/74     (2022.01)

(52) U.S. Cl.
CPC .......... H04L 45/123 (2013.01); H04L 45/566 (2013.01); H04L 45/74 (2013.01)

(58) Field of Classification Search
CPC ..... H04L 45/123; H04L 45/566; H04L 45/74; H04L 43/0852; H04L 43/106
See application file for complete search history.

(56) References Cited

U.S. PATENT DOCUMENTS 7,937,438 B1 *  5/2011  Miller ..................... H04L 45/00
                                                    709/200
7,940,685 B1    5/2011  Breslau et al.

8,155,026 B2    4/2012  Campbell et al.
8,638,778 B2    1/2014  Lee et al.
9,787,559 B1   10/2017  Schroeder
10,044,581 B1 *  8/2018  Russell ................... H04L 43/20
10,270,674 B2    4/2019  Bristow (Continued)

FOREIGN PATENT DOCUMENTS

CN         111837368 B      1/2022

OTHER PUBLICATIONS

"Monitoring, Sampling, and Collection Services Interfaces User Guide", Juniper Networks, Engineering Simplicity, Sep. 29, 2022, pp. 743-745.

(Continued)

*Primary Examiner* — Michael Won
(74) *Attorney, Agent, or Firm* — Kilpatrick Townsend & Stockton LLP

(57)         ABSTRACT

Techniques for making network path performance measurements by utilizing multi-layer tunneling are described. In a distributed environment that includes one or more nodes configured to inject network traffic (compute nodes) and one or more nodes that are not configured to inject network traffic (router nodes), techniques are disclosed that allow for the measurement of performance metrics across network segments that include at least one router node. In certain implementations, with one or more router nodes configured with a tunnel termination endpoint and/or a locally-relevant label-to-port mapping, performance metrics between router nodes or between router nodes and compute nodes can be measured. Performance metrics that may be measured using the techniques disclosed herein include network latency, packet loss, and jitter. In addition, the techniques may be used for fault isolation.

20 Claims, 30 Drawing Sheets

(56) References Cited

U.S. PATENT DOCUMENTS

| | | | | |
|---|---|---|---|---|
| 11,652,739 B2* | 5/2023 | Timmons | ............... | H04L 45/24 |
| | | | | 709/238 |
| 11,658,902 B2* | 5/2023 | Baj | ...................... | H04L 63/166 |
| | | | | 709/238 |
| 11,924,095 B1* | 3/2024 | Twitchell, Jr. | .......... | H04L 45/24 |
| 12,244,483 B1* | 3/2025 | Pena Villanueva | ... | H04L 45/745 |
| 2002/0110119 A1* | 8/2002 | Fredette | ............ | H04Q 11/0478 |
| | | | | 370/466 |
| 2002/0120865 A1* | 8/2002 | Schwab | ................. | H04L 69/08 |
| | | | | 726/11 |
| 2002/0147826 A1* | 10/2002 | Sultan | ................. | H04L 69/163 |
| | | | | 709/230 |
| 2002/0161755 A1* | 10/2002 | Moriarty | ............ | H04L 63/1441 |
| 2002/0191572 A1* | 12/2002 | Weinstein | .......... | H04L 63/0892 |
| | | | | 370/349 |
| 2003/0039212 A1* | 2/2003 | Lloyd | ................ | H04L 41/0823 |
| | | | | 370/252 |
| 2003/0110286 A1* | 6/2003 | Antal | ................. | H04L 47/2408 |
| | | | | 709/236 |
| 2004/0190517 A1* | 9/2004 | Gupta | ...................... | H04L 45/50 |
| | | | | 370/254 |
| 2005/0165983 A1* | 7/2005 | Nam | ....................... | H04L 65/80 |
| | | | | 710/52 |
| 2006/0215577 A1* | 9/2006 | Guichard | ............... | H04L 45/50 |
| | | | | 370/254 |
| 2006/0230134 A1* | 10/2006 | Qian | .................... | H04L 67/306 |
| | | | | 709/224 |
| 2007/0208814 A1* | 9/2007 | Czotscher | .............. | H04L 69/18 |
| | | | | 709/206 |
| 2010/0322249 A1* | 12/2010 | Thathapudi | .......... | H04L 47/431 |
| | | | | 370/395.1 |
| 2011/0264822 A1* | 10/2011 | Ferguson | ........... | H04L 63/0227 |
| | | | | 709/235 |
| 2012/0063332 A1 | 3/2012 | Hanes et al. | | |
| 2012/0300781 A1* | 11/2012 | Sarela | ..................... | H04L 45/10 |
| | | | | 370/392 |
| 2013/0275589 A1* | 10/2013 | Karthikeyan | ......... | H04L 47/125 |
| | | | | 709/224 |
| 2014/0310377 A1 | 10/2014 | Matsuoka | | |
| 2015/0281028 A1* | 10/2015 | Akhter | ................ | H04L 43/0858 |
| | | | | 370/252 |
| 2016/0330111 A1* | 11/2016 | Manghirmalani | ...... | H04L 69/22 |
| 2017/0063705 A1* | 3/2017 | Gilson | .................. | H04L 47/286 |
| 2017/0064717 A1 | 3/2017 | Filsfils et al. | | |
| 2017/0171084 A1* | 6/2017 | Hao | ......................... | H04L 45/50 |
| 2017/0187581 A1* | 6/2017 | Hughes | ................ | H04L 43/087 |
| 2018/0063743 A1* | 3/2018 | Tumuluru | ............. | G06F 9/5077 |
| 2018/0097722 A1* | 4/2018 | Callard | ............... | H04L 12/4641 |
| 2018/0302503 A1* | 10/2018 | Trossell | ................ | H04L 47/365 |
| 2019/0140863 A1* | 5/2019 | Nainar | .................... | H04L 45/34 |
| 2019/0222442 A1* | 7/2019 | Wei | ........................ | H04L 43/026 |
| 2019/0238363 A1* | 8/2019 | Boutros | ............... | H04L 45/306 |
| 2019/0238364 A1* | 8/2019 | Boutros | ............... | H04L 45/745 |
| 2019/0268267 A1* | 8/2019 | Pignataro | .............. | H04L 45/741 |
| 2020/0076724 A1 | 3/2020 | Nainar et al. | | |
| 2020/0099611 A1* | 3/2020 | Filsfils | .................. | H04L 45/302 |
| 2020/0204448 A1* | 6/2020 | Nataraj | ................... | H04L 41/12 |
| 2020/0220746 A1* | 7/2020 | Shribman | ............. | H04W 48/18 |
| 2021/0306257 A1* | 9/2021 | Dutta | .................... | H04L 45/566 |
| 2021/0320856 A1* | 10/2021 | Castaldelli | ............ | H04L 1/0026 |
| 2021/0409323 A1* | 12/2021 | Menon | ................... | H04L 45/74 |
| 2022/0103477 A1* | 3/2022 | Peng | ........................ | H04L 45/34 |
| 2022/0103525 A1* | 3/2022 | Shribman | ............. | G06F 16/955 |
| 2022/0109622 A1* | 4/2022 | Yeh | .......................... | H04L 69/40 |
| 2022/0141126 A1* | 5/2022 | Timmons | .............. | H04L 45/123 |
| | | | | 709/238 |
| 2022/0174011 A1* | 6/2022 | Filsfils | ................ | H04L 43/0852 |
| 2022/0200900 A1* | 6/2022 | Roweth | ................ | H04L 45/745 |
| 2022/0247835 A1* | 8/2022 | Shribman | ........... | H04L 43/0864 |
| 2023/0246957 A1* | 8/2023 | Calciu | .................... | H04L 45/74 |
| | | | | 709/238 |
| 2023/0336450 A1* | 10/2023 | Filsfils | .................... | H04L 45/02 |
| 2024/0113962 A1* | 4/2024 | Filsfils | ................... | H04L 45/20 |
| 2025/0175416 A1* | 5/2025 | Valceanu | ............... | H04L 45/34 |

OTHER PUBLICATIONS

"Segment Routing Configuration Guide for Cisco 8000 Series Routers, IOS XR Release 7.7.x", Cisco, Available online at: https://www.cisco.com/c/en/us/td/docs/iosxr/cisco8000/segment-routing/77x/b-segment-routing-cg-cisco8000-77x/configuring-segment-routing-microloop-avoidance.html, Accessed from Internet on Oct. 13, 2022, 44 pages.

Fraleigh et al., "Packet-Level Traffic Measurements from a Tier-1 IP Backbone", Available online at: https://sites.cs.ucsb.edu/~ebelding/courses/276/f04/papers/Sprint_measurements.pdf, Jul. 2004, 12 pages.

International Application No. PCT/US2023/024652, International Search Report and Written Opinion mailed on Dec. 14, 2023, 13 pages.

Ren et al., SRUF: Low-Latency Path Routing with SRv6 Underlay Federation in Wide Area Network, Institute of Electrical and Electronics Engineers 41st International Conference on Distributed Computing Systems (ICDCS), Jul. 2021, 11 pages.

* cited by examiner

1200

A

RECEIVE THE PACKET BY THE DESTINATION COMPUTE NODE ⁓1220

USING THE DESTINATION COMPUTE NODE, DETERMINE A TIME OF RECEIPT OF THE PACKET AT THE DESTINATION COMPUTER NODE ⁓1222

RECEIVE METRICS DETERMINED FROM OTHER PACKET TRAVERSALS ⁓1224

DETERMINE A METRIC USING THE FIRST TIMESTAMP AND THE TIME OF RECEIPT, AND METRICS DETERMINED FROM OTHER PACKET TRAVERSALS ⁓1226

1900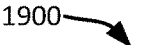

ENABLE A PROBE PACKET TO BE CONFIGURED, INCLUDING ENABLING CONFIGURATION OF A PACKET HEADER FOR THE PACKET TO CAUSE THE PACKET TO TRAVERSE A PATH FROM A SOURCE COMPUTE NODE TO A DESTINATION COMPUTE NODE OVER A PATH THAT INCLUDES MULTIPLE SEGMENTS AND ONE OR MORE ROUTER NODES, AND WHERE THE CONFIGURED PACKET HEADER COMPRISES A HEADER SECTION CORRESPONDING TO EACH OF THE MULTIPLE SEGMENTS, AND WHERE THE HEADER SECTION CORRESPONDING TO A SEGMENT STORES INFORMATION INDICATIVE OF A MANNER IN WHICH THE PACKET IS TO BE ROUTED FOR THAT SEGMENT ~1902

A FIRST TIME IS MEASURED FOR THE PACKET AT THE SOURCE COMPUTE NODE, WHERE THE FIRST TIME IS INDICATIVE OF A TIME WHEN THE PACKET IS COMMUNICATED FROM THE SOURCE COMPUTE NODE ~1904

PACKET IS COMMUNICATED FROM THE SOURCE COMPUTE NODE TO THE DESTINATION COMPUTE NODE AND OVER THE MULTIPLE SEGMENTS BASED UPON INFORMATION INCLUDED IN THE PACKET HEADER ~1906

PACKET IS RECEIVED BY START NODE OF A SEGMENT. ~1908

START NODE FOR THE SEGMENT READS INFORMATION FROM A SECTION OF THE HEADER CORRESPONDING TO THE SEGMENT. ~1910

PACKET IS ROUTED FROM THE START NODE TO THE END NODE OF THE SEGMENT BASED UPON THE INFORMATION READ IN 1910, WHERE THE END NODE CAN BE THE DESTINATION COMPUTE NODE OR A START NODE OF THE NEXT SEGMENT. ~1912

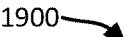

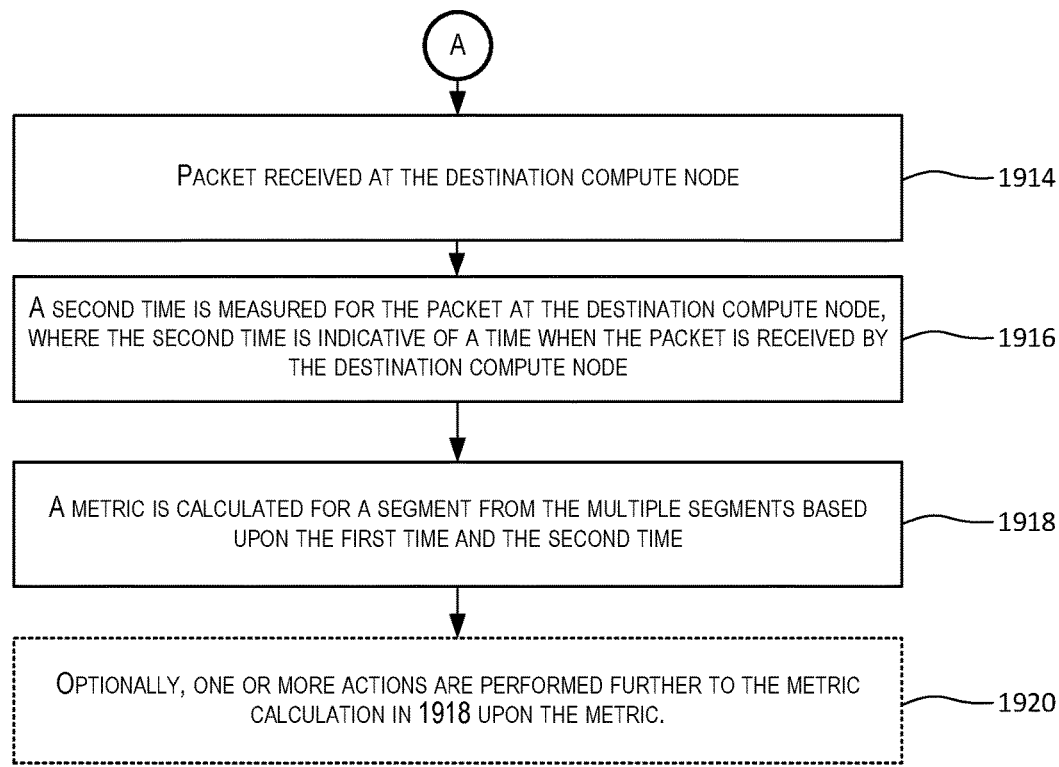

A

PACKET RECEIVED AT THE DESTINATION COMPUTE NODE — 1914

A SECOND TIME IS MEASURED FOR THE PACKET AT THE DESTINATION COMPUTE NODE, WHERE THE SECOND TIME IS INDICATIVE OF A TIME WHEN THE PACKET IS RECEIVED BY THE DESTINATION COMPUTE NODE — 1916

A METRIC IS CALCULATED FOR A SEGMENT FROM THE MULTIPLE SEGMENTS BASED UPON THE FIRST TIME AND THE SECOND TIME — 1918

OPTIONALLY, ONE OR MORE ACTIONS ARE PERFORMED FURTHER TO THE METRIC CALCULATION IN 1918 UPON THE METRIC. — 1920

*FIG. 19B*

NETWORK PATH PERFORMANCE MEASUREMENTS BY UTILIZING MULTI-LAYER TUNNELING TECHNIQUES

BACKGROUND

Various network monitoring techniques are currently used to measure the performance of a network. For example, synthetic network traffic including probe packets can be generated to calculate metric values (e.g., network latency) for the path taken by the probe packet. Other metrics may also be computed such as packet loss and jitter, which may require sending collections of probe packets.

Existing techniques are capable of determining the performance of network paths between nodes that are configured to inject network traffic and take timing measurements for the packets. A network path between such nodes can traverse multiple network segments of a communication network. While existing techniques are able to measure the performance for end-to-end paths between source and destination compute nodes (e.g., from source data centers to the destination data centers), they are not suited for measuring the performances of individual segments of the path by the packet, where a segment is bounded by one or more router nodes. Organizations with complete control over the architecture of a communication network may require not only the end-to-end network performance between two data centers, but also the performance of segments within the communication network that provides connectivity between the data centers.

BRIEF SUMMARY

The present disclosure relates to monitoring network performance. More specifically, techniques are described that enable performance measurements to be made for segments of a communication network by utilizing multi-layer tunneling techniques.

For example, in a cloud infrastructure including a communication network that provides network connectivity between multiple data centers and where the communication network includes one or more router nodes and the data centers include compute nodes, techniques are disclosed that use tunneling and packet header manipulation techniques to enable measurement of a performance metric for one or more network segments in the communication network, where the network segment is a segment between two router nodes or is between a router node and a compute node. Examples of performance metrics that may be measured using the innovative techniques disclosed herein include network latency, packet loss, jitter, and others. The techniques described herein may also be used for fault isolation in the communication network.

In certain embodiments, techniques are described for determining performance metrics for segments of a communication network. For example, a method involves enabling a first packet header to be configured for a first packet to cause the first packet to traverse a path from a source compute node to a destination compute node, the path traversing a communication network comprising a set of one or more router nodes, the path comprising a plurality of segments including a first segment, the set of router nodes having a first router node; and wherein the first packet header comprises a plurality of header sections including a header section for each segment in the path, the plurality of header sections comprising a first header section corresponding to the first segment, the first header section storing information indicative of a manner for routing the first packet for the first segment. A first time is measured for the first packet at the source compute node, the first time indicative of a time when the first packet is communicated from the source compute node. A second time is measured for the first packet at the destination compute node, the second time indicative of a time when the first packet is received at the destination compute node after traversing the path starting at the source compute node and traversing the plurality of segments as per the first packet header. A performance metric is calculated for the first segment using the first time and the second time.

In some examples, the compute nodes may be nodes at data centers provided by a cloud service provider (CSP). For a path traversed by a packet, the source compute node may be a node in a first data center and the destination compute node may be node in a different data center where the data centers are communicatively coupled by the communication network comprising one or more router nodes. For a particular path traversed by a packet, the source compute node and the destination compute node may be the same compute node in a data center.

In certain embodiments, enabling the first packet header to be configured for the first packet comprises configuring a router node from the set of router nodes as a tunnel termination endpoint. Enabling the first packet header to be configured for the first packet may also include, for a router node from the set of router nodes, creating a mapping between a label and an interface of the router node.

In certain embodiments, a first packet header is configured for the first packet, wherein due to the configuring, the first packet header comprises the plurality of header sections including a header section for each segment in the path, the plurality of header sections comprising the first header section corresponding to the first segment, the first header section storing information indicative of a manner for routing the first packet for the first segment.

In another example embodiment, the first segment is between a start node and an end node. In this example, the first router node from set of router nodes is the end node for the first segment and the first header section includes information identifying a first tunnel and information identifying the first router node as an endpoint for the first tunnel.

In another example embodiment, the information identifying the first tunnel identifies a first tunneling protocol and the information identifying the first router node as the endpoint for the first tunnel comprises an address associated with the first router node. In some embodiments, the first tunneling protocol is Generic Routing Encapsulation (GRE) and the address associated with the first router node is an Internet Protocol (IP) address associated with the first router node.

In another example embodiment, the source compute node is the start node of the first segment.

In another example embodiment, another router node from the set of router nodes is the start node of the first segment.

In another example embodiment, the start node of the first segment is the source compute node or another router node from the set of router nodes. The computing device may determine, by the start node of the first segment and from the first packet header, the information identifying the first tunnel and the information identifying the first router node as the endpoint for the first tunnel. The computing device may encapsulate, by the start node, the first packet to generate a first encapsulated packet and communicate the first encapsulated packet from the start node to the end node via the first tunnel.

In another example embodiment, the first segment is between a start node and an end node. The first router node from set of router nodes is the end node for the first segment and the first header section includes information identifying a first label.

In another example embodiment, the start node of the first segment is the source compute node or another router node from the set of router nodes.

In another example embodiment, the start node of the first segment is the source compute node or another router node from the set of router nodes. The start node of the first segment may determine, from the first packet header, a first label. The start node may access, label-to-port mapping information configured for the start node, the label-to-port mapping information mapping the first label to a first egress port of the start node. The start node may communicate the first packet from the start node using the first egress port.

In another example embodiment, the destination compute node is same as the source compute node, the plurality of segments includes a second segment, the first segment is between the source compute node and the first router node, and the second segment is between the first router node and the source compute node. The computing device may calculate the performance metric for the first segment using the first time and the second time by computing a latency metric for the first segment using the first time and the second time. In yet another example embodiment, computing the latency metric includes subtracting the first time from the second time to generate a subtraction result and dividing the subtraction result by two.

The foregoing, together with other features and embodiments will become more apparent upon referring to the following specification, claims, and accompanying drawings.

BRIEF DESCRIPTION OF THE DRAWINGS

FIGS. 19A-B depict a simplified flowchart depicting processing performed for controlling the path taken by a packet through a communication network and computing one or more metrics for one or more segments of the path according to certain embodiments.

DETAILED DESCRIPTION

Figure 1:
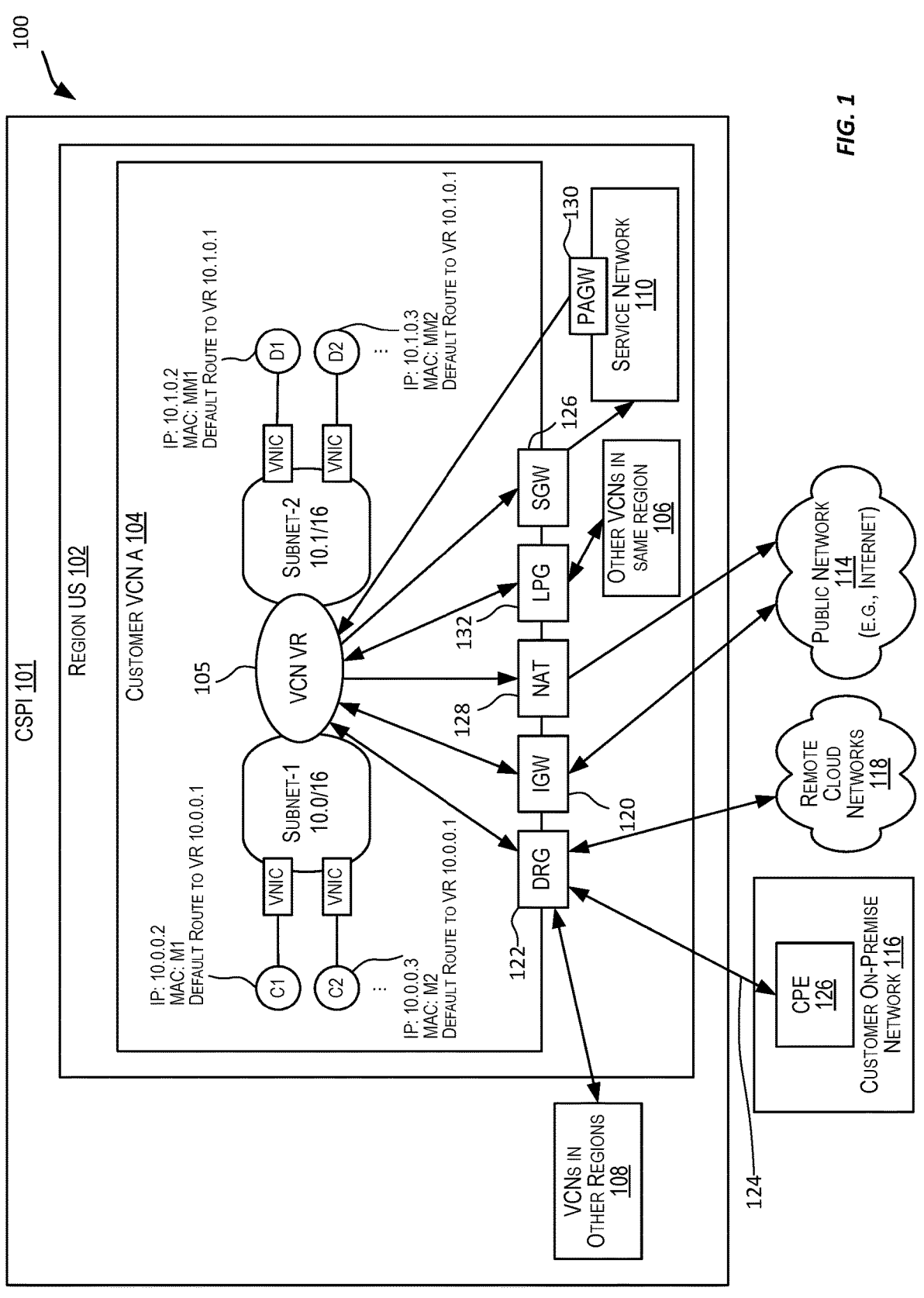
FIG. 1 is a high-level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to monitoring network performance. More specifically, techniques are described that enable performance measurements to be made for segments of a communication network by utilizing multi-layer tunneling techniques. For example, in a cloud infrastructure including a communication network that provides network connectivity between multiple data centers and where the communication network includes one or more router nodes and the data centers include compute nodes, techniques are disclosed that use tunneling and packet header manipulation techniques to enable measurement of a performance metric for one or more network segments in the communication network, where the network segment is a segment between two router nodes or is between a router node and a compute node. Examples of performance metrics that may be measured using the innovative techniques disclosed herein include network latency, packet loss, jitter, and others. The techniques described herein may also be used for fault isolation in the communication network.

A cloud services provider (CSP) may offer one or more cloud services to subscribing customers on demand (e.g., via a subscription model) using infrastructure provided by the CSP. The CSP-provided infrastructure is sometimes referred to as cloud infrastructure or cloud services provider infrastructure (CSPI). The CSPI provided by a CSP typically includes one or more data centers communicatively coupled with each other via a communication network (also sometimes referred to as a backbone network). The data centers are generally located in different geographical locations, where one data center can be separated from another data center by vast geographical distances. The communication network enables communication of network traffic between the data centers, where the network traffic can comprise data packets. Various communication protocols may be used to facilitate communications between the data centers over the communication network.

A data center can include one or more computer systems (referred to herein as compute nodes). In certain embodiments, compute nodes are referred to as "bouncers." A compute node in a data center can be the source of network traffic where the destination of the network traffic is another compute node, possibly in a different data center, or even outside the CSPI. A compute node in a data center can be the destination of network traffic that originates from another compute node, possibly in a different data center, or from outside the CSPI. The communication network provided as part of the CSPI facilitates communication of network traffic between source and destination compute nodes. The network traffic can include one or more one or more data packets, one or more control packets, and other types of packets.

The communication network can include one or more networks and can comprise a heterogenous mix of components for reliably routing information across the network. In certain implementations, the network includes a collection of interconnected nodes. For purposes of this disclosure, the nodes within a communication network that are responsible for routing traffic to facilitate the communication of that traffic from a source compute node to a destination compute node are referred to as router nodes. Examples of router nodes include routers, forwarders, virtual networking entities such as different types of gateways, and the like. In certain embodiments, router nodes are referred to as "bb-core routers." Unlike compute nodes, a router node is not configured for taking time measurements for packets that are routed by the router node.

Various network monitoring techniques are currently used to measure the performance of a network. For example, synthetic network traffic comprising probe packets can be used to measure the performance of a network path between two compute nodes that traverses the communication network. This can be done, for example, by injecting a probe packet at a source compute node and sending the packet to a destination compute node. A first time measurement is measured at the source compute node when the probe packet is communicated from the source compute node and a second time measurement is taken at the destination compute node when the probe packet arrives at the destination compute node. The values for the first time and the second time can then be used to measure a metric value (e.g., network latency) for the path taken by the probe packet from the source compute node to the destination compute node. Network latency refers to the time the network traffic (e.g., the probe packets) takes to traverse a network path from the source compute node to the destination compute node.

Other metrics may also be computed such as packet loss and jitter. Packet loss refers to a measurement of network traffic that is lost due to network congestion or network errors. For example, packet loss over a network path may estimated by calculating the ratio of packets (e.g., probe packets) lost to packets sent, for a given collection of packets sent over that network path. Jitter may be defined a measurement of the variability in network latency across a particular network segment. For example, jitter over a network path between two compute nodes may be estimated by measuring the network latency over that network path over a period of time and then calculating the variance of those latency measurements. A collection of probe packets may be communicated between a source compute node and a destination compute node to enable computations of packet loss and jitter.

As described above, existing techniques are capable of determining the performance of network paths between source and destination compute nodes. A network path between a source compute node and a destination compute node can traverse over multiple network segments (also referred to as sub-hops) of a communication network. For example, the network path can include a first segment from a source compute node in a source data center to a first router node in the communication network, another segment from the first router node to a second router node, and so on, and finally a segment from the "n"th router node in the communication network to the destination compute node in a destination data center. While existing techniques are able to measure the performance for end-to-end path from the source compute node in a source data center to the destination compute node in a destination data center, they are not suited for measuring the performances of individual segments of the path by the packet, for example, the performance of a segment from the source compute node to the first router node, for a segment between the first router node and a second router node, a segment between the "n"th router node and the destination compute node, and other segments. One of the reasons for this is because the router nodes are not configured to take time measurements for the packets routed by the router nodes that allow the measuring of metrics (e.g., latencies) for the segments.

For most users, measuring just the end-to-end performance as done by existing network performance techniques, is sufficient because the users do not have any control over the communication network that is used to transport packets between source compute nodes and destination compute nodes. However, a CSP has complete control over the architecture of a communication network provided by the CSP as part of the CSPI and that enables communications between data centers provided by the CSP. It is thus very desirable for a CSP to know, not only the end-to-end network performance between two data centers, but also the performance of segments of the communication network that provides connectivity between the data centers, where a segment is between a compute node and a router node or between two router nodes. It is important for the CSP to be able to probe certain segments of the CSP's communication network and measure network performance for the probed segments and compute performance metrics. The CSP may use the performance metrics measured or computed for the communication segments to make decisions regarding the communication network, such as, whether to change the communication network topology, use different router nodes, isolate certain segments of the communication network, and the like. This is not possible using existing techniques.

The present disclosure provides solutions that can be used for measuring network performance and metrics for segments of a communication network. For a network path traversed by a packet from a source compute node to a destination compute node, the teachings described herein enable performance metrics (e.g., latency, jitter, packet loss, etc.) to be measured for segments of the network path, where the segment can be between two router nodes or between a compute node and a router node.

In certain implementations, the measurement of one or more performance metrics for a segment is facilitated by enabling router nodes in a communication network to be configured in a special manner, and further by enabling the physical path traversed by a packet (e.g., a probe packet), from a source compute node to a destination compute node, to be controlled and specified in the header information of the packet before the probe packet is injected into network at the source compute node. The network path may be specified such that the path includes or traverses one or more network segments whose performance is to be measured. As the packet is routed from the source compute node to the destination compute node over the communication network, this packet header information is used by the router nodes of the communication network to decide how to route the packet. The header information of a packet can thus be manipulated and controlled to cause the packet to traverse a specified path through the communication network traversing one or more router nodes. Timing measurements taken for the probe packet at the source compute node when the packet is injected and at the destination compute node when the packet is received by the destination compute node can then be used to measure one or more performance metrics for one or more individual segments of the network path traversed by the packet, the segment is bounded by at least one router node, i.e., the segment is between two router nodes or between a compute node and a router node. In certain use cases, the source compute node and the destination compute node can be the same compute node.

As indicated above, novel techniques are described for configuring router nodes of a communication network to enable performance measurements for individual segments of a network path traversed by a packet. In certain implementations, one or more router nodes of a communication network can be configured as tunnel termination endpoints. A tunnel can be configured between a router node and a compute node (e.g., either the source compute node or the destination compute node) or between two router nodes. This enables the end-to-end path traversed by a packet from a source compute node to the destination compute node to be broken down and specified using one or more tunnels that make up that path. A tunnel can correspond to a segment of the end-to-end network path traversed by a packet from a source compute node to a destination compute node.

As part of configuring a router node, a tunnel is configured between two nodes, where at least one of the two nodes is a router node, and the other node is either a compute node or another router node. A router node that is configured as a tunnel termination endpoint for a tunnel is now capable of receiving a packet (e.g., an IP packet) via the tunnel using a tunneling protocol such as the Generic Routing Encapsulation (GRE) protocol. The packet is encapsulated (with encapsulation information) at the tunnel entry point and decapsulated to the tunnel termination endpoint. For example, the GRE protocol is a tunneling protocol that allows for the encapsulation of information that can be sent over an Internet Protocol (IP) network. Different tunneling protocols may be used in conjunction with the embodiments described in this disclosure.

When a system administrator or network performance engineer wants to probe a particular segment of the communication network, they can configure a probe packet and author header information for the packet to cause the packet to follow a specific path from a source compute node to a destination compute node that traverses the particular network segment. The header information can be authored to identify one or more tunnels that the packet is to traverse. The packet is then injected into the network via the source compute node. As the packet is communicated from the source compute node to the destination compute node, the packet gets routed by the router nodes based upon the header information in the packet's header. For example, if the header information of the packet specifies one or more tunnels in a particular order, the packet is routed through the communication network via the specified tunnels and in the order specified in the packet header, wherein each tunnel is terminated by a router node. At the end of a tunnel, the router node that terminates that tunnel uses the header information in the packet to determine how to further route the packet. In this manner, the packet traverses the network path specified in the header of the packet, where the network path can include one or more tunnels over specific network segments.

Router nodes are additionally configured with label-to-port mapping information. The label-to-port mapping for a router node identifies a list of one or more labels that are locally-relevant (i.e., locally unique to the router node), and each label is mapped to an egress port of the router node. This label-to-port mapping information provides another mechanism that can be used to specify a specific path to be traversed by a packet from the source compute node to the destination compute node. In this case, information identifying a label can be added to the header of a packet. When the packet reaches a router node to which the label applies, the packet is forwarded from that router node over the specific egress port corresponding to the label specified in the header of the packet. In this manner, by specifying labels in a packet's header, the specific egress port used to forward the packet from a router node can be controlled.

In certain implementations, Multiprotocol Label Switching (MPLS) labels may be used. MPLS is a packet routing technology that causes routers to forward packets across a physical link according to a specified label. An egress port corresponds to a specific physical connection between the router node and another node. For example, a particular router node may contain a label-to-port mapping that specifies that label "700002" maps to egress port "xe-0/0/1," which is physically coupled with another router node or compute node. A router node may have one or multiple egress ports or interfaces. In certain network topologies, the same router node may have two different egress ports, representing two different physical paths, linking to the same next hop node, which may be another router node or a compute node.

When a probe packet is injected into the network at a source compute node, the header information of the packet can be authored to identify a particular label to be used at a tunnel termination endpoint. When the packet arrives at a router node corresponding to the tunnel termination endpoint, the router node reads the label information from the packet's header and then forwards the packet using the label-to-port mapping information configured for that router node. Based upon the label read from the packet's header, the router node uses the label-to-port mapping information to determine an egress port of the router node that the label maps to. The router node then uses that egress port to forward the packet from the router node. In this manner, when the header of a probe packet is configured, the header information in the packet can be specified to include a label that it used to control which egress port of a router node is used to forward the packet from the router node. This provides further control over the path taken by a probe packet from the source compute node to the destination compute node. This is particularly useful for testing and monitoring the performance of particular egress interfaces of router nodes in the communication network.

Once the router nodes have been configured, in order to probe a particular network segment of a communication network, a probe packet is configured to travel a network path from a source compute node to a destination compute node where the path traversed by the packet includes the particular network segment of the communication network whose performance it to be measured. The path to be taken by the packet is configured in the header of the packet before the packet is communicated from the source compute node. The path from the source compute node to the destination compute node traverses one or more router nodes of the communication network. The path comprises multiple network segments, each segment bounded by at least one router node. Each segment is characterized by a start node that represents the start of the network segment and an end node that represents the end of the segment. For a segment, both the start and end nodes can be router nodes, or the start node can be a compute node and the end node is a router node, or the start node is a router node and the end node is a compute node.

In certain implementations, when the header of a packet is configured to cause the packet to traverse a particular path comprising multiple segments, the header of the packet is configured to comprise multiple sections corresponding to the multiple segments of the network path to be traversed by the packet, one section for each segment. For each segment, the corresponding packet header section can be configured to store information identifying how the packet is to be routed for that segment. For a segment, this can be done by specifying a tunnel, a label, or IP information to be used for routing the packet in that segment. For a particular segment, the start node of the segment uses information specified/stored in the corresponding packet header section to determine how the packet is to be routed for that segment.

Additionally, an ordering is specified for the header sections of a packet to correspond to the order in which the segments are to be traversed as the packet is communicated from the source compute node to the destination compute node. In certain implementations, a stack data structure may be used to impose this ordering, with the top section in the stack represents the first network segment, the second section in the stack represents the second network segment, and so on.

In a simple example, let's assume that a probe packet is to traverse a path from a source compute node to a router node and then from the router node back to the source compute node. In this example, the same compute node is both the source compute node and the destination compute node. The network path includes two segments: a first segment from the source compute node to the router node; and a second segment from the router node to the source compute node. For this example, the header of the packet is configured to include two sections: a first section in which how the packet is to be routed from the source compute node to the router node is specified or configured; and a second section in which how the packet is to be routed from the router node to source compute node is specified. The packet header may be configured at the source compute node. The packet with the configured header is then injected at the source compute node. The source compute node, which is the start node of the first segment of the path to be traversed, examines the first section of the packet header and routes the packet over that segment based upon the information contained in the first section. For example, if the first section of the packet header indicates that the packet is to be routed to the router node using a tunneling protocol where the router node is the endpoint of the tunnel, the source compute node encapsulates the packet according to the tunnelling protocol and then tunnels the packet from the source compute node to the router node. The packet is received by the router node via the tunnel. The router node decapsulates the packet. The router node is the start node of the second segment. Upon receiving the packet, the router node examines the second section of the packet header corresponding to the second segment and routes the packet from the router node to source compute node based upon the information contained in the second section of the packet. In this manner, the packet is routed from the source compute node to the destination compute node based upon header information configured for the packet prior to the communication. Several additional examples of how the header of a packet can be configured to cause the packet to traverse a specific network path from the source compute node to the destination compute node are provided below.

In certain implementations, a first time measurement is taken for a probe packet at the source compute node at or approximately around the time when the packet is communicated from the source compute node. The first time may represent a time when the packet was sent from the source compute node. A second time measurement is taken at the destination compute node, for example, when the probe packet arrives at the destination compute node. The second time represent a time the packet is received by the destination compute node. Based upon the two time measurements, a metric (e.g., latency) can be computed for a segment of the network path traversed by the packet, where the segment is between a compute node (e.g., the source compute node or the destination compute node) and a router node or is between two router nodes. For example, in the simple example above, the difference between the second time and the first time divided by two indicates the network latency for the segment between the source compute node and the router node.

Other metrics may also be computed for a network segment using the techniques described herein. For example, in order to determine a packet loss metric or jitter for a network segment, multiple packets may be sent from a source compute node to a destination compute node that traverse the network segment. The number of packets sent from the source compute node may be compared to the number of packets received by the destination compute node to determine a packet loss metric.

Depending upon the complexity of the path and the numbers of segments in the path from the source compute node to the destination compute node, one or multiple packets and associated calculations may be used for measuring a performance metric for a particular segment of the path. For example, for the source compute node-to-router node-to-source compute node path example described above, a single probe packet is sufficient to calculate the latency for the segment between the source compute node and the router node. In some other network path configurations, multiple packets may have to be sent in order to determine a metric for a particular network segment. A metric that requires "n" packets to be sent is referred to as an nth-order metric.

For example, in order to calculate a second-order metric for a network segment, two probe packets may be needed. For example, consider a path from a source compute node to a destination compute node that includes three network segments: a first segment from the source compute node to a first router node; a second segment from the first router node to a second router node; and a third segment from the second router node to the destination compute node. A latency metric (L1) for the segment between the source compute node and the first router node can be calculated by sending a packet from the source compute node to the first router node and back to the source compute node and measuring the packet send and packet receipt times. Likewise, a latency metric (L2) for the segment between the second router node and the destination compute node can be calculated by sending a packet from the destination compute node to the second router node and back to the destination compute node. In order to measure the latency for the segment between the first router node and the second router node (L3), an additional packet is sent with the following path: source compute node to the first router node; first router node to second router node, second router node to first router node, and first router node to source compute node. The packet sent and packet received times are noted at the source compute node. This is used to measure the latency (L4) for the source compute node to second router node segment. The latency (L3) for the first router node to the second router node can then be determined by (L4-L1). Since a minimum of two packets were used to determine this latency value, this metric is referred to as a second-order metric.

The techniques described in this disclosure present several technical improvements over existing techniques. Any physical network segment in a communication network can be probed and a performance metric calculated for that segment. Additionally, individual egress ports or interfaces of the router nodes can be probed. The ability to directly probe physical links between pairs of router nodes and between router nodes and compute nodes allows for measurements of metrics such as network latency, packet loss, and jitter, and also facilitates fault isolation. The ability to isolate faults to a specific component (e.g., a specific router node or egress port) allows for speedy triaging by network reliability engineering teams.

A network performance analysis system (NPAS) is provided that is configured to perform the various functions described in the disclosure. In certain implementations, the NPAS is a component of the CSPI provided by a CSP. The NPAS enables various functions including setting up of tunnels and configuring router nodes as tunnel termination endpoints. The NPAS also enables label-to-port mapping information to be configured for one or more router nodes. The NPAS also provides tools (e.g., GUIs) for configuring headers of probe packets. The NPAS also is capable of measuring or getting information regarding probe packet send and packet receipt times. The NPAS then uses the time information to calculate one or more metrics for network segments. In certain implementations, the NPAS may generate reports showing various network segments and one or more performance metrics computed and associated with the network segments.

FIGS. 1-5 and the associated description provided in the "Example Virtual Networking Architecture" section below describes networking concepts including virtualization, underlay networks, regions, and availability domains, and provides examples of environments in which nodes implementing the improved techniques disclosed in this disclosure may be used. FIGS. 6-13 and 19 describe examples and embodiments related to the improved techniques described in this disclosure. FIGS. 14-17 depict examples of architectures for implementing cloud infrastructures for providing one or more cloud services, where the infrastructures may incorporate teachings described herein. FIG. 18 depicts a block diagram illustrating an example computer system, according to at least one embodiment.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 14, 15, 16, and 17 (see references 1416, 1516, 1616, and 1716) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 14, 15, 16, and 18, and are described below. FIG. 1 is a high-level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has a private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has a private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet)

or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 14, 15, 16, and 17 (for example, gateways referenced by reference numbers 1434, 1436, 1438, 1534, 1536, 1538, 1634, 1636, 1638, 1734, 1736, and 1738) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associated with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked, and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
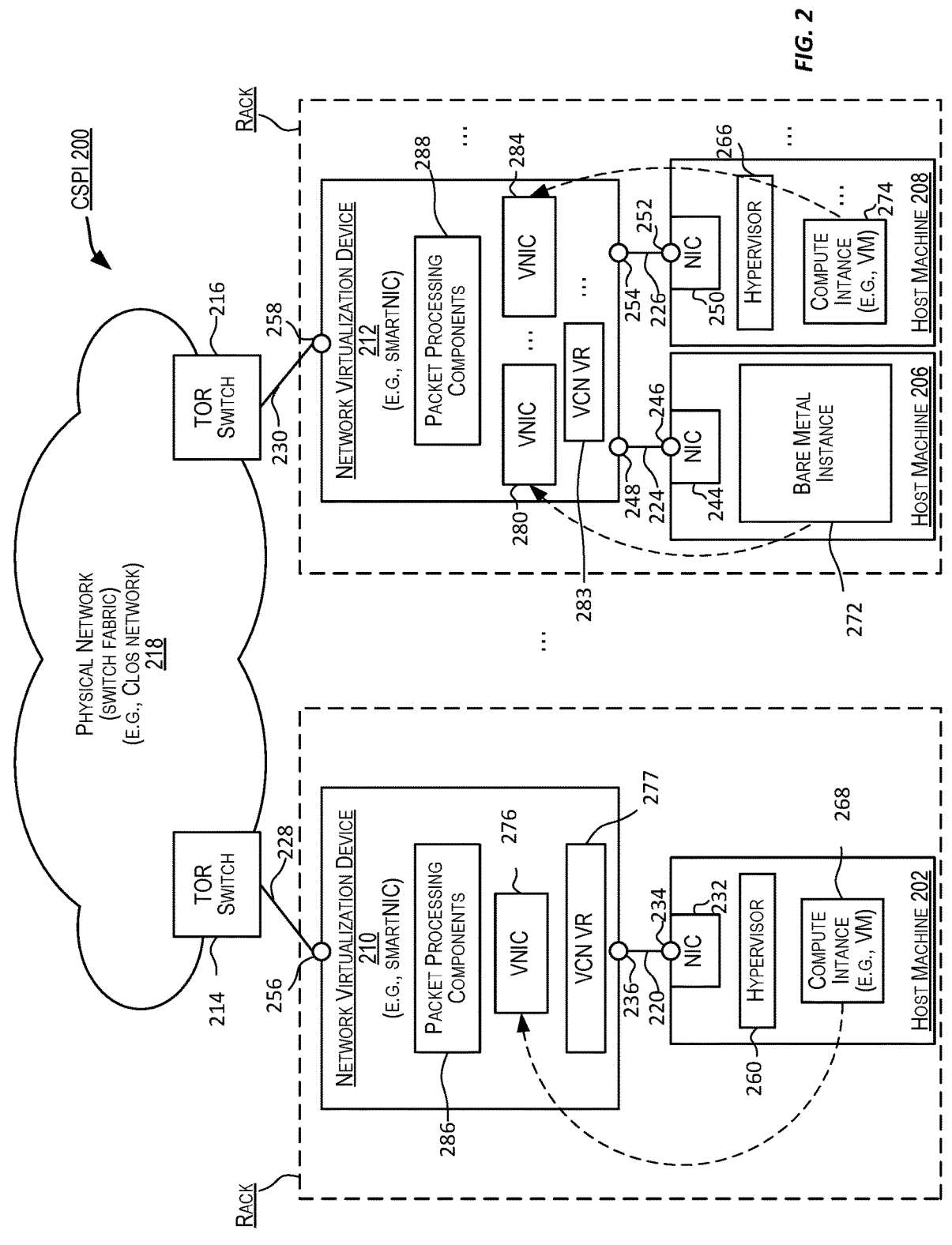
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
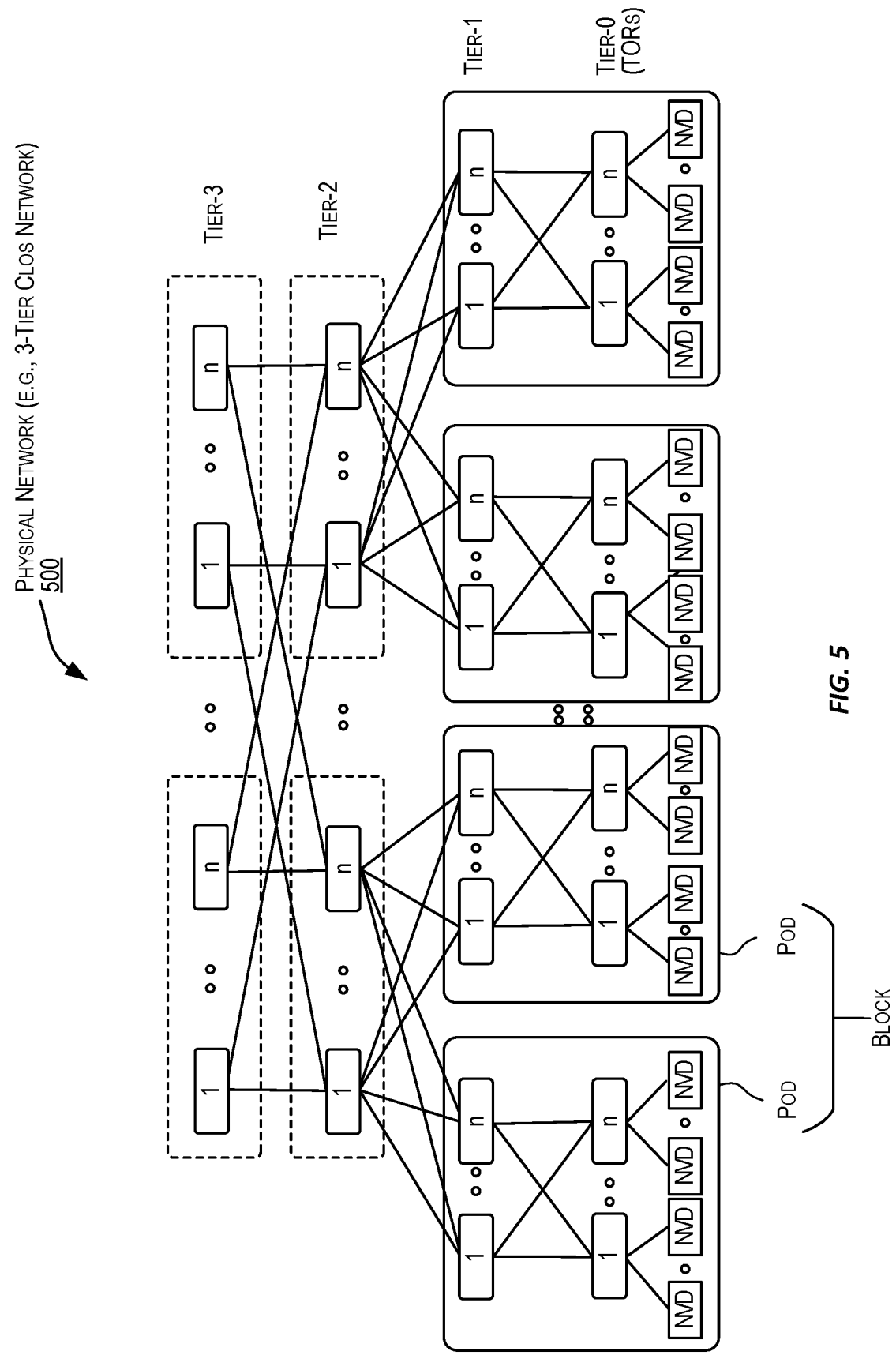
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
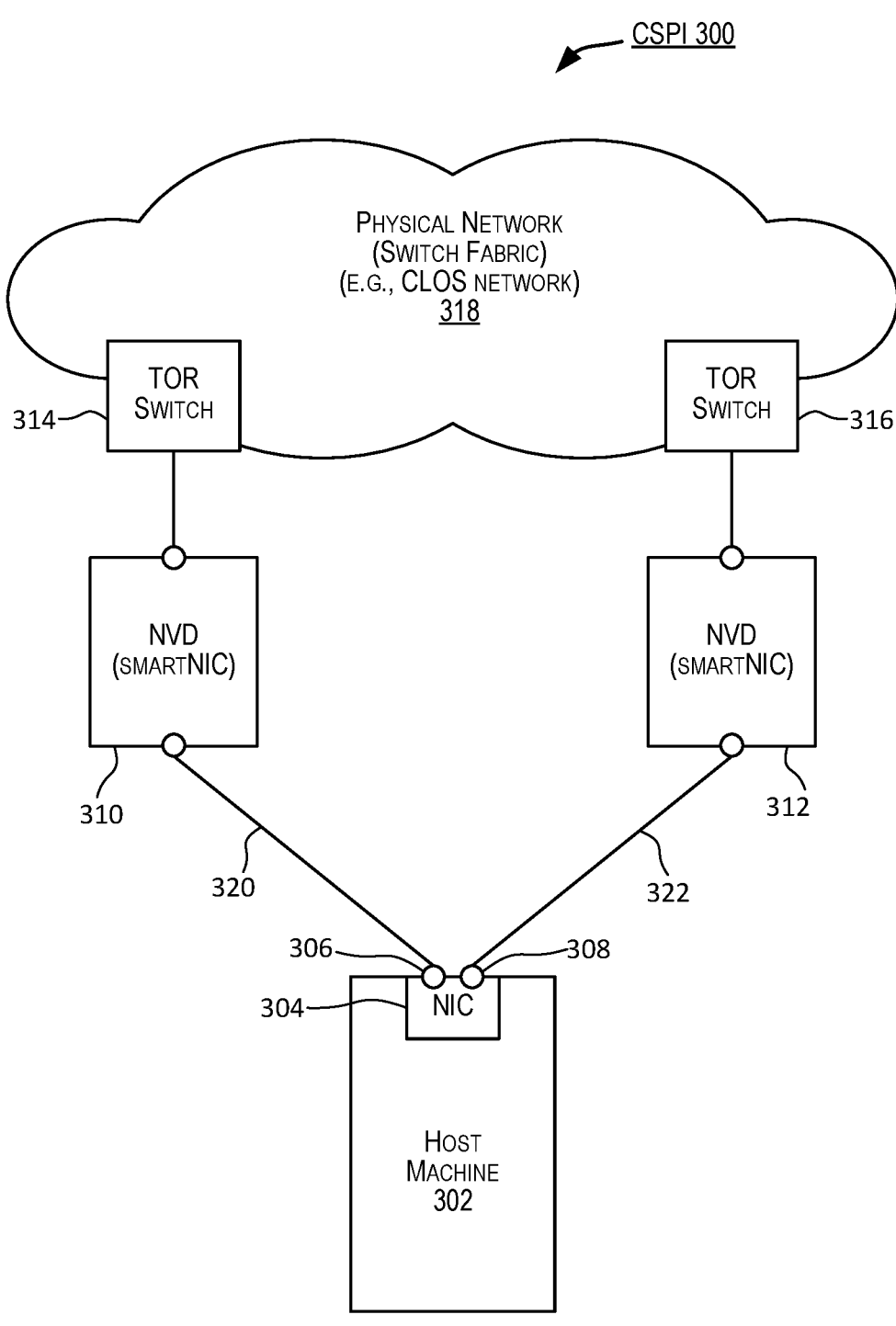
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320 and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch, or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 14, 15, 16, and 17 (see references 1416, 1516, 1616, and 1716) and described below. Examples of a VCN Data Plane are depicted in FIGS. 14, 15, 16, and 17 (see references 1418, 1518, 1618, and 1718) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206 and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
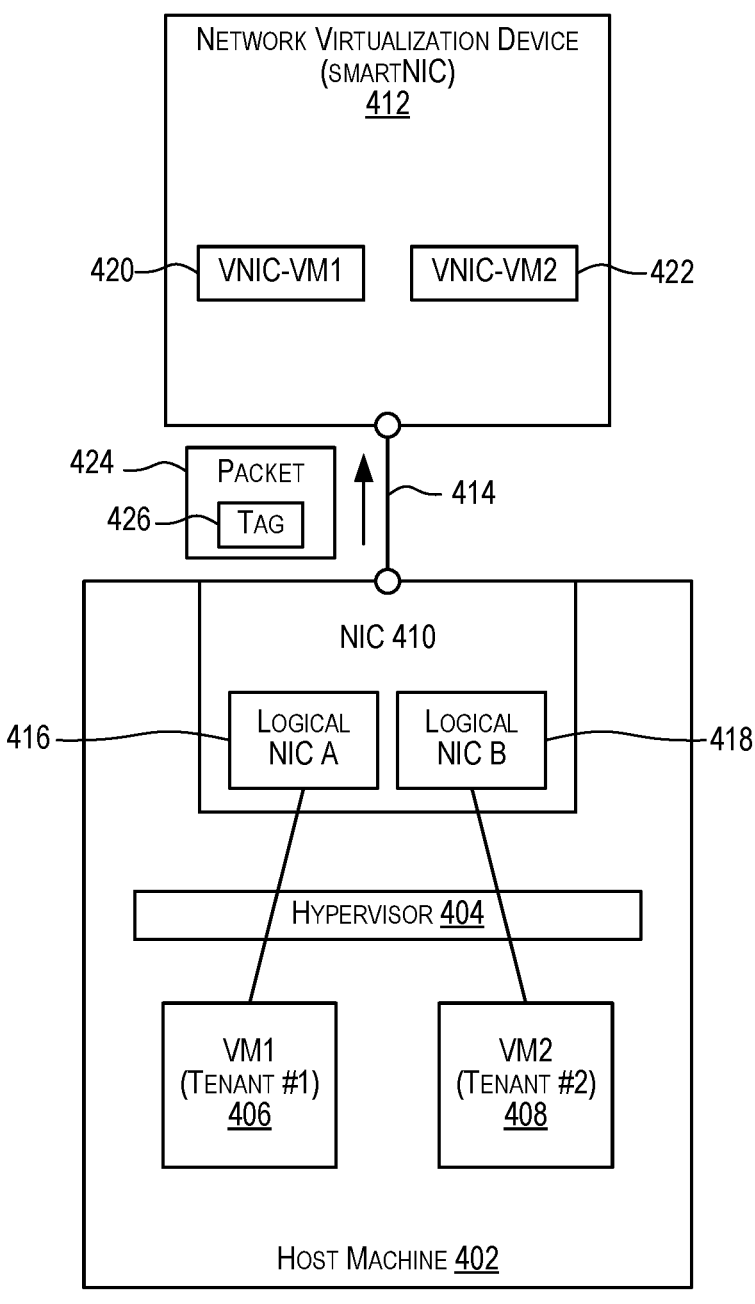
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multitenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>. [REGION] [.FUTURE USE].<UNIQUE ID> where, ocid1: The literal string indicating the version of the CID;
   resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Figure 6A:
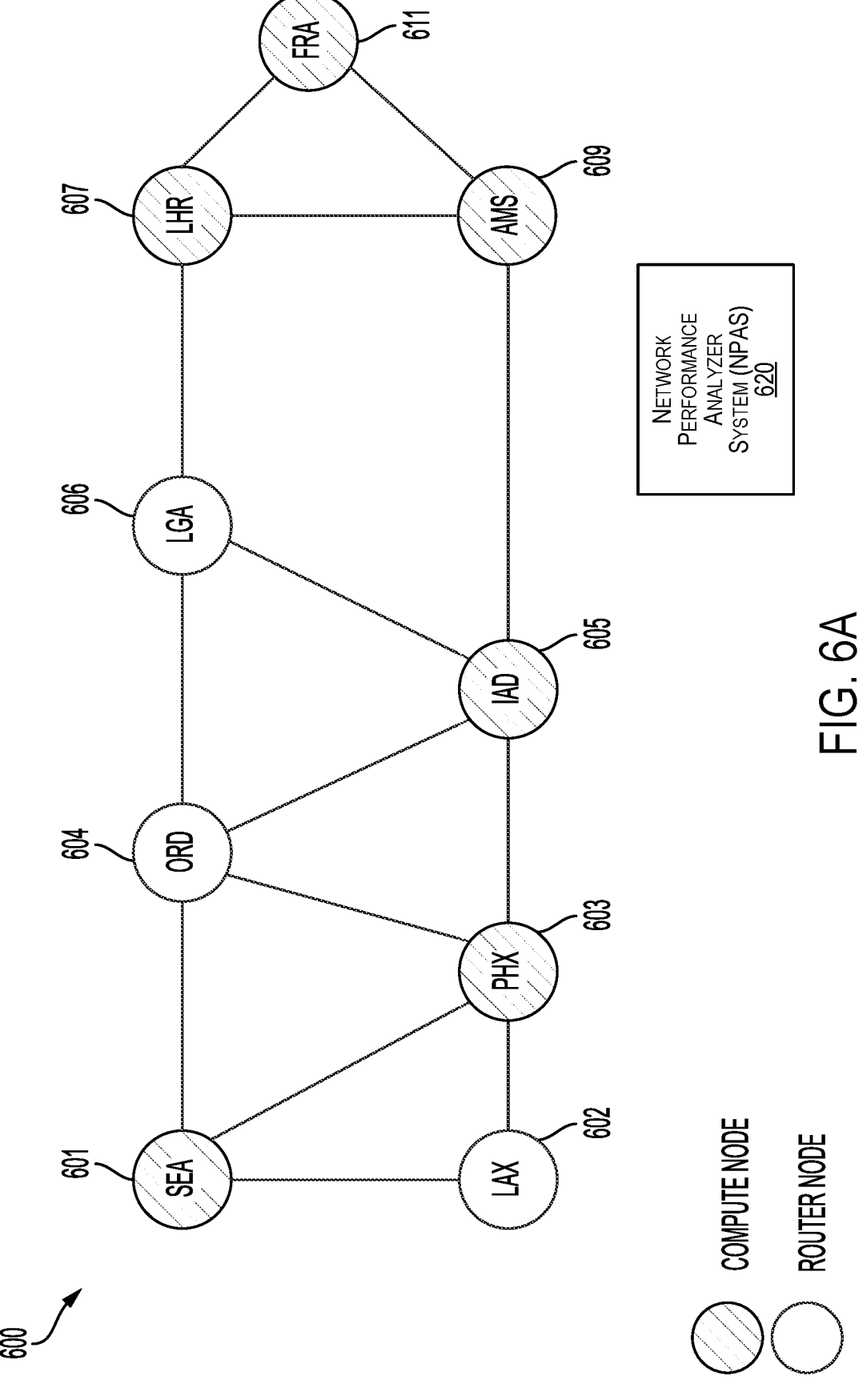
FIGS. 6A-C are simplified diagrams of an example network that may implement one or more of the innovative techniques described in this disclosure, according to certain embodiments.

Network Path Performance Measurements Utilizing Multi-Layer Tunneling Techniques FIG. 6A is a simplified diagram of an example distributed environment 600 incorporating a network performance analysis system according to certain embodiments. In the embodiment depicted in FIG. 6A, distributed environment 600 includes a number of networked components including compute nodes 601, 603, 605, 607, 609, and 611, indicated with shaded circles. Distributed environment 600 also includes router nodes 602, 604, and 606, indicated with unshaded circles. In FIG. 6A, nodes are connected by lines representing physical or logical connections between network nodes. A portion of the network between two nodes may be referred to as a network segment. A network path is a sequence of one or more network segments connecting two nodes. For instance, one possible network path between nodes 601 and 604 includes the network segments connecting compute node 601 and compute node 603, and compute node 603 and router node 604. There may be one or more network paths between two nodes in a network connected by at least one network segment. For instance, another path between nodes 601 and 604 is the single network segment connecting compute node 601 and router node 604.

The nodes depicted in FIG. 6A can be located at different geographical locations. In FIG. 6A, each node is labeled with a three-lettered identifier identifying a physical geographic location of the node. For example, compute node 603 is labeled with "PHX" which may correspond to Phoenix, Arizona. Similarly, compute node 607 is labeled with "LHR" which may correspond to London, England. The geographic dispersion applies to router nodes as well. Router node 604 is labeled with "ORD" which may correspond to Chicago, Illinois and router node 606 is labeled with LGA which may correspond to New York, New York. These examples serve to illustrate network nodes that are physically connected and separated by hundreds or thousands of miles.

In certain implementations, the compute nodes and router nodes depicted in FIG. 6A may be as part of cloud infrastructure (CSPI) provided by a CSP for providing one or more cloud services. The compute nodes may represent computer systems at various data centers provided by the CSP. For example, compute node 601 may correspond to a data center located in Seattle, compute node 603 may correspond to a data center located in Phoenix, compute node 605 may correspond to a data center in Washington DC, compute node 607 may correspond to a data center in London, compute node 609 may correspond to a data center in Amsterdam, and compute node 611 may correspond to a data center in France. Compute nodes 601, 603, 605, 607, 609, and 611 may be referred to, in certain embodiments, using names like "bouncer1" and "bouncer2." Compute nodes 601, 603, 605, 607, 609, and 611 may represent computer systems with processors, memory devices, storage devices, caches, I/O devices, etc. Compute nodes 601, 603, 605, 607, 609, and 611 may include components that are implemented by hardware, software, or a combination of both. In some examples, compute nodes 601, 603, 605, 607, 609, and 611 are general-purpose computing devices.

Compute nodes 601, 603, 605, 607, 609, and 611 may execute arbitrary program code including program code written in scripting languages like bash, batch, or Power-Shell or programming languages like C, Python, and Java. Among other capabilities, compute nodes 601, 603, 605, 607, 609, and 611 may create packets, inject packets into the network, perform operations on packet payloads, determine times, perform arbitrary calculations, etc. A compute node in a data center can be the source or origin of network traffic (e.g., data packets or probe packets) that is destined for another compute node, potentially in a different data center. Compute nodes 601, 603, 605, 607, 609, and 611 may be configured to perform packet routing and forwarding functions to facilitate network traffic originating with compute nodes to compute nodes that are the intended destinations of the traffic.

Router nodes 602, 604, and 606 depicted in FIG. 6A may be part of a communication network that provides connectivity between the different data centers represented by the compute nodes. The communication network may be part of the CSPI provided by a CSP. The router nodes are configured to perform packet routing and forwarding functions to facilitate network traffic originating with compute nodes to compute nodes that are the intended destinations of the traffic. In contrast to the compute nodes, router nodes 602, 604, and 606, the router nodes are not configured to be the sources or destinations of network traffic. For example, a router node is not configured to inject packets, determine times associated with the packets, or perform latency or other metrics calculations based upon the packets.

Router nodes 602, 604, and 606 may be implemented by hardware, software, or a combination of both. Examples of router nodes include routers, forwarders, virtual networking entities such as different types of gateways, and the like. Router nodes 602, 604, and 606 may be referred to, in certain embodiments, using names like "bb-core1" and "bb-core2."

FIG. 6A also depicts a network performance analysis system (NPAS) 620 that is configured to perform the various functions and methods described in the disclosure. As shown in FIG. 6A, NPAS 620 may be provided by the CSP as part of the CSPI. NPAS 620 enables network performance functions to be performed. For example, as described herein, NPAS 620 may be configured to monitor the compute nodes and router nodes depicted in FIG. 6A and computes metrics for the various network segments depicted in FIG. 6A using the teachings described herein. For example, NPAS 620 may enable setting up of tunnels with router node terminations endpoints and enable the configuration of label-to-port mapping information for individual router nodes. NPAS 620 may also provide tools (e.g., GUIs) that enable users of NPAS 620 to configure headers of probe packets to cause the probe packets to traverse specific paths in the network, measure or acquire timing information regarding when a probe packet is sent from a source compute node and received by a destination compute node. NPAS 620 may use these and other probe packets-related timing measurements to calculate one or more metrics for one or more network segments, where a network segment can be between two router nodes or between a compute node and a router node. In certain implementations, the NPAS may generate reports showing various network segments and one or more performance metrics computed and associated with the network segments.

NPAS 620 may be implemented using hardware, software, or combinations thereof. The software may be in the form of code or instructions that are executable by one or more processors. The code or instructions may be stored on a non-transitory computer readable storage medium. In certain implementations, NPAS 620 may have a distributed architecture with components located in the various data centers.

Figure 6B:
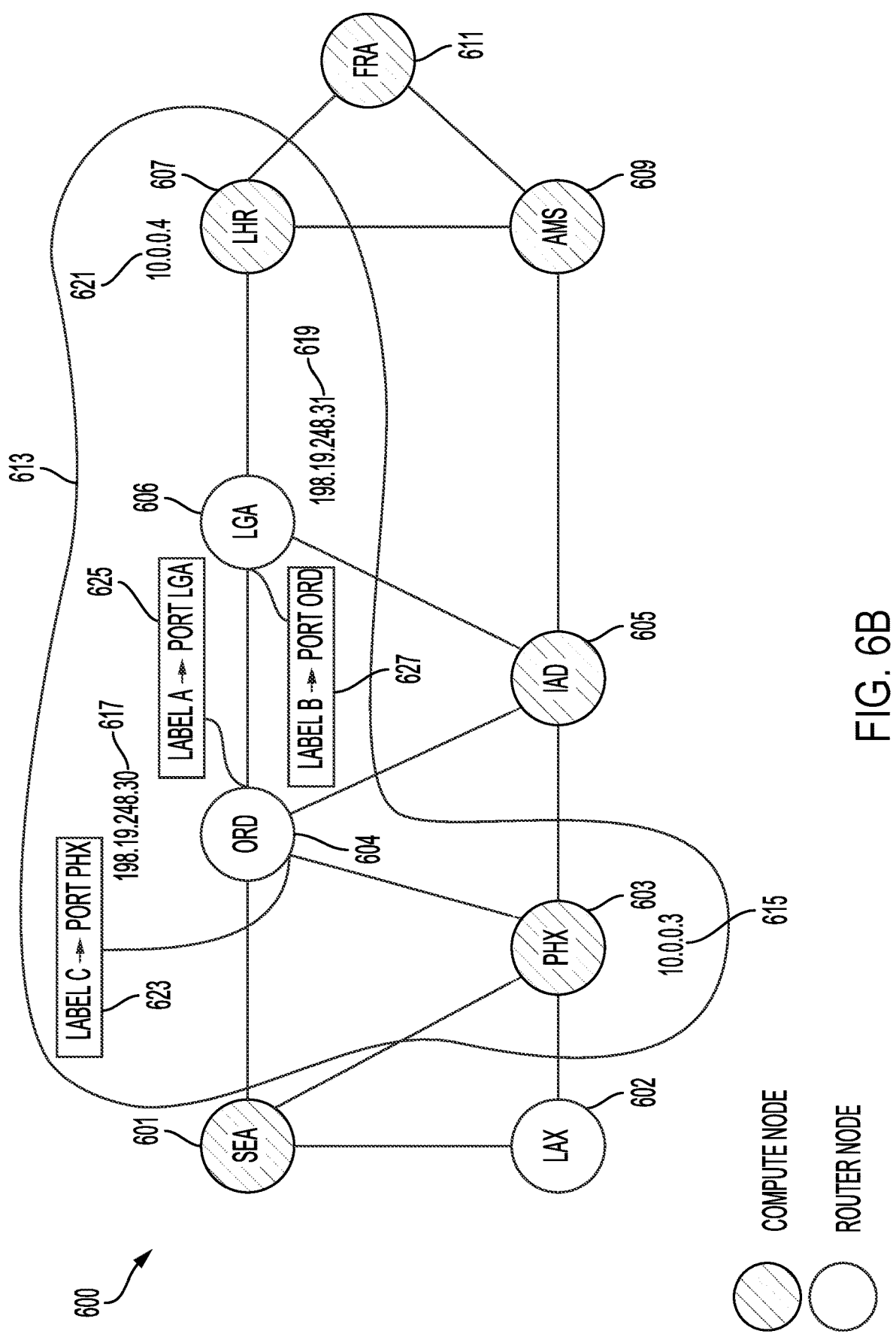

FIG. 6B is a simplified diagram of the distributed environment 600 of FIG. 6A with additional details included for a portion of the distributed environment 600. Detail is added to the portion of the distributed environment 600 included in the bounded area represented by the line 613. However, selection of this portion of the distributed environment 600 for discussion is for illustrative purposes only and similar principles apply to any portion of the distributed environment 600 that may be selected. The term "portion" in this example refers only to a subset of the compute and node nodes depicted in distributed environment 600 and not to network configuration details. The portion 613 of the distributed environment 600 includes compute nodes 603 and 607 and router nodes 604 and 606. All nodes in the portion 613 may have at least one assigned IP address. For example, compute nodes 603 and 607 have assigned IP addresses 615 and 621, respectively. Likewise, router nodes 604 and 606 have assigned IP addresses 617 and 619, respectively. Assigned IP addresses may be any suitable assignment consistent with the IP protocol. In this example, IP addresses 615 and 621 are part of a logical private subnet and IP addresses 617 and 619 are part of a different logical private subnet. However, these assignments are merely illustrative. Network components may be on different subnets or the same subset, or have public or private IP addresses, provided a suitable route exists between the nodes according to the network topology.

Router nodes 604 and 606 also include locally-relevant label-to-port mappings between labels and egress ports. For example, router node 604 includes label-to-port mappings 623 and 625, and router node 606 includes label-to-port mapping 627. Each network segment connecting a router node to another node, whether a compute node or another router node, may have one or more such label-to-port mappings. There may be at most one such label-to-port mapping between a given label and a particular egress port. In other words, each label-to-port mapping must be locally unique. Two labels cannot map to the same egress port and one label cannot map to two egress ports. Locally-relevant means that label-to-port mappings have no relevance outside the router node to which they are assigned. In this example, the label-to-port mappings are labeled according to the node that is physically connected to the given egress port. For example, in label-to-port mapping 623, "LABEL C" maps to "PORT PHX," which refers to the physical connection between router node 604 and compute node 603. Both of these identifiers used in label-to-port mapping 623 are merely illustrative. Both the label and corresponding egress port may be any suitable identifier according to the implementation of the label routing scheme. For example, an example commercial router configuration that maps a label to a port using MPLS is:

```
static-label-switched-path ae1-xe-0/0/1 {
    transit 700002 {
        next-hop 192.168.0.2;
        member-interface xe-0/0/1;
        pop;
```

-continued

```
    }
}
```

In this example, the label "700002" maps to the port "xe-0/0/1."

In some examples, the labels may be allocated from a globally-designated static label range maintained by an NPAS. For example, the distributed environment 600 could be configured by the NPAS with assigned labels from the range 700000-799999. Maintenance of a network map including globally-designated static labels is needed to determine network paths for performance measurements, and to ensure complete coverage of the network by performance measuring. Additionally, compute nodes may store an index of the allocated labels so that the desired network path through the router nodes can be defined in examples in which the probe packet is created by the compute nodes.

Figure 6C:
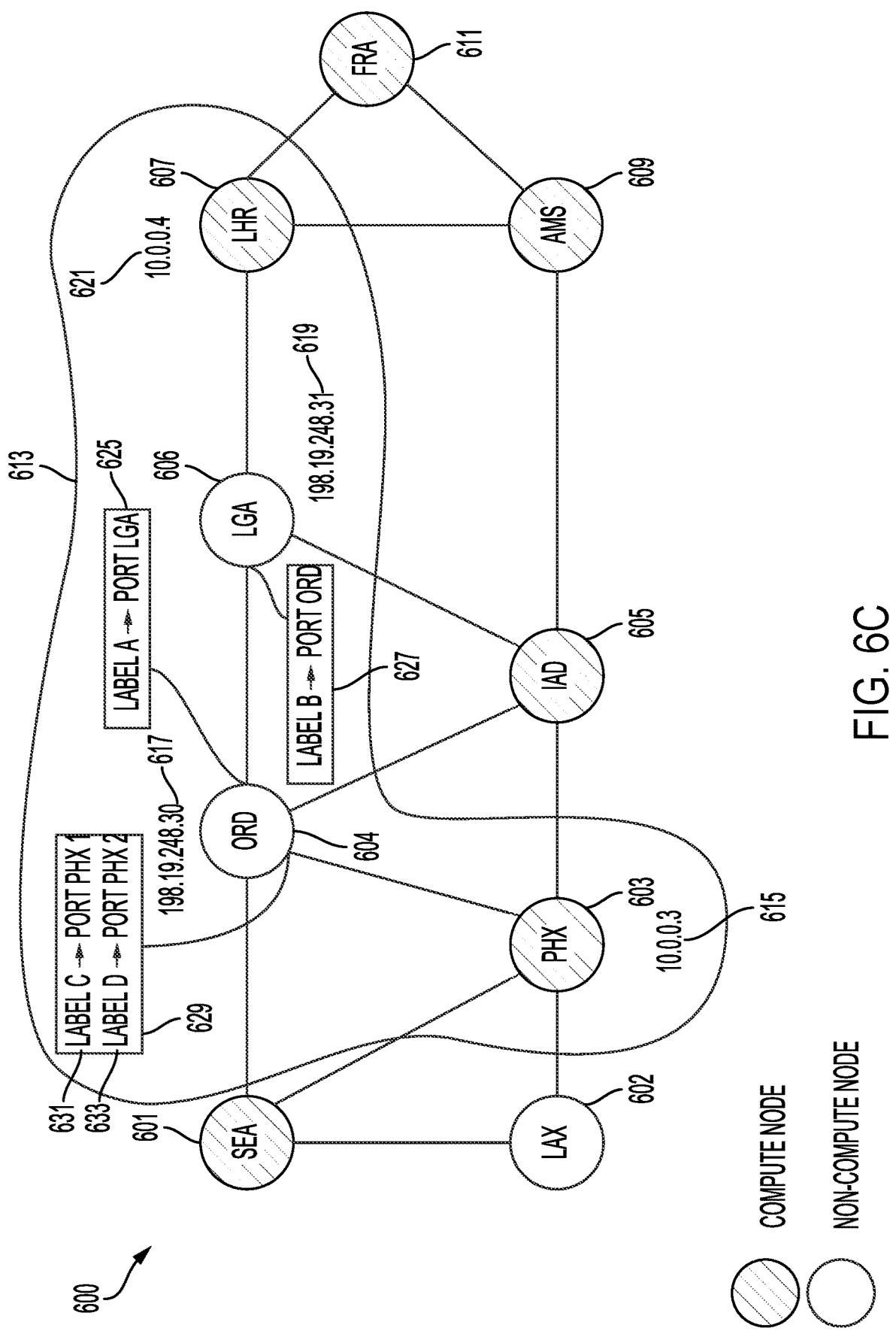

FIG. 6C is a simplified diagram of the distributed environment 600 of FIG. 6A with additional details included for a portion 613 of the distributed environment 600. FIG. 6C illustrates a router node 604 with multiple physical connections to compute node 603. Router node 604 has label-to-port mappings 629 that include 2 labels and 2 egress ports. 2 egress ports/physical connections may be provided, for example, to ensure network redundancy in the event of a failure affecting only one egress port or physical connection. When measuring network performance, separate probe packets may be constructed that include both label-to-port mappings 629 so that faults can be isolated to a particular egress port or physical connection. For example, two probe packets may be constructed that define the path from compute node 603 to router node 604 and back to compute node 603. The two probe packets may be otherwise identical except for the inclusion of label 631 in the first packet and label 633 in the second packet. A high network latency or packet loss measurement by one probe packet but not the other may isolate the fault to a particular egress port or physical connection.

Figure 7:
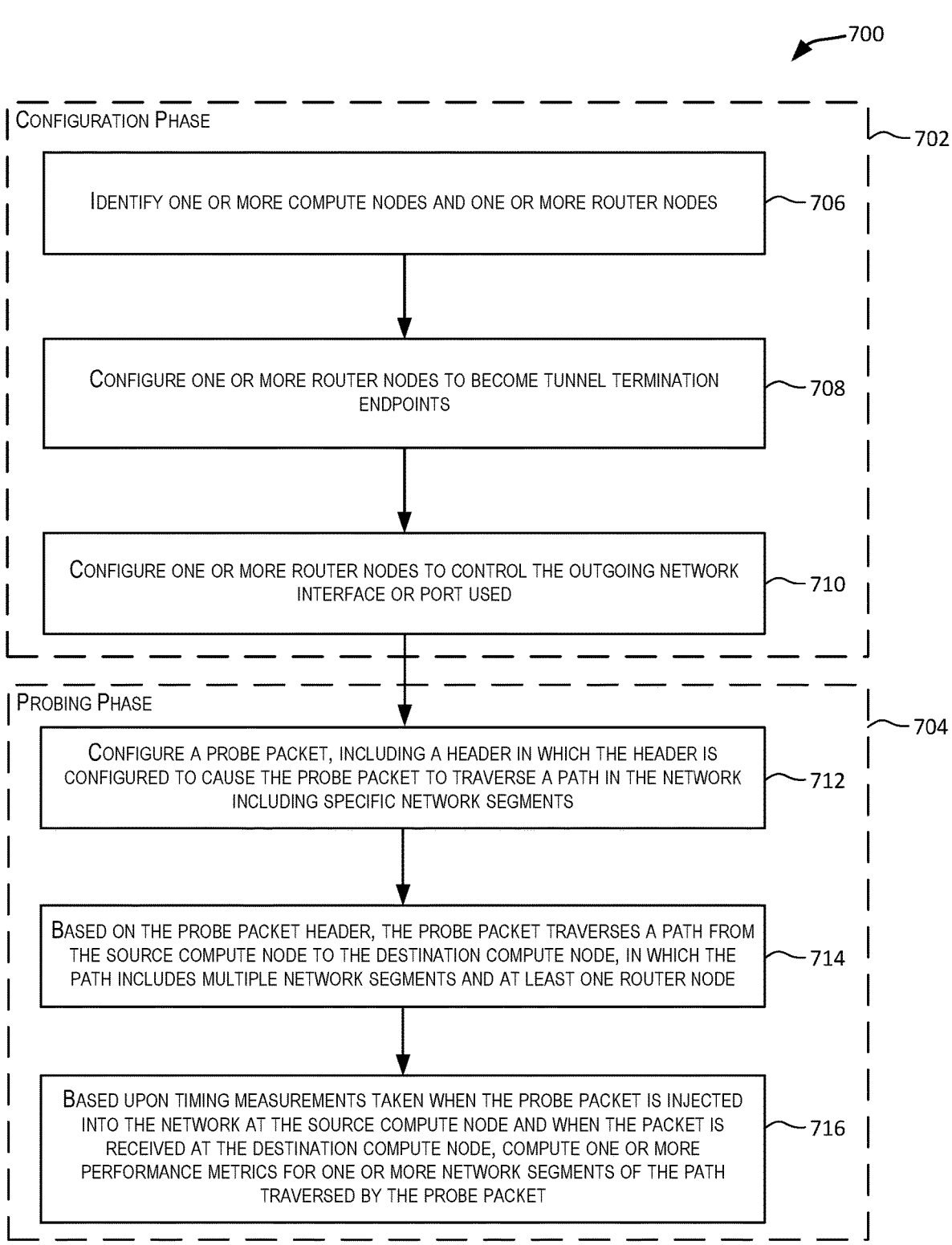
FIG. 7 depicts a simplified flowchart showing a method performed for controlling the path taken by a packet through a communication network by utilizing multi-layer tunneling techniques and computing one or more metrics for one or more segments of the path according to certain embodiments.

FIG. 7 depicts a simplified flowchart 700 showing a method performed for controlling the path taken by a packet through a communication network by utilizing multi-layer tunneling techniques and computing one or more metrics for one or more segments of the path according to certain embodiments. The method depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order, or some steps may also be performed in parallel. One or more of the processing steps depicted in FIG. 7 and described below may be performed or facilitated by NPAS 620 depicted in FIG. 6A.

Conceptually, the processing depicted in flowchart 700 in FIG. 7 is divided into two phases, a configuration phase 702 and a probing phase 704. In the configuration phase 702, the various nodes in the communication network are identified and are configured in a manner that enables probing to be performed in the probing phase 704. In the embodiment depicted in FIG. 7, configuration phase 702 includes processing performed in 706, 708, and 710, and probing phase 704 includes processing performed in 712, 714, and 716.

In certain implementations, the processing performed in the configuration phase 702 and probing phase 704 is facilitated by a network performance analysis system (NPAS), such as NPAS 620 depicted in FIG. 6A. The NPAS can include one or more computer systems and comprise one or more processors that are capable of executing computer instructions. The NPAS may provide and execute one or more programs (e.g., execute computer-readable instructions that are executable by one or more processors of the NPAS) that enable the processing in 702 and 704 to be performed. For example, the NPAS may execute computer instructions that cause one or more graphical user interfaces (GUIs) to be displayed by the NPAS. In certain implementations, the NPAS may be co-located with one or more compute nodes. In other implementations, the NPAS may be implemented using one or more servers that may be distributed and communicatively coupled to the network. For example, the NPAS may include cloud computing servers provided by a cloud services provider (CSP) as part of infrastructure provided by the CSP for offering one or more cloud services to subscribing customers. A user of the NPAS may use the tools (e.g., GUIs, command line interfaces) provided by the NPAS to initiate and control the processing performed in 702 and 704.

In 702, the configuration phase is depicted. As discussed above, router nodes are not configured to construct probe packets, inject probe packets into the network, or perform calculations necessary for performance metric measurements. In contrast, compute nodes may be, for example, co-located with a datacenter and may therefore perform operations such as constructing probe packets, injecting probe packets into the network, or making calculations necessary for performance metric measurements.

In 706, one or more compute nodes and one or more router nodes may be identified for a network to be probed and for performance metrics are to be computed. The NPAS may facilitate the identification of these compute and router nodes. For example, the NPAS may provide various user-selectable options (e.g., commands) to identify the scope of the network to be probed, and to identify the compute and router nodes associated with that network. Further, as part of the processing performed in 706, and based upon the compute and router nodes identified in 706, the NPAS may also determine the various network segments in the network to be probed, where a network segment is bounded by a compute node and a router node, by two router nodes, or by two compute nodes. These segments can then be probed, and performance metrics computed for the network segments during the probing phase 704.

In certain implementations, the NPAS may generate a map of the network, or a representation thereof, based upon the various nodes and segments determined in 706. The NPAS may then determine a performance measurement plan (or probing plan) whereby probe packets are injected into the network at particular nodes and the packets are configured to traverse a specific path terminated by compute nodes, where the path includes specific segments of the network for which performance metrics are to be computed. A plan may be devised by NPAS that, during the probing phase 704, results in metrics being computed for all the segments in the network. In addition to measurement of network performance, the map of the network can be used to perform fault isolation. In that case, the NPAS may devise a plan that selectively computes metrics over certain network segments in response to indications of network errors or performance degradation in order to identify a malfunctioning router, network segment, configuration, etc.

In 708, one or more of the router nodes determined in 706 may be configured to enable the router nodes to become tunnel termination endpoints. For example, a router node identified in 706 may be configured such that it becomes a termination endpoint for a tunnel. Various different tunneling protocols may be supported, for example, GRE (e.g., the router node is configured to become a GRE tunnel termination endpoint), MPLS over GRE (MPLSoGRE) (e.g., the router node is configured to be a MPLSoGRE tunnel termination endpoint), and others.

Multiple router nodes may be configured as tunnel termination endpoints in 708 corresponding to endpoints for multiple tunnels. A tunnel can be configured between a router node and a compute node. For example, a tunnel may be configured between a source compute node, where a probe packet is injected into the network, and a router node. As another example, a tunnel may be configured between a router node and destination compute node, which is the end destination of a probe packet. A tunnel may also be configured between two router nodes. A tunnel can traverse one or more segments of the communication network.

The tunnel termination endpoints configured in 706 enable the network and end-to-end paths traversed by a packet between compute nodes (e.g., from a source compute node to a destination compute node) to be broken down into smaller components. A probe packet can be configured at the point of ingestion (i.e., at the source compute node) to traverse a specific path from the source compute node to the destination compute node over one or more specific tunnels. The tunnels thus enable the path traversed by a probe packet during the probing phase to be controlled as desired. A tunnel can correspond to a segment of the end-to-end network path traversed by a packet from a source compute node to a destination compute node. By configuring the router nodes as tunnel termination endpoints, the router nodes can now be made the end points of specific tunnels.

In 710, one or more router nodes may be configured such that, for a probe packet received by a router node, the outgoing network interface or port used by the router node for communicating the packet from the router node can be controlled. For a router node, this is done by creating a mapping or association between a label and an outgoing interface or port of the router node. In certain implementations, the label is a locally-relevant to the router node, i.e., the label is unique to the router node for which the mapping is created. This allows the same label to be used for a label-to-interface/port mapping in other router nodes. For a router node, one or multiple such label-to-port mappings may be configured. As described below in detail, these labels can then be used for controlling which outgoing port of a router node is used to communicate a probe packet from the router node. This enables the path taken by a probe packet through the network to be precisely controlled and specified when the probe packet is injected into the network at the source compute node.

In certain implementations, the NPAS facilitates the configuration of label-to-port mappings for one or more router nodes. For example, via a GUI displayed by the NPAS, a user can select a router node from the multiple router nodes identified in 706 or select or input information identifying a label and an interface or port of the selected router node to be associated or mapped to the label. One or multiple such mappings may be configured for a router node. Information related to the mappings may be stored as part of label-to-port mapping information, which may be stored by the router node being configured and also stored by the NPAS. In certain implementations, the label-to-port mapping information may be stored and maintained by a control plane associated with the network.

The NPAS may have access to the label-to-port mapping information for the multiple router nodes that are configured. This information, may for example, be stored in a memory store (e.g., a database) accessible to the NPAS. When a particular router node is selected to be configured in 710, the NPAS may determine if any label-to-port mappings have previously already been configured for the router node. This information may be displayed to a user using the NPAS. The user may then determine if a new label-to-port mapping is to be created for the router node. If so, the NPAS may allow the user to select a locally-relevant label and a port of the router node to the mapped to the label. The label-to-port mapping information for the router node may then be updated to include this new mapping. The NPAS may then communicate the label-to-port mappings to the router node being configured such that the information is locally available on the router node. In some examples, configuration of locally-relevant label-to-port mappings on router nodes may be facilitated with one or more protocols including, for example, the Label Distribution Protocol (LDP) or the Tag Distribution Protocol (TDP). The NPAS may store information for the network including information identifying the compute nodes and router nodes in the network, and for each router node, the label-to-port mapping information, if any, for the router node.

After the network and the router nodes have been configured according to the processing performed in 702, in probing phase 704, based upon the configuration, probe packets can made to traverse a path between two compute nodes (from a source compute node to a destination compute node) where the path traverses multiple segments of the network and the path passes through at least one router node. The path traversed by a probe packet can be controlled (by, for example, a network engineer) by configuring a header of the probe packet. In certain implementations, the header is configured such that it comprises a section for each segment traversed by the path. Each header section corresponding to a network segment can be configured such that it causes the probe packet to traverse a specific segment of the network. In this manner, the entire path traversed by the probe packet from the source compute node to the destination compute node can be controlled via information configured in the header of the probe packet before the probe packet is injected into the network at the source compute node. Time measurements taken when the packet is injected into the network at the source compute node and when the packet is received at the destination compute node can then be used to compute performance metrics for one or more segments of the network paths traversed by a probe packet. In certain use cases, the source compute node and the destination compute node can be the same compute node.

At 712, based upon the configurations performed in 702 (e.g., based upon the tunnel termination endpoints and the label-to-port mappings), a probe packet is configured having a header where the header is configured to cause the probe packet to traverse a specific path in the network from a specific source compute node to a specific destination compute node and the path traverses specific segments of the network. A segment can be between a source compute node and a router node, between two router nodes, or between a router node and a destination compute node. The path traversed by the probe packet traverses multiple segments and one or more router nodes. The node at the start of a segment is referred to as the segment start node and the node at the end of the segment is referred to as the segment end node. Each segment can be characterized by its segment start node and segment end node.

In certain implementations, the probe packet header is configured such that it includes a section for each segment of the path traversed from the source compute node to the destination compute node, where the source compute node is the start node for the first segment and the destination compute node is the end node for the last segment. In certain cases, a segment can correspond to a tunnel and the end node for the segment is a node configured as the tunnel termination endpoint for the tunnel. The header section of the probe packet corresponding to such a tunnel segment can include information identifying the tunnel termination endpoint. In some other use cases, for a segment where a router node is a start node of the segment, the probe packet header may include a section for that segment where the section includes information identifying a label. In such a case, when the probe packet arrives at a router node that is the start node of the segment, the packet is forwarded from the router node using an outbound interface of the router node that is locally mapped to the label identified in the header section. In this manner, the tunnel termination endpoints and label-to-port mappings configured in 702 can be used to control the path traversed by a probe packet during the probing phase 702. Further examples of how a packet header can be configured to cause the probe packet to traverse specific paths are depicted in FIGS. 8A, 8B, 8C, 8D, 10, 11, 13A, 13B, 13C, 13D, and 13E, and the accompanying description.

In 714, as a result of the header configured for the probe packet, the probe packet traverses a path from the source compute node to the destination compute node, in which the path includes multiple segments and at least one router node. In some cases, the source compute node and the destination compute node can be the same compute node. The probe packet is made to traverse specific network segments corresponding to information configured in the probe packet header.

Different communication protocols may be used for communicating probe packets. These include, for example, without limitations, various IP protocols, various tunneling protocols (Internet Protocol Security (IPsec), IP-in-IP, Point-to-Point Tunneling Protocol (PPTP), Layer 2 Tunneling Protocol (L2TP), among others), GRE protocol, MPLS, and others.

In 716, based upon timing measurements taken when the probe packet is injected into the network at the source compute node and when the packet is received at the destination compute node, one or more performance metrics can be computed for one or more segments of the network path traversed by the probe packet. In this manner, a performance metric can be measured for a segment of the path, where the segment is between a compute node and a router node (e.g., the segment has a router node as its start node or its end node) or is a segment between two router nodes. Examples of performance metrics that may be computed for a network segment include network latency, packet loss, and jitter, among others.

In addition, the NPAS facilitates processing performed during the probing phase 704. For example, the NPAS may provide tools (e.g., GUIs, command-line interfaces) that enable a user of the NPAS to configure the contents of headers of probe packets. For example, the tool may enable the user to select the source and destination compute nodes for the path to be traversed by the probe packet and show the various segments for the path. The NPAS may then enable the user to configure (e.g., specify) a packet header with sections corresponding to the various segments, and for each segment, specify information in the header section for that segment that controls how the packet is to be routed for that segment.

The NPAS may also cause the source compute node and the destination compute node to take timing measurements when the packet in injected into the network at the source compute node and when the packet is received by the destination compute node. The timing measurements may be communicated by the source and destination compute nodes to the NPAS and the NPAS may then compute one or more performance metric values for one or more of the segments based upon the timing measurements.

Figure 8A:
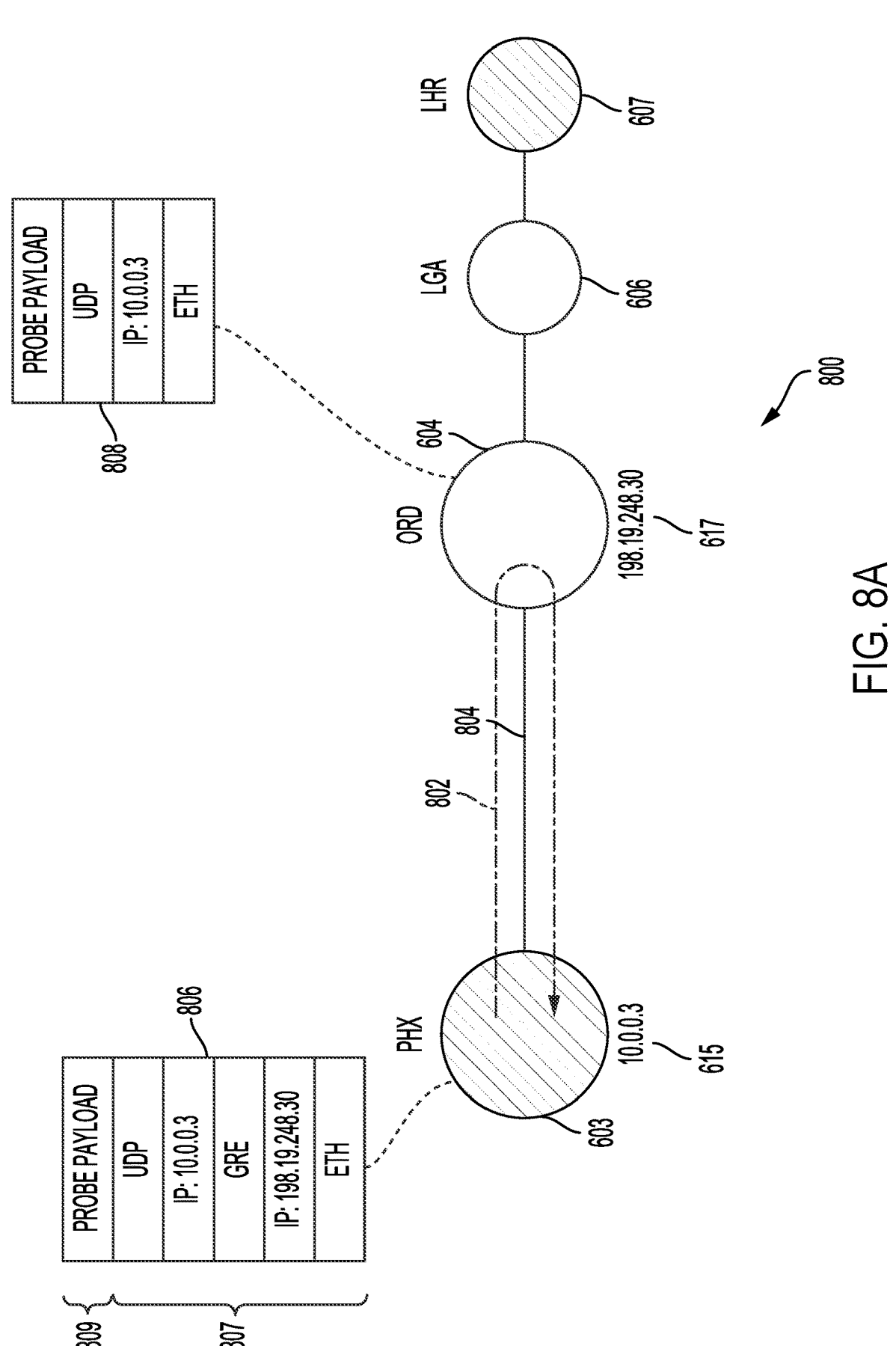
FIGS. 8A-D are simplified diagrams of a subnetwork that are a part of a larger example network that may implement one or more of the innovative techniques described in this disclosure, according to certain embodiments.

FIG. 8A is a simplified diagram of an example communications network 800 similar to the portion of the distributed environment 600 bounded by the line 613 in distributed environment 600 of FIGS. 6A-C. The communications network 800 is chosen for illustrative purposes and the principles and concepts discussed herein apply equally to all portions of the distributed environment 600. In FIG. 8A, a probe packet traversing a round-trip network path 802 including a compute node and a router node is depicted.

The round-trip network path 802 includes the network segment 804. A probe packet may be constructed at compute node 603 that defines the round-trip network path 802. In some examples, the probe packet may be constructed by an NPAS and sent to the compute node along with instructions to cause the probe packet to be sent. In some examples, the NPAS may send instructions to compute node 603 to cause the construction of a probe packet that will be used to make a particular performance measurement. Determination of times the probe packet is injected into the communications network and the time of receipt of the probe packet back at compute node 603 can allow for direct, first-order measurement of the network latency on network segment 804. Likewise, the use of multiple probe packets along round-trip network path 802 can allow for measurements of packet loss by calculating the ratio of the number of lost probe packets to the total number of sent probe packets. Or the use of multiple probe packets along round-trip network path 802 can allow for measurements of jitter by storing the values of network latency for multiple packets and calculating the variance or other suitable statistics to measure network jitter.

The compute node 603, or NPAS, can generate a probe packet, for example, packet 806. Packet 806 includes both packet headers 807 and a probe payload 809. Packet headers 807 include header information that define the network path the probe packet will follow. Header information may include one or more header sections. The packet headers 807 in FIG. 8A and subsequent drawings are a schematic of the information contained in an example packet on a packet-switched network and not intended to be an authentic representation of the data contained in a network packet.

Packet headers 807 may also include tunneling headers illustrating, for example, an IP tunnel. For example, an IP packet can include an outer IP header, a tunnelling header, and an inner IP header. The inner IP header may be the header of an inner IP packet that includes a data section which includes additional transport-layer information. In some examples, the tunnelling header may be a GRE header, but other tunnelling protocols may be used.

In packet 806, the ETH frame header includes an IP packet. An IP packet is a packet configured for routing using the Internet Protocol version 4 (IPv4). The IP packet contains a header and a data section. The IP packet is represented in packet 806 by an IP header including an IP address indicating the destination of the packet which is included in the header of the IP packet. For example, an IP packet may be represented as an IP header labeled "IP: 198.19.248.30." The IP packet is followed by a GRE tunnel header, represented in packet 806 by the letters "GRE." The GRE header is followed by another inner IP header, represented in FIG. 8A by a different IP address. The inner IP packet also has a header and a data section which includes additional routing information. In this case, the inner IP packet includes a Universal Datagram Protocol (UDP) datagram. The UDP datagram data section also includes the probe payload 809. The probe payload 809 may include information needed to perform performance measurements.

In FIG. 8A, the source compute node is compute node 603 and the destination compute node is likewise compute node 603. The network path 802 begins at compute node 603, traverses network segment 804 to router node 604, and then returns to destination compute node 603. There is one network segment 804 in network path 802 that is traversed twice, once on the outgoing leg and once on the returning leg. The start node of network segment 804 on the outgoing leg is compute node 603 and the end node is router node 604. Likewise, on the return leg of network path 804, the start node is router node 604 and the end node is compute node 603.

The compute node 603 can inject the probe packet 806 into the network. In some examples, the probe packet 806 may be instantiated and configured by an NPAS and send to the compute node 603 for injection. Based on the outer IP packet in packet header 807, the packet 806 will traverse the network segment 804 and be received by the router node 604. The router node 604 may remove the outer IP header and the GRE header, using the GRE tunnel termination endpoint, and examine the information contained therein. In this case, the GRE tunnel header precedes another IP packet, the inner IP packet discussed above. Router node 604 may then route the inner IP packet, now represented by packet 808. As with packet 806, packet 808 includes an ETH frame header that includes the inner IP packet. The inner IP packet specifies the IP address of the compute node 603. In its data section, the inner IP packet includes the same UDP datagram and probe payload discussed with respect to packet 806. Router node 604 routes the packet 808 back to the compute node 603. Compute node 603 may then use the information contained in the probe payload 809 to calculate one or more performance metrics, as will be discussed in detail in FIG. 9.

FIG. 8A depicts a round-trip network path 802 performance measurement made without the use of labels at the router node 604. However, the measurement is only possible because of the tunnel termination endpoint configured at router node 604. Thus, this illustration shows that the innovative performance measurements over network segments containing a router node and compute node do not require the use of locally-relevant labels at the router node in some cases. However, the use of locally-relevant labels does allow for specification of a particular physical path, which may lead to more accurate or reproducible performance measurements.

Figure 8B:
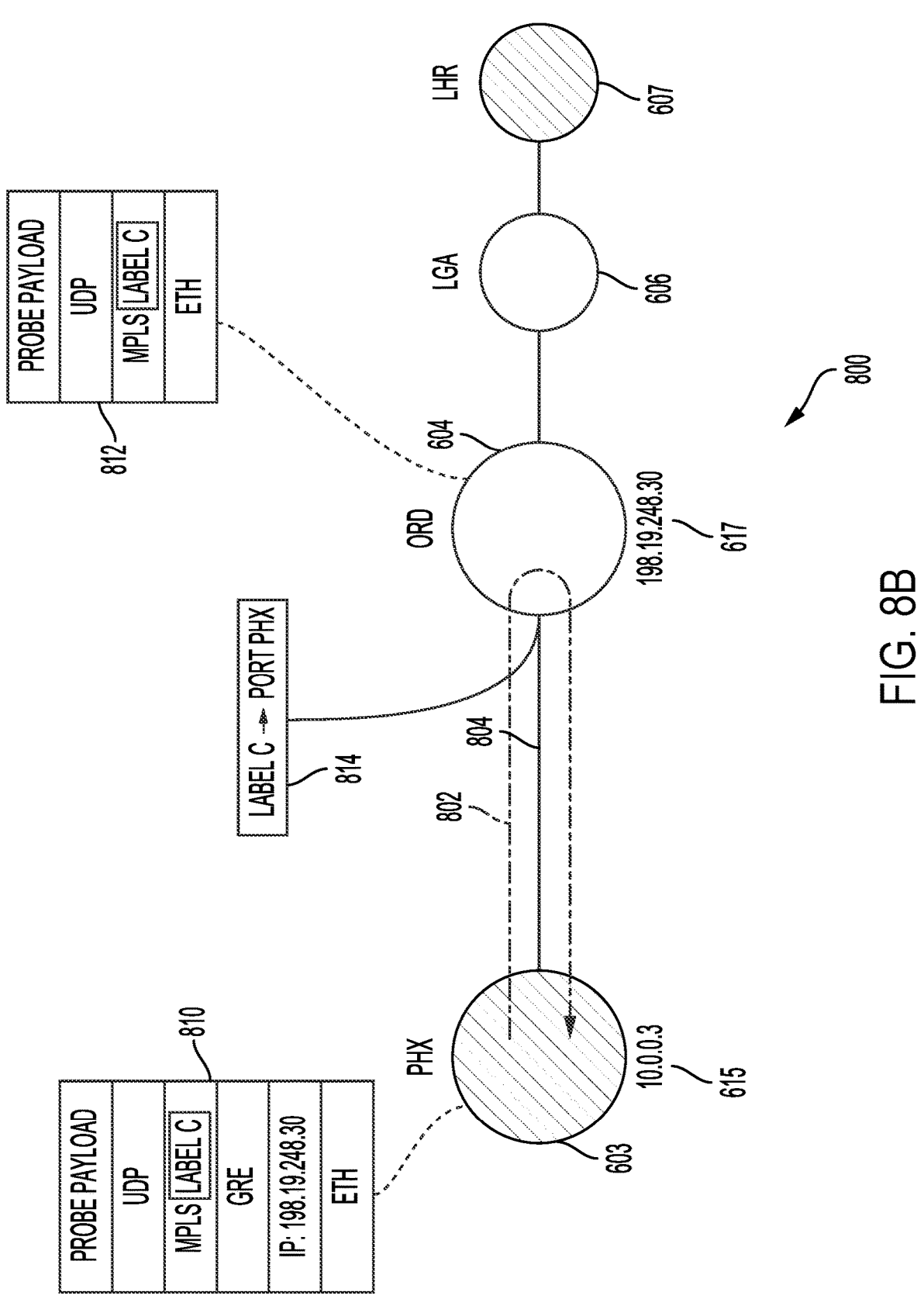
Figure 8C:
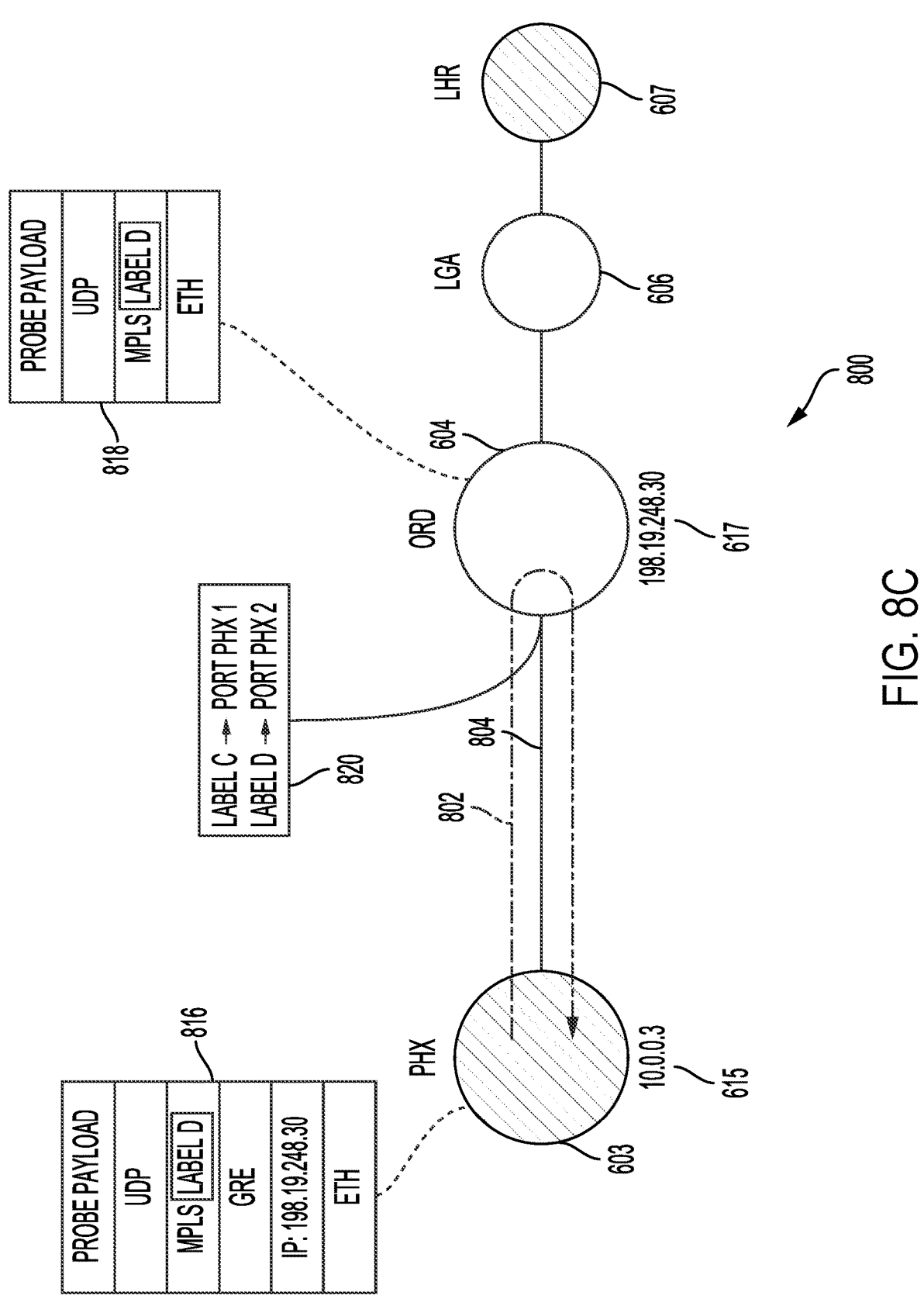

FIGS. 8B and 8C illustrate performance measurements over the same network segment 804 utilizing both the tunnel termination endpoint configuration and label-to-port mapping information at the router node. Performance measurements made using the technique of FIG. 8A and FIGS. 8B-C may yield different results. Unlike the use of label-to-port mapping information in FIGS. 8B-C, which correspond to a particular physical connection between the compute node 603 and the router node 604, the IP-switched packets 806 and 808 need only traverse the logical network segment between compute node 603 and router node 604. The logical network segment may include any physical network path between the compute node 603 and the router node 604 with a suitable IP route according to factors such as the configuration of the routers in the network, network traffic, and other factors. However, as routing protocols are often optimized for efficiency, in practice, performance measurements across single-hop or short network paths may be quite similar using either technique.

FIG. 8B, a probe packet traversing a round-trip network path 802 including a compute node 603 and a router node 604 is depicted. In FIG. 8B, the source compute node is compute node 603 and the destination compute node is likewise compute node 603. The network path 802 begins at compute node 603, traverses network segment 804 to router node 604, and then returns to destination compute node 603. There is one network segment 804 in network path 802 that is traversed twice, once on the outgoing leg and once on the returning leg. The start node of network segment 804 on the outgoing leg is compute node 603 and the end node is router node 604. Likewise, on the return leg of network path 804, the start node is router node 604 and the end node is compute node 603. The compute node 603, or other suitable device, may generate the packet 810, which follows the same conventions of packet 806 in FIG. 8A. However, the GRE header of packet 810 precedes MPLS routing information. This is represented by the letters "MPLS" followed by a label name in a box in packet 810 depicted in FIG. 8B. The label contained in packet 810 corresponds to the locally-relevant label-to-port mapping 814 configured in router node 604. The label-to-port mapping 814 illustrates a label-to-port mapping from "LABEL C" to egress port "PORT PHX," referring to the physical link between router node 604 and compute node 603. The compute node 603 may inject the packet 810 into the network. The tunnel termination endpoint configured at router node 604 may remove the GRE header and route the resulting GRE payload, packet 812, back to the compute node 603. In this example, the ETH frame header contains an MPLS routing header that specifies "LABEL C," which corresponds to the label-to-port mapping 814. The packet 812 will traverse the network segment 804 along the physical link connecting the egress port designated by "PORT PHX" to compute node 603. Upon receipt of compute node 603 of packet 812, the compute node 603 may direct the probe payload to a suitable handler according to the port specified in the UDP datagram and calculate a performance metric according to the information in the probe payload.

FIG. 8C, a probe packet traversing a round-trip network path 802 including a compute node 603 and a router node 604 is depicted. In FIG. 8C, the source compute node is compute node 603 and the destination compute node is likewise compute node 603. The network path 802 begins at compute node 603, traverses network segment 804 to router node 604, and then returns to destination compute node 603. There is one network segment 804 in network path 802 that is traversed twice, once on the outgoing leg and once on the returning leg. The start node of network segment 804 on the outgoing leg is compute node 603 and the end node is router node 604. Likewise, on the return leg of network path 804, the start node is router node 604 and the end node is compute node 603. FIG. 8C depicts a network traversal similar to the packet 810 in FIG. 8C and is routed by router node 804 using an MPLS routing header using decapsulated packet 818.

However, the locally-relevant label-to-port mappings 820 of label to egress port contain two possible labels/egress ports. In this example, the route defined in packet 816 specifies the label "LABEL D" which corresponds to the egress port designated by "PORT PHX2." FIG. 8C thus illustrates that two physical paths along the same network segment 804 can be probed by specifying the physical path using GRE-encapsulated label-based routing. In the event of a network failure along network segment 804, packets could be generated defining routes including both egress ports "PORT PHX1" and "PORT PHX2" that could then be injected to isolate the fault to a particular egress port or physical path. Such packets would be identical except for the MPLS label contained in packets 816, 818.

Figure 8D:
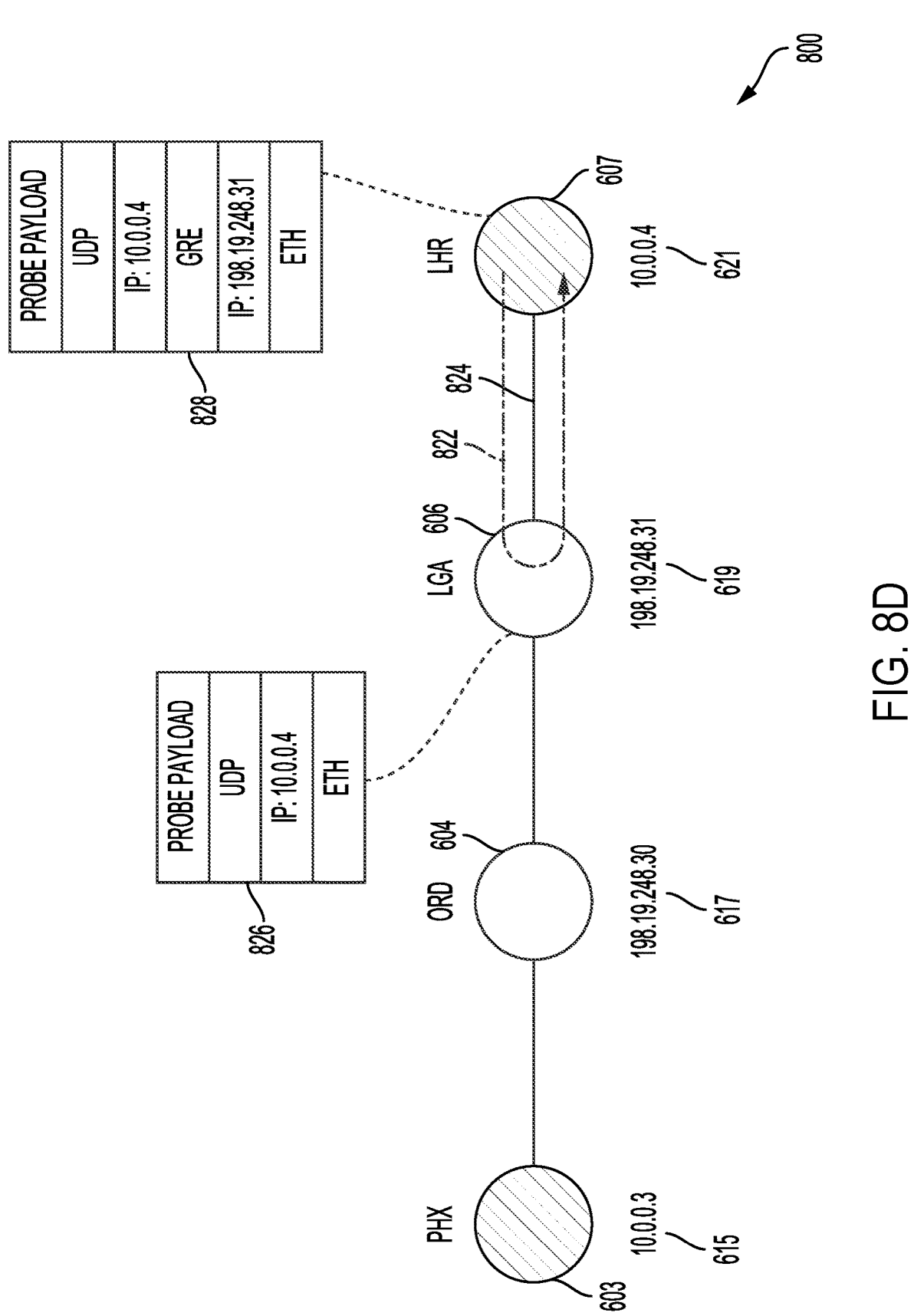

FIG. 8D is a simplified diagram of the communications network 800 comprising the portion of distributed environment 600 bounded by the line 613 of FIGS. 6A-C. FIG. 8D illustrates the same routing principles illustrated in FIG. 8A, specifically a round-trip network path 822 performance measurement over network segment 824 made without the use of labels at the router node 606. In FIG. 8D, the source compute node is compute node 607 and the destination compute node is likewise compute node 607. The network path 822 begins at compute node 607, traverses network segment 824 to router node 606, and then returns to destination compute node 607. There is one network segment 824 in network path 822 that is traversed twice, once on the outgoing leg and once on the returning leg. The start node of network segment 824 on the outgoing leg is compute node 607 and the end node is router node 606. Likewise, on the return leg of network path 824, the start node is router node 606 and the end node is compute node 607. The compute node 607 injects packet 828, which is decapsulated to packet 826 at router node 606. Router node 606 routes packet 826 back to compute node 607. Compute node 607, or another suitable computing device, may use the contents of the probe payload or other stored data to calculate performance metrics associated with network segment 824. In addition to illustrating the universality of the concepts from FIG. 8A, FIG. 8D includes a network path that will be used to illustrate an indirect, third-order performance measurement calculation in FIG. 10.

Figure 9:
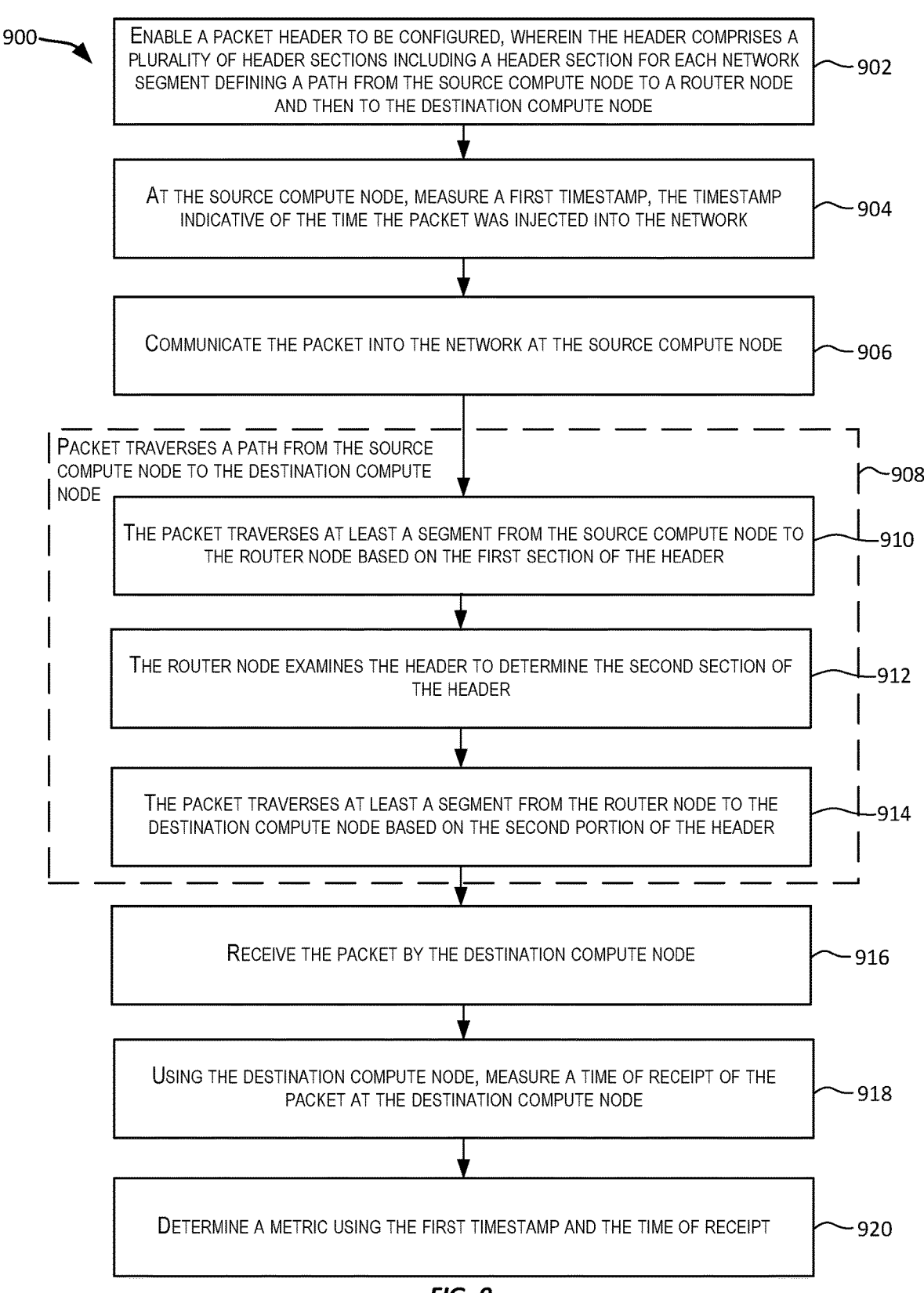
FIG. 9 depicts a simplified flowchart showing methods for making network path performance measurements utilizing multi-layer tunneling techniques in some subnetworks, according to certain embodiments.

FIG. 9 depicts a simplified flowchart 900 showing methods for making performance measurements to be made for segments of a communication network by utilizing multi-layer tunneling techniques in communications networks similar to the example communications networks 800 in FIGS. 8A-D. The methods depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the processing may be performed in some different order, or some steps may also be performed in parallel. One or more of the processing steps depicted in FIG. 9 and described below may be performed or facilitated by NPAS 620 depicted in FIG. 6A.

At 902, the NPAS 620 or the source compute node can enable a first packet header to be configured for a first packet to cause the first packet to traverse a path from a source compute node to a destination compute node. The path may traverse a communication network, e.g., example communications network 800, comprising a set of one or more router nodes, the path comprising a plurality of network segments including a first segment, the set of router nodes having a first router node. The first packet header may comprise a plurality of header sections including a header section for each segment in the path, the plurality of header sections comprising a first header section corresponding to the first segment, the first header section storing information indicative of a manner for routing the packet for the first segment. For example, the NPAS 620 can configure a packet including a header, similar to the packet 806. The source compute node may be triggered by an NPAS or by locally-executing program code. For example, the source compute node may contain program code that executes periodically according to a pre-determined schedule. Or the NPAS may send instructions to the source compute node to construct and inject packets as needed to conduct performance measurements of the network. Such instructions may specify which network segments to probe, particular network paths, or which performance measurements to conduct, among other possible instructions. In this example, the flowchart 900 describes construction of a packet for traversing a network path similar to the one depicted in FIGS. 8A-D including at least one compute node and one router node.

At 904, the source compute node measures a first timestamp indicative of the time the packet was or is to be injected into the network. The timestamp may be sent to the NPAS 620 for short-term storage in a memory device or stored locally at the source compute node. The NPAS 620 may contain program code describing the metric to be calculated. Performance over network segments can be measured directly or indirectly. A direct measurement includes defining a path that includes a network segment including at least one router node and calculating the time the probe packet takes to traverse that network segment or measuring packet loss across that segment. The measurement is made directly in the sense that the metric determined corresponds to the network property under measurement and is not a derived quantity requiring, for instance, additional measurements or data to compute. For example, the time a probe packet takes to traverse a network segment including one compute node and one router node may be directly measured. In this example, the probe packet contains header information that specifies that the probe packet traverse the segment from the compute node to the router node, and then immediately return to the compute node. The examples considered in FIGS. 8A-8D and 9 are examples of direct, or first-order, performance measurements.

In contrast, an indirect measurement includes defining a first network path that includes a network segment containing at least one router node and calculating the time a probe packet takes to traverse the first network path or packet loss along the first network path. Additional probe packets may be constructed and injected that include a portion of that first network path, and metrics for the probe packets traversing the portion of the first network path can be calculated. A performance metric for a network segment included in the first network path can be calculated, for example, by subtracting the traversal times for the network path portion from the traversal time for the first network path. An indirect measurement including two probe packets is called a second-order measurement, an indirect measurement including three probe packets is called a third-order measurement, and so on. For example, for a network path including a compute node and two router nodes, a second-order, indirect performance metric for the segment including the two router nodes can be calculated by measuring the round-trip traversal time for the entire network path and subtracting from it the round-trip traversal time for the portion of the path including the compute node and the first router node. In general, an "n"th-order metric refers to the number of packets that are required to calculate the metric. Examples of indirect second-order performance measurements will be discussed below in FIGS. 11 and 12. Examples of indirect third-order performance measurements will be discussed below in FIG. 10.

For example, a first-order metric is directly measured and may only require calculating the difference between the time of receipt of the packet at a destination compute node and the timestamp, whereas a second- or higher-order metric may require the receipt of additional information from other network locations to calculate the metric. In some examples, probe packets may be used to calculate a plurality of metrics. For example, a probe packet may be used for calculating network latency and may also contribute to the calculation of packet loss and jitter measurements, by belonging to a collection of probe packets.

The timestamp is indicative of the time the packet is to be injected into the network. Since the timestamp cannot be added after the packet is communicated to the network at 906, the timestamp is necessarily indicative of a time immediately before injection into the network. Since network latency measurements are likely to be on the order of milliseconds, the timestamp may be added immediately before network injection so as to minimize the introduction of measurement error due to delays injecting the packet. In some examples, packets are injected using an agent program running on the compute nodes. In some examples, router nodes may not be used for probe injection because they are not configured to inject packets, determine times associated with the packets, or perform latency or other metrics calculations based upon the packets.

Dashed box 908 includes the portions of the method whereby the packet traverses a path from the source compute node to the destination compute node. At 910, the packet traverses at least a network segment from the source compute node to the router node based on the first section of the header. In some examples, traversal of this first segment from compute node to router node will made be according to the IP protocol. For example, packet header 807 illustrates the first network segment being traversed according to the IP protocol in the first section of the header. In some embodiments, other network-layer protocols may be used, such as Internetwork Packet Exchange (IPX) or Internet Protocol Security (IPSec). The chosen network-layer protocol may be followed by a tunnelling protocol header, such as GRE, that may be removed by the router node if it is configured as a tunnel termination endpoint.

At 912, the router node receives the packet and examines the header to determine the second section of the header. For example, the first section of the header may be an IP protocol header that precedes a GRE header. The router node receives the packet from the source compute node. The router node may proceed to examine the sections of the header following the outer IP protocol header. The outer IP header may be followed by a GRE header and may contain a GRE tunnel payload. Since the router node has been configured to be a GRE tunnel endpoint, in some examples, the GRE packet payload may be decapsulated and extracted. The GRE payload may itself be, for example, another IP packet or a label-routed packet. This capability effectively makes the router nodes act as probe packet relay agents, allowing certain packet loss and round-trip time metrics to be measured using such tunneled probes.

At 914, the packet traverses the segment from the router node to a destination compute node based on the section of the packet header decapsulated in 912. In FIGS. 8A-D, the source compute node and the destination compute node were the same. In FIGS. 8A and 8D, the GRE payload was another IP packet which was subsequently routed back to the source compute node.

In FIGS. 8B and 8C, the GRE payload was an MPLS routing header which was subsequently routed back to the source compute node. Use of MPLS routing when routing packets away from router nodes ensures that the packet traverses a specific physical path, whereas use of other protocols, like the IP protocol, does not. In the case where the destination compute node is not the same as the source node, a second-order metric may be needed to measure network performance along network segments making up even very simple network paths.

At 916, the packet is received by the destination compute node, which may, as mentioned previously, be the same as the source compute node. The destination compute node may extract the probe payload from the packet. At 918, the destination compute node may determine the time of receipt of the packet at the destination compute node. As with the timestamp, the time of receipt determined should be as close as possible to the actual time of receipt, to minimize the introduction of measurement error.

The destination compute node or the NPAS may calculate a direct, first-order metric at 920. In some examples, the first, first-order metric may include the difference between the time of receipt of the packet at the destination compute node and the timestamp. That difference represents the round-trip time from the source compute node to the destination compute node. In the examples of FIGS. 8A-D, that difference divided by 2 may be indicative of the one-way transit time between the source/destination compute node and the router node. Alternatively, packet loss may be estimated by counting the packets sent over a particular time or belonging to a particular collection of packets and dividing the number of packets lost (packets that never arrived) by the total number of packets sent.

However, such measurements are only an estimate of performance, since difference physical paths may have been traversed in either direction and because the state of the network may have changed even during the short time between the traversal from the source compute node to the router node, and the traversal from the router node back to the source compute node. Thus, performance measurements across the entire network may include performance measurements of network segments using multiple methods. For example, performance across a network segment may be measured using both a first- and second-order metric to determine the accuracy of those measurements and to confirm the location of network problems. Certain embodiments may calculate the average or other comparable statistic of metric measurements across network segments made using various network paths or calculations to estimate the performance of the network. The innovations of the present disclosure serve to, in part, minimize measurement errors by specifying particular physical paths between network segments.

Figure 10:
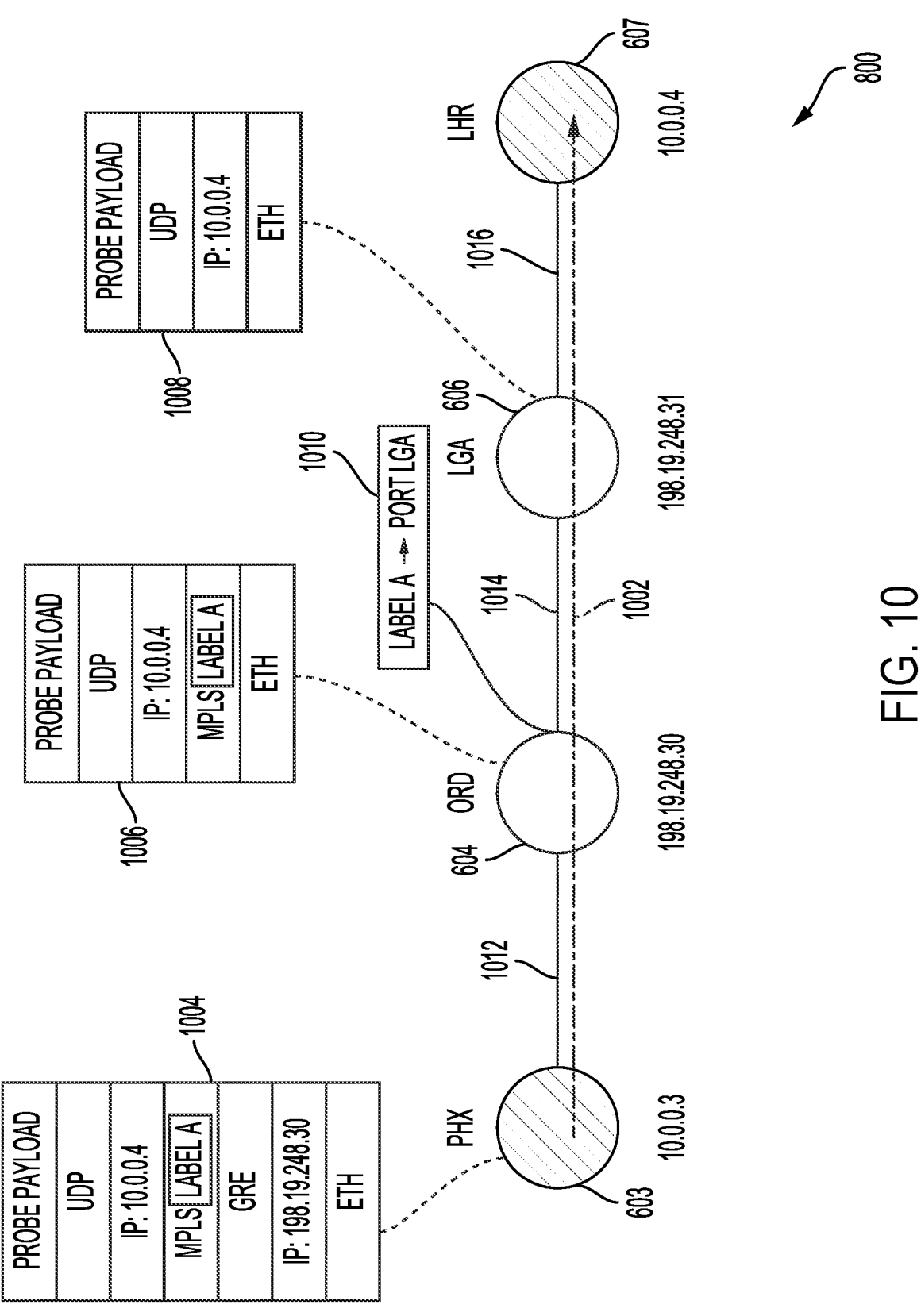
FIG. 10 is a simplified diagram of a subnetwork that is a part of a larger example network that may implement one or more of the innovative techniques described in this disclosure, according to certain embodiments.
Figure 11:
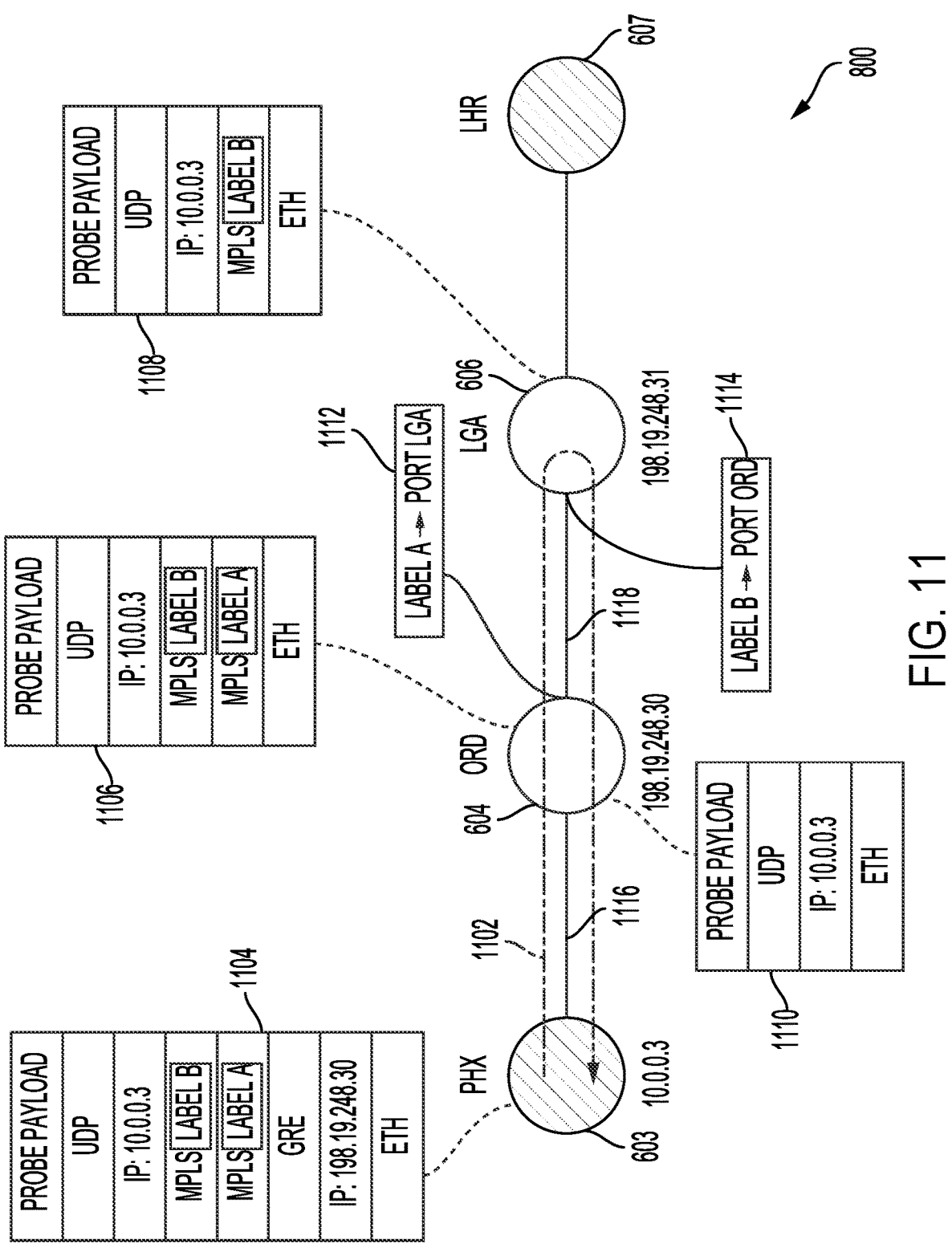
FIG. 11 is a simplified diagram of a subnetwork that is a part of a larger example network that may implement one or more of the innovative techniques described in this disclosure, according to certain embodiments.

Turning now to FIGS. 10-12, examples of indirect, higher-order metric calculations will be given. FIG. 10 is a simplified diagram of the communications network 800 included in the portion of distributed environment 600 bounded by the line 613 FIGS. 6A-C. The communications network 800 is chosen for illustrative purposes and the principles and concepts discussed herein apply equally to all portions of the distributed environment 600.

In FIG. 10, a probe packet traversing a network path 1002 from source compute node 603, through two router nodes 604, 606, to destination compute node 607 is depicted. Measurements along network path 1002 may be used with other metrics to calculate second- and higher-order performance metrics. In FIG. 10, the source compute node is compute node 603 and the destination compute node is compute node 607. The network path 1002 includes network segments 1012, 1014, and 1016. The start node of network segment 1012 is compute node 603 and the end node is router node 604. The start node of network segment 1014 is router node 604 and the end node is router node 606. The start node of network segment 1016 is router node 606 and end node is compute node 607.

Source compute node 603 constructs or receives from the NPAS a packet 1004 to define network path 1002, including adding a timestamp to the probe payload indicative of the time of injecting packet 1004 into the network. The packet 1004 traverses network segment 1012 according to the header of packet 1004 that specifies IP protocol routing between source compute node 603 and router node 604. Router node 604 remove the GRE header preceded by the outer IP header of IP packet 1004, which includes a GRE payload including a packet 1006 with an MPLS routing header. The packet 1006 is routed by router node 604 according to the MPLS label in packet 1006 header using the locally-relevant label-to-port mapping information 1010. The label-to-port mapping information 1010 specifies a physical path between router node 604 and router node 606 along network segment 1014. Router node 606 examines the header of packet 1006 and removes the MPLS label, exposing IP packet 1008. Router node 606 routes packet 1008 to destination compute node 607 along network segment 1016 using IP routing, completing the traversal of network path 1002.

Upon receipt of the packet 1008, destination compute node 607 determines the time of receipt of the packet 1008 and can calculate a metric using the timestamp and the time of receipt. The metric represents the network traversal time, or network latency, between source compute node 603 and destination compute node 607. Other metrics may be calculated including, for example, packet loss. To calculate packet loss, a plurality of probe packets can be sent from source compute node 603 to destination compute node 607. Packet loss equals the ratio of the number of lost probe packets that never arrive at destination compute node 607 to the total number of sent probe packets. The plurality of probe packets may be sent as a collection including, for example, a collection identifier in the probe payload. Or a specified number of probe packets may be sent by compute node 603 during a first specified window of time and counted by destination compute node 607 for a second specified window of time to calculate packet loss. Similar techniques may be used to calculate network jitter.

The metric representing network path traversal time between source compute node 603 and destination compute node 607 can be used to calculate an indirect, third-order metric representing the network latency between router nodes 604 and 606. Upon calculating the overall metric associated with network path 1002, the destination compute node 607 or NPAS may receive calculated metrics associated with network paths 802 and 822 from FIGS. 8A-D. The calculated metrics may be received from the NPAS, from another compute node, or may be stored at destination compute node 607 from previous operations. In some examples, the destination compute node 607 may send the data necessary for metric calculations to, for example, an NPAS and perform no calculations locally.

The third-order metric representing the network latency between router nodes 604 and 606 can be calculated by first dividing the traversal times of network paths 802 and 822 by two, since the calculated metric for network segment 1014 represents the one-way traversal time of network segment 1014, whereas the calculated metrics associated with the traversal time of network paths 802 and 822 are round-trip times. The halved times associated with the traversal time of network paths 802 and 822 may be subtracted from the network path 1002 traversal time between source compute node 603 and destination compute node 607 to obtain an estimate of the network segment 1014 traversal time between router nodes 604 and 606. This calculation represents the packet travel time along the physical path specified by the label-to-port mappings 1010, including the egress port "PORT LGA." The estimate may include some uncertainty as a result of the inability to specify a physical path between the router nodes and compute nodes, where IP routing is used. In some cases, the traversal time along the network segment 1014 may differ depending on the direction of traffic or depending on the particular physical connection specified in probe packets 1004, 1006, 1008.

A third-order metric representing packet loss between router nodes 604 and 606 can be similarly calculated by first dividing the packet losses associated with network paths 802 and 822 by two, since the calculated packet loss metric for network path 1002 stems from the one-way traversal of network path 1002, whereas the calculated packet loss metrics associated with the traversal of network paths 802 and 822 are round-trip traversals. The halved packet losses associated with the traversal of network paths 802 and 822 may be subtracted from the packet loss over the network path between source compute node 603 and destination compute node 607 to obtain an estimate of the network segment 1014 packet loss between router nodes 604 and 606. In essence, packet loss along network segment 1014 is equal to overall packet loss along network path 1002 minus contributions to this packet loss from network segments 1012 and 1016. This calculation represents the packet loss along the physical path specified by the label-to-port mappings 1010, including the egress port "PORT LGA." The estimate may include some uncertainty as a result of the inability to specify a physical path between the router nodes and compute nodes, where IP routing is used.

FIG. 11 is a simplified diagram of the communications network 800 included in the portion of distributed environment 600 bounded by the line 613 of FIGS. 6A-C. The communications network 800 is chosen for illustrative purposes and the principles and concepts discussed herein apply equally to all portions of the example network 600. In FIG. 11, a probe packet traversing a round-trip network path 1102 from source compute node 603, through two router nodes 604, 606, and back to source compute node 603 is depicted. In FIG. 11, the source compute node is compute node 603 and the destination compute node is likewise compute node 603. The network path 1102 includes network segments 1116 and 1118, each traversed twice on a round-trip path. The start node of network segment 1116 on the outgoing leg is compute node 603 and the end node is router node 604. The start node of network segment 1118 on the outgoing leg is router node 604 and the end node is router node 606. The start node of network segment 1118 on the return path is router node 606 and end node is router node 604. The start node of the network segment 1116 on the return path is router node 604 and the end node is compute node 603.

Source compute node 603 constructs a packet 1104 to define network path 1102, including adding a timestamp to the probe payload indicative of the time of injecting packet 1104 into the network. The packet 1104 traverses network segment 1116 according to the header of packet 1104 that specifies IP protocol routing between source compute node 603 and router node 604. Router node 604 removes the GRE header following the outer IP header of IP packet 1104, which includes a GRE payload including a packet 1106 with an MPLS routing header. The packet 1106 is routed by router node 604 according to the MPLS label in packet 1106 header using the locally-relevant label-to-egress port mappings 1112. The label-to-port mappings 1112 specify a physical path between router node 604 and router node 606 along network segment 1118. Router node 606 examines the header of packet 1106 and removes or "pops" the first MPLS label, resulting in packet 1108. Router node 606 routes packet 1108 back to router node 604 along network segment 1118 according to the MPLS label in packet 1108 header using the locally-relevant label-to-port mapping information 1114. Router node 604 examines the header of packet 1108 and removes the MPLS label, exposing IP packet 1110. Router node 604 routes packet 1110 to source compute node 603 along network segment 1116 using IP routing, completing the traversal of network path 1102.

As with the network path 1102 depicted in FIG. 10, calculation of direct, first-order metrics relating to the network path 1102 is possible. For example, the network latency and packet loss along network path 1102 may be calculated by source compute node 603 or elsewhere at, for example, the NPAS. The computation of second-order metrics may be possible as well. The source compute node 603 may receive calculated first-order metrics associated with the network latency or packet loss of round-trip network path 802 from FIGS. 8A-C. The calculation of network latency or packet loss between router nodes 604 and 606 along network segment 1118 may be accomplished by subtracting the traversal time or packet loss of measured from network path 802 from the metrics calculated along network path 1102. In this example, the calculated first-order metrics associated with the network latency or packet loss of round-trip network path 802 do not need to be halved because network path 1102 is itself a round-trip. However, in some cases, the physical path from router node 604 to router node 606 may differ from the reverse physical path from router node 606 to router node 604. In that case, additional measurements may be needed to accurately measure network metrics in both directions. In order for the second-order metrics associated with network segment 1118 calculated using the methods described to be most accurate, the same physical path along network segment 1118 should be used.

Figure 12A:
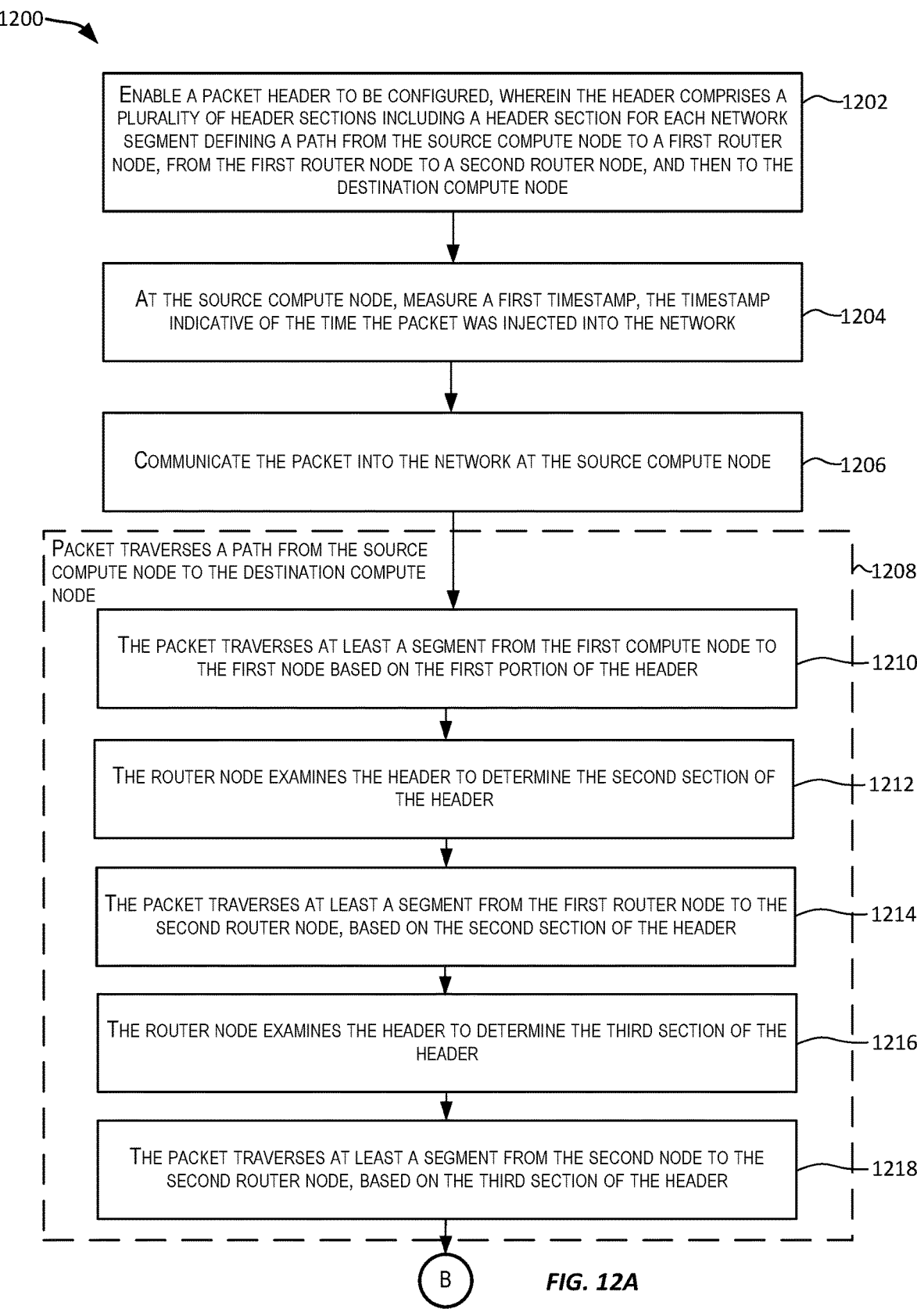
FIGS. 12A-B depict a simplified flowchart showing methods for making network path performance measurements utilizing multi-layer tunneling techniques in some subnetworks, according to certain embodiments.
Figure 12B:
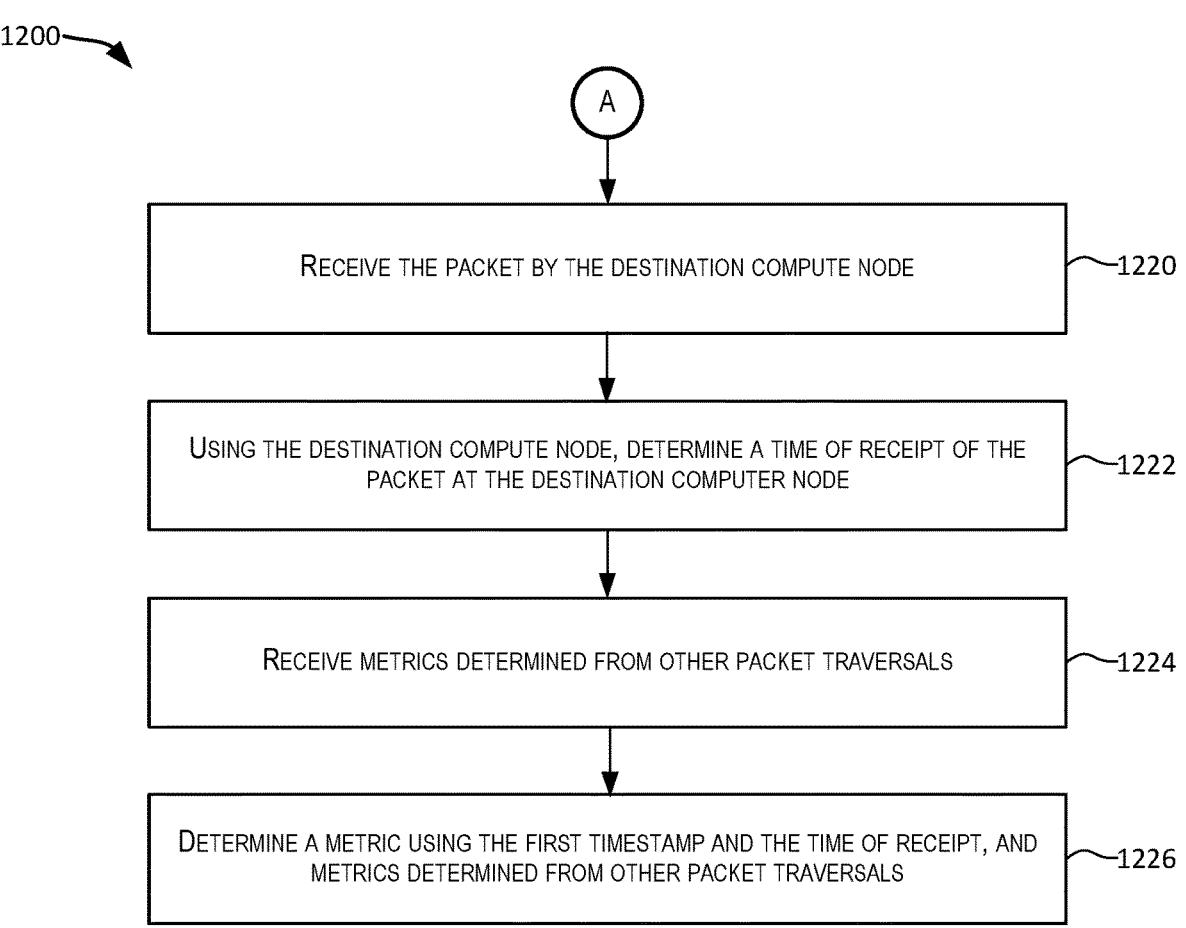

FIGS. 12A-B depict a simplified flowchart 1200 showing methods for making performance measurements to be made for segments of a communication network by utilizing multi-layer tunneling techniques in a communications network similar to the communication network 800 in FIG. 10. The methods depicted in FIGS. 12A-B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 12A-B and described below is intended to be illustrative and non-limiting. Although FIGS. 12A-B depicts the various processing steps occurring in a particular sequence or order, this is not intended to be limiting. In certain alternative embodiments, the processing may be performed in some different order, or some steps may also be performed in parallel. One or more of the processing steps depicted in FIGS. 12A-B and described below may be performed or facilitated by NPAS 620 depicted in FIG. 6A.

FIGS. 12A-B illustrates a simple example of calculating a third-order, indirect performance measurement, but the methods are equally applicable to second- or other higher-order calculations. At 1202, the NPAS 620 may enable a packet header to be configured, wherein the including a header with at least three sections. As with method 900, the header sections correspond to network segments defining a path. In this example, the network path proceeds from the source compute node to a first router node, from the first router node to a second router node, and then to the destination compute node. This network path will enable calculation of one portion of the metrics needed for the third-order calculation. As calculation of a higher-order metric requires inputs from other metric calculations, triggering of the methods in FIGS. 12A-B may require additional coordination and may be initiated by the NPAS 620. Alternatively, in some examples, the calculation of higher-order metrics may be initiated and coordinated by one or more compute nodes, by or among themselves.

The header is similar to the header of packet 1004 from FIG. 10. The first header section may include a path from a source compute node to a first router node. The first header section may use, for example, the IP protocol or any other protocol for causing the packet to reach the first router node. Some network-layer protocols, such as the IP protocol, may not guarantee a particular physical path between the source compute node and the first router node and may thus be a source of error in performance measurements. In some examples, the source compute node may be chosen with a minimum number of network segments between it and the first router node to minimize this error. In some examples, a network layer protocol may be chosen to guarantee a specific physical path. For example, MPLS routing may be used between the source compute node and the first router node to guarantee a specific physical path. The second section of the header may be encapsulated inside a GRE header and include a path definition from the first router node to a second router node. The path definition may use label-based routing to require a specific physical path from the first router node to the second router node. The third section may define a path from the second router node to the destination compute node. As with the first section, any network-layer protocol may be used including, for example, the IP protocol.

At 1204 and 1206, the source compute node measures a timestamp prior to injecting the packet configured in 1202 into the network. In some examples, packets are injected using an agent program running on the compute hosts. In some examples, router nodes may not be used for probe injection because they do not have the compute resources to run the probe injection agent. The traversal of the network by the path defined in the probe packet header in 1202 is included in dashed box 1208. At 1210, the packet traverses the first network segment from the source compute node to the first router node. At 1212, the first router node examines the header to determine the second section of the header. For example, the second section may be GRE header that includes a GRE payload to be decapsulated by the first router node. At 1214, the first router node routes the packet to the second router node according to the second section. In this example, the second section may utilize label-based routing to ensure a specific physical path from the first router node to the second router node is traversed for the purposes of accurate performance measurements. At 1216, the second router node examines the header to determine the third section of the header and at 1218 the second router node routes the packet to the destination compute node.

Upon receipt of the packet at the destination compute node at 1220, the destination compute node may extract the probe payload from the packet. At 1222, the destination compute node may determine the time of receipt of the packet at the destination compute node. As with the time-stamp, the time of receipt determined should be as close as possible to the actual time of receipt, to minimize the introduction of measurement error. The destination compute node can send the packet receipt timestamp to the NPAS for metric calculation. In some embodiments, the calculation of performance metrics may occur at the destination compute node. The NPAS may then, at 1224, receive metrics determined from other packet traversals. In this example, for the calculation of the third-order metrics involving the network segment between the first router node and the second router node, metrics for the first and third network segments, between the source compute node and the first router node, and the second router node and the destination compute node, respectively, may be required. The metrics may be received by or from an NPAS, from other compute nodes, or other suitable location for calculation and storage of performance metrics.

At 1226, the third-order metric is calculated using first the timestamp and time of receipt of the packet at the destination compute node, along with the two metrics received for other network segment traversals, as is discussed in the description of FIG. 10. Alternatively, third-order packet loss may be calculated using the packet loss for the network path from method 1200 along with packet loss for the other two network segments, as is also discussed in the description of FIG. 10. Calculation of other metrics may be possible. For example, in certain embodiments, network jitter may be calculated. In the context of networking, jitter may be defined as variations in network latency across a particular network segment. Calculation of jitter may be affected using the method 1200 or other methods of this disclosure by calculating multiple latency measurements in series and comparing the variation.

The destination compute node, or other suitable compute resource for metric calculation, may send the calculated metrics to the NPAS for processing. In certain embodiments, the NPAS may receive metric calculations from a variety of compute sources and prepare one or more visualizations or reports. For example, using the innovations of the present disclosure, network latency or packet loss between router nodes may be added to charts or heatmaps that allow network administrators to quickly see where network failures may be occurring.

Turning now to FIGS. 19A-B, FIGS. 19A-B depict a simplified flowchart 1900 depicting processing performed for controlling the path taken by a packet through a communication network and computing one or more metrics for one or more segments of the path according to certain embodiments. The method depicted in FIGS. 19A-B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIGS. 19A-B and described below is intended to be illustrative and non-limiting. Although FIGS. 19A-B depicts the various processing steps occurring in a particular sequence or order, this is not intended to be limiting. In certain alternative embodiments, the processing may be performed in some different order, or some steps may also be performed in parallel. One or more of the processing steps depicted in FIGS. 19A-B and described below may be performed or facilitated by NPAS 620 depicted in FIG. 6A.

At 1902, the NPAS may enable a probe packet to be configured, including enabling configuration of a packet header for the packet to cause the packet to traverse a path from a source compute node to a destination compute node over a path that includes multiple segments and one or more router nodes, and where the configured packet header comprises a header section corresponding to each of the multiple segments, and where the header section corresponding to a segment stores information indicative of a manner in which the packet is to be routed for that segment. For example, the NPAS 620 may perform periodic monitoring of all network segments or generate a map of the network, or a representation thereof, based upon the various nodes and segments determined in 706. The NPAS may then determine a performance measurement plan (or probing plan) whereby probe packets are injected into the network at particular nodes and the packets are configured to traverse a specific path terminated by compute nodes, where the path includes specific segments of the network for which performance metrics are to be computed.

The NPAS enables configuration of the router nodes to become tunnel termination endpoints. For example, a router node may be configured such that it becomes a termination endpoint for a tunnel. In addition, one or more router nodes may be configured such that, for a probe packet received by a router node, the outgoing network interface or port used by the router node for communicating the packet from the router node can be controlled. For a router node, this is done by creating a locally-relevant mapping or association between a label and an outgoing interface or port of the router node.

Based upon these configurations (e.g., based upon the tunnel termination endpoints and the label-to-port mappings), a probe packet is configured having a header where the header is configured to cause the probe packet to traverse a specific path in the network from a specific source compute node to a specific destination compute node and the path traverses specific segments of the network, in which each segment corresponds to a header section. A segment can be between a source compute node and a router node, between two router nodes, or between a router node and a destination compute node. The path traversed by the probe packet traverses multiple segments and one or more router nodes.

At 1904, a first time is measured for the packet at the source compute node, where the first time is indicative of a time when the packet is communicated from the source compute node. The time may correspond to the time immediately before the packet is injected into the network at the source compute node. The first time may be communicated to the NPAS 620, which may perform metric calculations, as described below.

In dashed box 1906, the packet is communicated from the source compute node to the destination compute node and over the multiple segments based upon information included in the packet header, wherein each segment corresponds to a header section. At 1908, the packet is received by start node of a segment, among the set of multiple segments. At 1910, the start node for the segment reads information from a section of the header corresponding to the segment. At 1912, the packet is routed from the start node to the end node of the segment based upon the information read in 1910, where the end node can be the destination compute node or a start node of the next segment. The process described in boxes 1908, 1910, and 1912 may be repeated for each of the multiple segments as the packet traverses all of the segments between the source compute node and the destination compute node.

At 1914, the packet is received at the destination compute node and at 1916, a second time is measured for the packet at the destination compute node, where the second time is indicative of a time when the packet is received by the destination compute node. The second time may be communicated to the NPAS 620, which may perform metric calculations, as described below. The NPAS 620 may store the times and other metric calculation information in a memory device pending calculation of metrics. For example, the NPAS 620 may store the first time and the second time in RAM or in a database, or the like.

At 1918, a performance metric is calculated for a segment from the multiple segments based upon the first time and the second time. A performance metric can be measured for a segment of the path, where the segment is between a compute node and a router node (e.g., the segment has a router node as its start node or its end node) or is a segment between two router nodes. Examples of performance metrics that may be computed for a network segment include network latency, packet loss, and jitter, among others. For example, the NPAS 620 may use the first time and the second time to calculate a performance metric. In some examples, for nth-order metrics, additional metric calculation information may be needed to calculate performance metrics in addition to the first time and the second time.

At 1920, optionally, one or more actions are performed further to the metric calculation in 1918 upon the metric. The one or more actions can include outputting information associated with the metric to a user. For example, information regarding the network segment for which the metric is calculated may be output to a user via a GUI provided by NPAS 620. The GUI may provide a visual representation of metric so that network issues can be quickly diagnosed by network engineers. For example, metrics may be presented in numerical or chart form, or in the form of lines graphs, heat maps, etc. In certain use cases, NPAS 620 may generate a report that includes information regarding the network segment and the metric.

The one or more actions can include communicating information regarding the network segment and the metric to a consumer of the metric, where the consumer could be a user such as a system administrator or a network performance engineer. The communicating of information may occur by way of the NPAS 620. The consumer could be a computer system or software component that uses the metrics information. For example, the computer system or software component may be configured to provide a visual, audible, or electronic notification in the event certain network errors or failures are detected. Network errors or failures may be detected, for instance, by assigning a threshold value to the calculated metrics. Network latency, for instance, may have a maximum value above which certain notifications can be triggered. Likewise, packet loss may have a maximum threshold value and jitter may have a maximum threshold value. Other actions may also be triggered based upon the value of the metric computed in 1920. For example, if the metric measure network latency and is calculated to be over a threshold, automatic corrective actions may be triggered or initiated to reduce the network latency.

Turning next to FIGS. 13A-E, FIGS. 13A-E are simplified diagrams of an example network 1300. The example network 1300 depict a network including several connected router nodes, which may serve to further illustrate one or more of the innovative techniques described in this disclosure. Example network 1300 includes two compute nodes 1301 and 1313, using the node shading conventions of FIGS. 6A-C. Example network 1300 depicts compute nodes 1301 and 1313 that may be geographically separated. Geographically separated networks may be connected by way of a subnetwork of intervening nodes 1315 that may be router nodes. Compute nodes 1301, 1313 can be connected to subnetwork 1315 by network fabric 1302, 1312. Network fabric 1302, 1312 may represent a plurality of routers, switches, and other networking devices used to connect one network to another network. In some examples, the subnetwork 1315 may be referred to as a backbone. The backbone may, for example, provide inter-region connectivity configured to provided suitable performance for bandwidth, latency, and jitter for high-performance cloud operations.

Figure 13A:
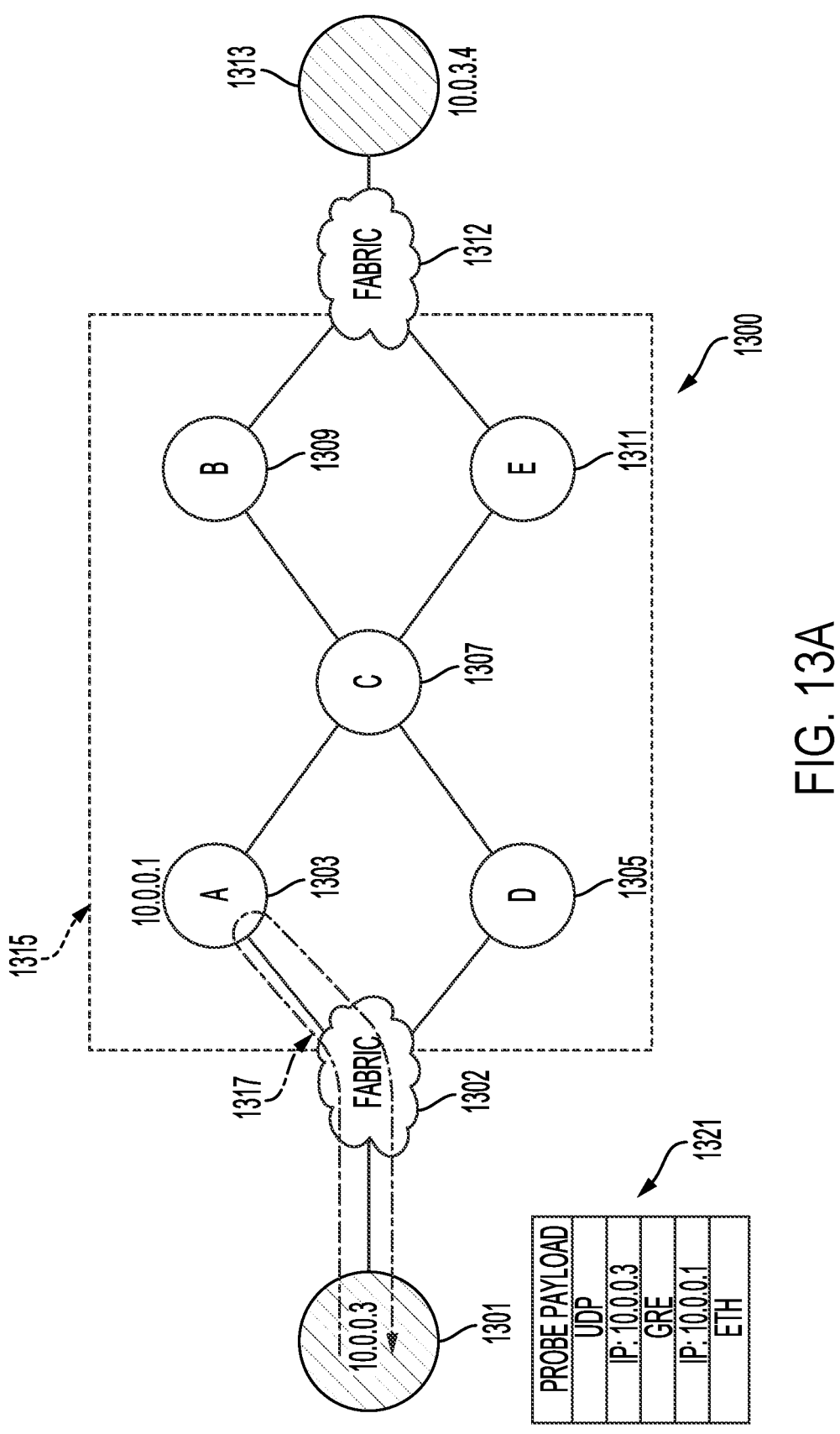
FIGS. 13A-E are simplified diagrams of an example network that may illustrate one or more of the innovative techniques described in this disclosure, according to certain embodiments.

FIG. 13A depicts a round-trip network path 1317 defined by probe packet 1321. Packet 1321 defines a round-trip network path 1317 from source compute node 1301 to router node 1303 and back to source/destination compute node 1301 by way of network fabric 1302. Like FIG. 8A, the return path is defined using the IP protocol, but could have equally been defined using label-based routing methods including, for example, MPLS. Network path 1317 may be of limited value in measuring performance, however, because the path through the networking devices making up network fabric 1302 may introduce sources of delay or packet loss, rendering performance measurements difficult to interpret. In addition, the use of IP-based routing guarantees only traversal of the logical network path, in which the physical network path is indeterminate. The performance measurements of the present disclosure may be most accurate when used to determine latency or packet loss, or to conduct component fault isolation between two router nodes because the physical path between the two devices may be exactly specified in that case.

Figure 13B:
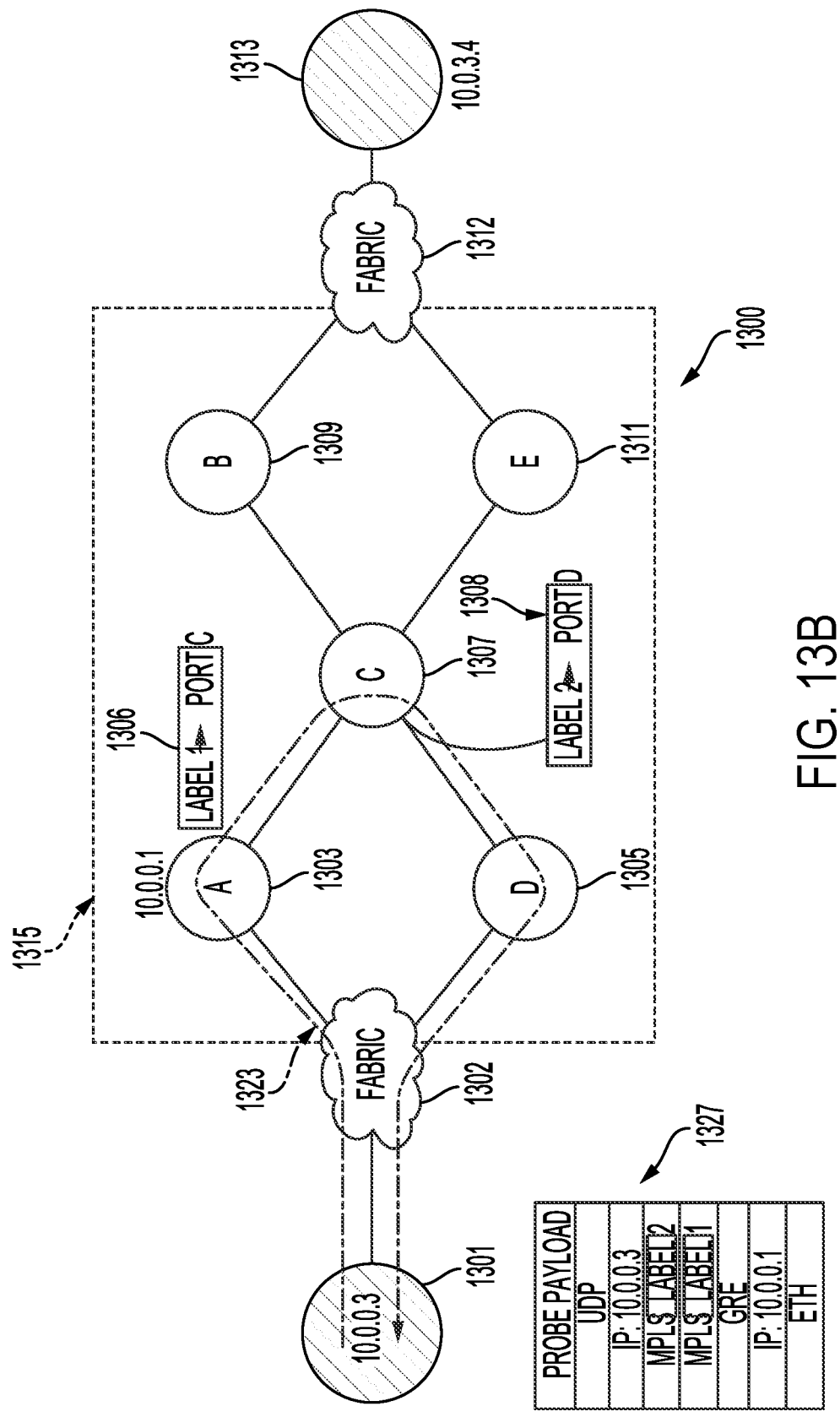

FIG. 13B depicts another round-trip network path 1323 defined by probe packet 1327. Packet 1327 defines a round-trip network path 1323 from source compute node 1301 to router nodes 1303, 1307, 1305 and back to source/destination compute node 1301 by way of network fabric 1302. In this example, the network path 1323 defined by the probe packet 1327 includes MPLS routing information encapsulated by the GRE tunneling protocol. MPLS labels are used to route the decapsulated packet from router node 1303 to router node 1307, and from router node 1307 to router node 1305, according to locally-relevant mappings 1306, 1308. As with FIG. 13A, the final portion of the network path 1323 is routed using the IP protocol. Metrics calculated using the network path 1323 may be used to determine third-order or higher-order metrics. For example, the time for traversal of the network path 1317 from FIG. 13A, along with the time for traversal of the network path from compute node 1301 to router node 1305 to router node 1307 and back to compute node 1301 (not shown in FIG. 13B) could be used together along with the time for traversal of the network path 1323 from FIG. 13B to determine performance metrics associated with the network segment between router node 1303 and router node 1307. In some examples, such a calculation may need to account for the double-inclusion of the network segment between compute node 1301 and network fabric 1302 in the third-order metric calculation.

Figure 13C:
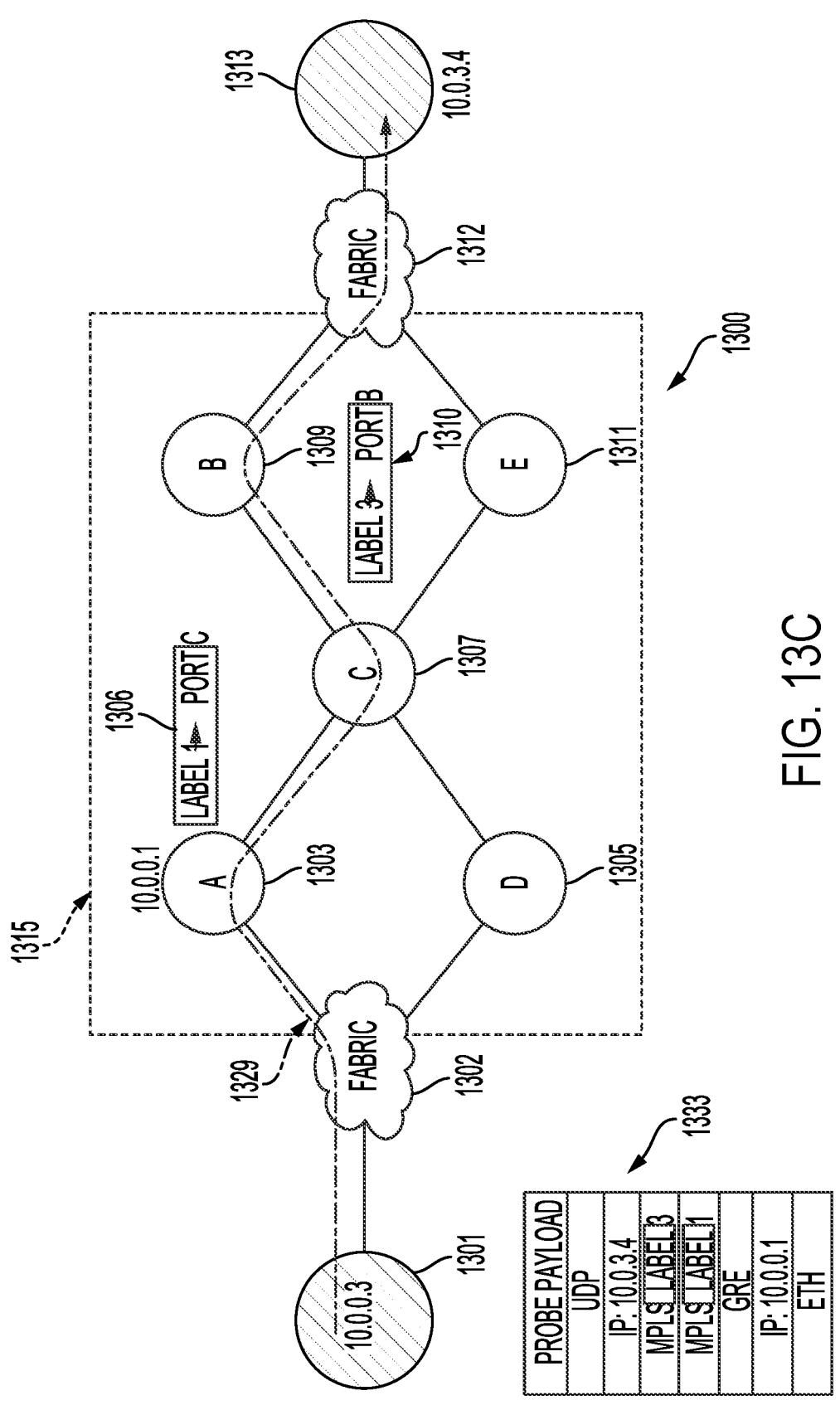

FIG. 13C depicts a network path 1329 from compute node 1301 to compute node 1313 across subnetwork 1315. In this example, the network path 1329 defined by probe packet 1333 includes MPLS routing information encapsulated by the GRE tunneling protocol. MPLS labels are used to route the decapsulated packet from router node 1303 to router node 1307, and router node 1307 to router node 1309, in accordance with locally-relevant label-to-port mappings 1306 and 1310, respectively. As with FIG. 13A, the final portion of the network path 1329 is routed using the IP protocol. The network path 1329 may be used for calculation of third-order metrics between, for example, router nodes 1303 and 1307 or router nodes 1307 and 1309. For example, a metric may be calculated associated the time for traversal of the network path 1329. Metrics associated with the time for traversal of round-trips paths between compute node 1301 and router node 1303 and between compute node 1313 and router node 1307 can be calculated, in analogy to FIGS. 8A and 8D. The round-trip metrics may be halved and subtracted from the time associated with traversing network path 1329 to estimate the latency across the network segment defined by the physical path between router node 1303 and router node 1307. An analogous procedure could be used to estimate the latency across the network segment defined by the physical path between router node 1307 and router node 1309.

Figure 13D:
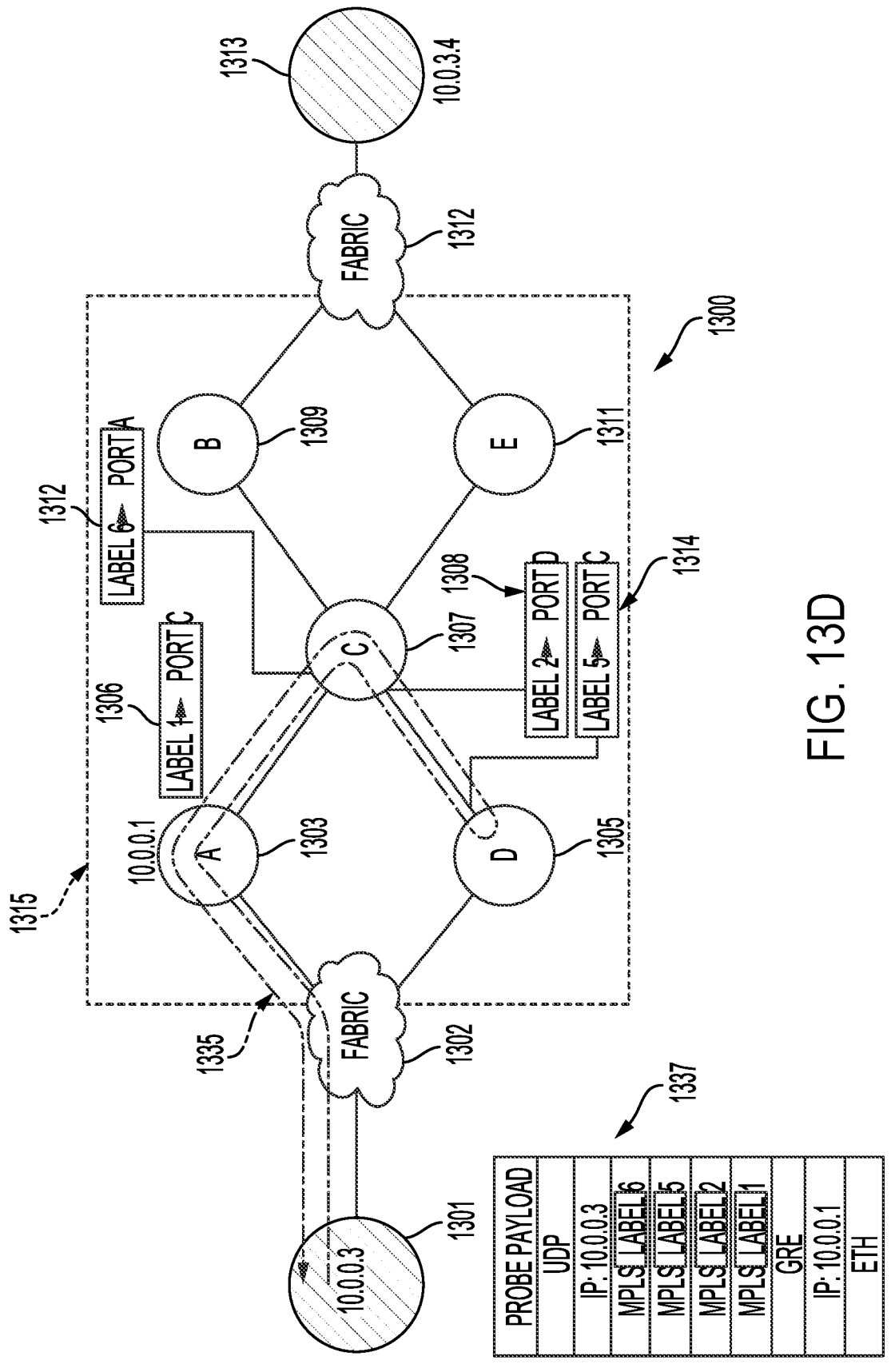

FIG. 13D depicts a round-trip network path 1331 from compute node 1301, through several router nodes, and back to compute node 1301. In this example, the network path 1335 defined by probe packet 1337 includes MPLS routing information encapsulated by the GRE tunneling protocol. FIG. 13D illustrates a path similar the round-trip of FIG. 13A, but with a reversal in direction utilizing MPLS labels rather than the IP protocol. A time measurement of the round-trip network path 1335 may be used along with measurements of shortened paths for second-order metric calculations. For example, another network path along the same network path 1335 except stopping at router node 1307 may be used to estimate performance measurements between router nodes 1305 and 1307.

Figure 13E:
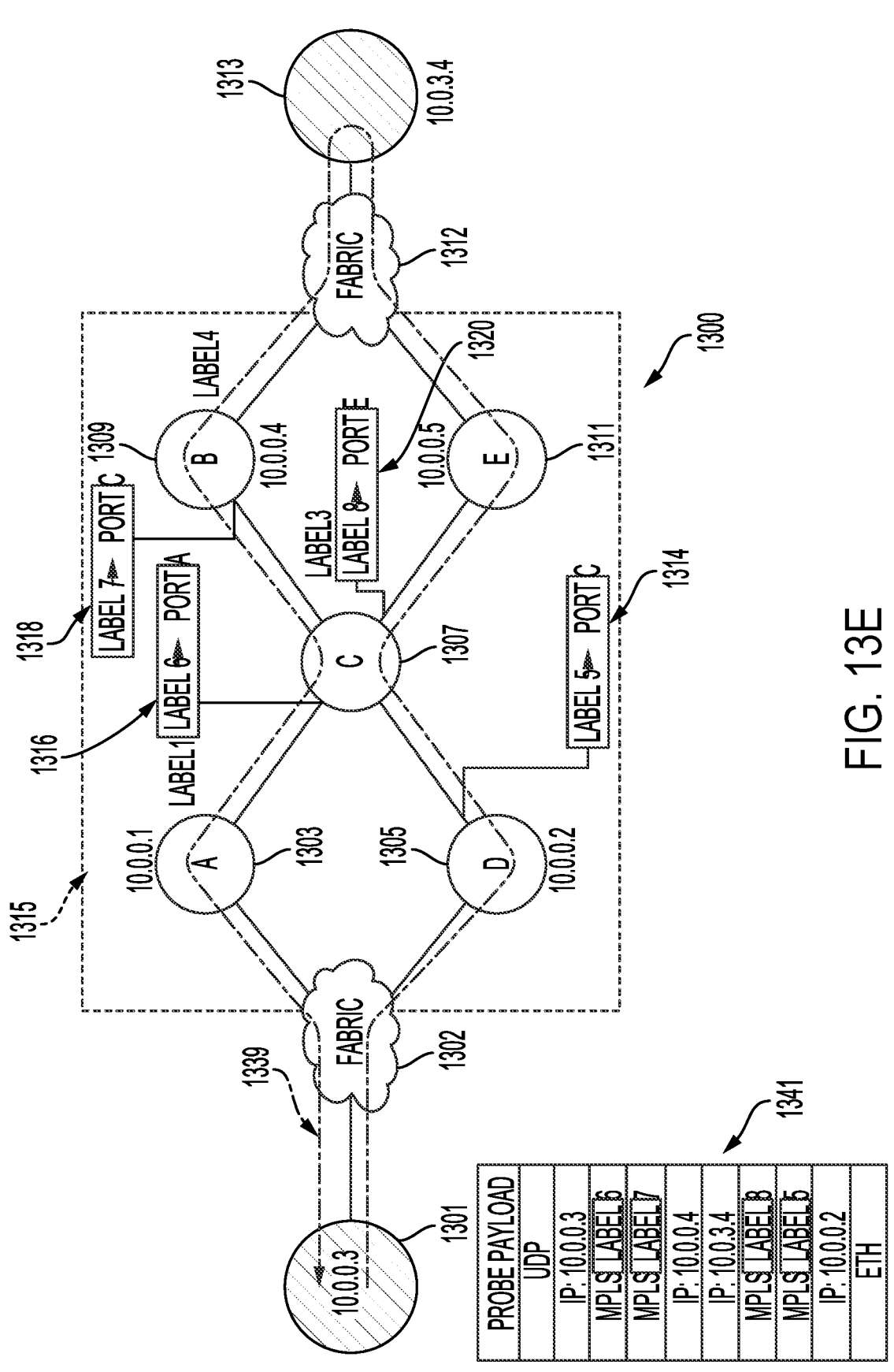

FIG. 13E depicts a round-trip network path 1339 from compute node 1301, through several router nodes, to compute node 1313, and back to compute node 1301, through several more router nodes. In this example, the network path 1339 defined by probe packet 1341 includes MPLS routing information encapsulated by the GRE tunneling protocol. FIG. 13E illustrates a packet traversing all of the nodes making up the network at least once. Metrics calculated using the network path 1339 may be used in conjunction with other network paths (not shown) to calculate second- and higher-order metrics along any segment between two router nodes within subnetwork 1315.

The teachings described in this disclosure can be implemented in an underlay network containing one or more compute nodes and one or more router nodes. For example, the teachings can be implemented in an underlay network that is part of the infrastructure used by a cloud services provider (CSP) to provide one or more cloud services to one or more subscribing customers. Performance monitoring of such a network that incorporates the various techniques described in this disclosure can enable rapid and localized fault isolation to the components making up the network. This translates to providing more reliable and fault-resilient delivery of cloud services and data communications to the subscribing customers, which in turn translates to a better customer experience. The following section describes examples of CSP infrastructure setups that may be used to provide cloud services to subscribing customers, where the infrastructure can include a network comprising one or more compute nodes and one or more router nodes that implement the various features described in this disclosure.

Example Architectures for Providing a Cloud Service

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact)

can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 14:
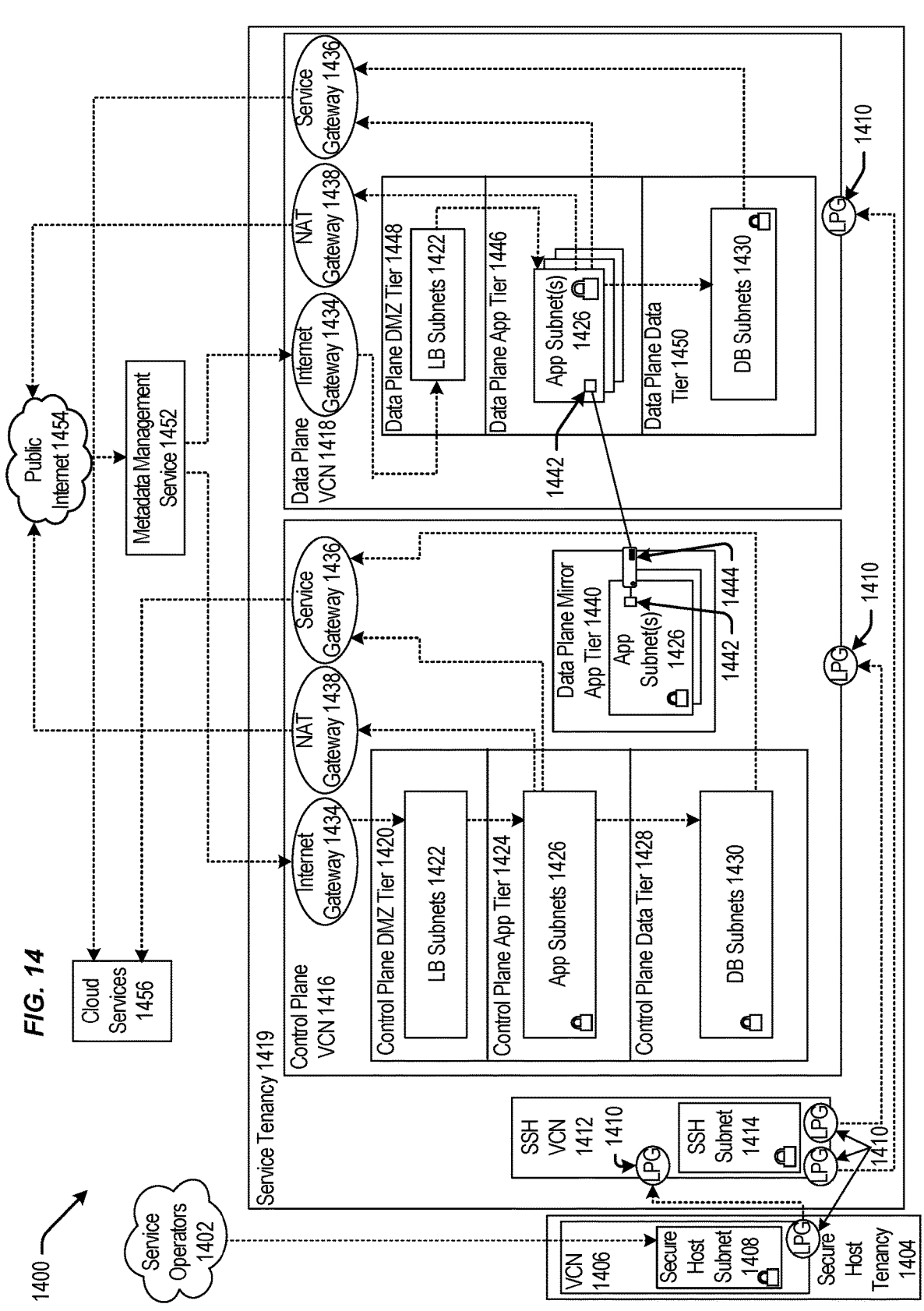
FIG. 14 is a block diagram illustrating one pattern for implementing a cloud infrastructure as a service system, according to at least one embodiment.

FIG. 14 is a block diagram 1400 illustrating an example pattern of an IaaS architecture, according to at least one embodiment. Service operators 1402 can be communicatively coupled to a secure host tenancy 1404 that can include a virtual cloud network (VCN) 1406 and a secure host subnet 1408. In some examples, the service operators 1402 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1406 and/or the Internet.

The VCN 1406 can include a local peering gateway (LPG) 1410 that can be communicatively coupled to a secure shell (SSH) VCN 1412 via an LPG 1410 contained in the SSH VCN 1412. The SSH VCN 1412 can include an SSH subnet 1414, and the SSH VCN 1412 can be communicatively coupled to a control plane VCN 1416 via the LPG 1410 contained in the control plane VCN 1416. Also, the SSH VCN 1412 can be communicatively coupled to a data plane VCN 1418 via an LPG 1410. The control plane VCN 1416 and the data plane VCN 1418 can be contained in a service tenancy 1419 that can be owned and/or operated by the IaaS provider.

The control plane VCN 1416 can include a control plane demilitarized zone (DMZ) tier 1420 that acts as a perimeter network (e.g., portions of a corporate network between the corporate intranet and external networks). The DMZ-based servers may have restricted responsibilities and help keep breaches contained. Additionally, the DMZ tier 1420 can include one or more load balancer (LB) subnet(s) 1422, a control plane app tier 1424 that can include app subnet(s) 1426, a control plane data tier 1428 that can include database (DB) subnet(s) 1430 (e.g., frontend DB subnet(s) and/or backend DB subnet(s)). The LB subnet(s) 1422 contained in the control plane DMZ tier 1420 can be communicatively coupled to the app subnet(s) 1426 contained in the control plane app tier 1424 and an Internet gateway 1434 that can be contained in the control plane VCN 1416, and the app subnet(s) 1426 can be communicatively coupled to the DB subnet(s) 1430 contained in the control plane data tier 1428 and a service gateway 1436 and a network address translation (NAT) gateway 1438. The control plane VCN 1416 can include the service gateway 1436 and the NAT gateway 1438.

The control plane VCN 1416 can include a data plane mirror app tier 1440 that can include app subnet(s) 1426. The app subnet(s) 1426 contained in the data plane mirror app tier 1440 can include a virtual network interface controller (VNIC) 1442 that can execute a compute instance 1444. The compute instance 1444 can communicatively couple the app subnet(s) 1426 of the data plane mirror app tier 1440 to app subnet(s) 1426 that can be contained in a data plane app tier 1446.

The data plane VCN 1418 can include the data plane app tier 1446, a data plane DMZ tier 1448, and a data plane data tier 1450. The data plane DMZ tier 1448 can include LB subnet(s) 1422 that can be communicatively coupled to the app subnet(s) 1426 of the data plane app tier 1446 and the Internet gateway 1434 of the data plane VCN 1418. The app subnet(s) 1426 can be communicatively coupled to the service gateway 1436 of the data plane VCN 1418 and the NAT gateway 1438 of the data plane VCN 1418. The data plane data tier 1450 can also include the DB subnet(s) 1430 that can be communicatively coupled to the app subnet(s) 1426 of the data plane app tier 1446.

The Internet gateway 1434 of the control plane VCN 1416 and of the data plane VCN 1418 can be communicatively coupled to a metadata management service 1452 that can be communicatively coupled to public Internet 1454. Public Internet 1454 can be communicatively coupled to the NAT gateway 1438 of the control plane VCN 1416 and of the data plane VCN 1418. The service gateway 1436 of the control plane VCN 1416 and of the data plane VCN 1418 can be communicatively couple to cloud services 1456.

In some examples, the service gateway 1436 of the control plane VCN 1416 or of the data plane VCN 1418 can make application programming interface (API) calls to cloud services 1456 without going through public Internet

1454. The API calls to cloud services 1456 from the service gateway 1436 can be one-way: the service gateway 1436 can make API calls to cloud services 1456, and cloud services 1456 can send requested data to the service gateway 1436. But, cloud services 1456 may not initiate API calls to the service gateway 1436.

In some examples, the secure host tenancy 1404 can be directly connected to the service tenancy 1419, which may be otherwise isolated. The secure host subnet 1408 can communicate with the SSH subnet 1414 through an LPG 1410 that may enable two-way communication over an otherwise isolated system. Connecting the secure host subnet 1408 to the SSH subnet 1414 may give the secure host subnet 1408 access to other entities within the service tenancy 1419.

The control plane VCN 1416 may allow users of the service tenancy 1419 to set up or otherwise provision desired resources. Desired resources provisioned in the control plane VCN 1416 may be deployed or otherwise used in the data plane VCN 1418. In some examples, the control plane VCN 1416 can be isolated from the data plane VCN 1418, and the data plane mirror app tier 1440 of the control plane VCN 1416 can communicate with the data plane app tier 1446 of the data plane VCN 1418 via VNICs 1442 that can be contained in the data plane mirror app tier 1440 and the data plane app tier 1446.

In some examples, users of the system, or customers, can make requests, for example create, read, update, or delete (CRUD) operations, through public Internet 1454 that can communicate the requests to the metadata management service 1452. The metadata management service 1452 can communicate the request to the control plane VCN 1416 through the Internet gateway 1434. The request can be received by the LB subnet(s) 1422 contained in the control plane DMZ tier 1420. The LB subnet(s) 1422 may determine that the request is valid, and in response to this determination, the LB subnet(s) 1422 can transmit the request to app subnet(s) 1426 contained in the control plane app tier 1424. If the request is validated and requires a call to public Internet 1454, the call to public Internet 1454 may be transmitted to the NAT gateway 1438 that can make the call to public Internet 1454. Metadata that may be desired to be stored by the request can be stored in the DB subnet(s) 1430.

In some examples, the data plane mirror app tier 1440 can facilitate direct communication between the control plane VCN 1416 and the data plane VCN 1418. For example, changes, updates, or other suitable modifications to configuration may be desired to be applied to the resources contained in the data plane VCN 1418. Via a VNIC 1442, the control plane VCN 1416 can directly communicate with, and can thereby execute the changes, updates, or other suitable modifications to configuration to, resources contained in the data plane VCN 1418.

In some embodiments, the control plane VCN 1416 and the data plane VCN 1418 can be contained in the service tenancy 1419. In this case, the user, or the customer, of the system may not own or operate either the control plane VCN 1416 or the data plane VCN 1418. Instead, the IaaS provider may own or operate the control plane VCN 1416 and the data plane VCN 1418, both of which may be contained in the service tenancy 1419. This embodiment can enable isolation of networks that may prevent users or customers from interacting with other users', or other customers', resources. Also, this embodiment may allow users or customers of the system to store databases privately without needing to rely on public Internet 1454, which may not have a desired level of threat prevention, for storage.

In other embodiments, the LB subnet(s) 1422 contained in the control plane VCN 1416 can be configured to receive a signal from the service gateway 1436. In this embodiment, the control plane VCN 1416 and the data plane VCN 1418 may be configured to be called by a customer of the IaaS provider without calling public Internet 1454. Customers of the IaaS provider may desire this embodiment since database(s) that the customers use may be controlled by the IaaS provider and may be stored on the service tenancy 1419, which may be isolated from public Internet 1454.

Figure 15:
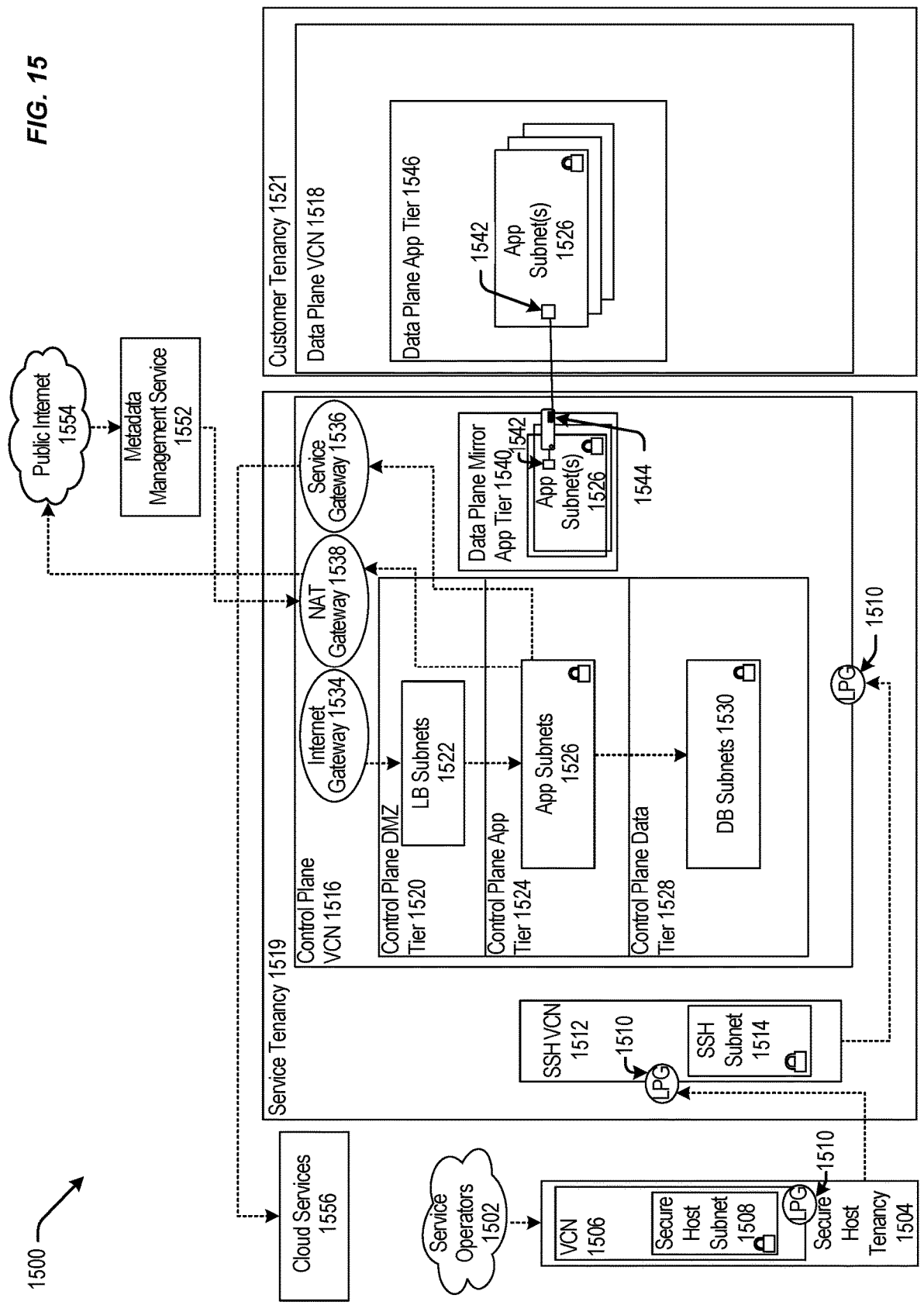
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1402 of FIG. 14) can be communicatively coupled to a secure host tenancy 1504 (e.g., the secure host tenancy 1404 of FIG. 14) that can include a virtual cloud network (VCN) 1506 (e.g., the VCN 1406 of FIG. 14) and a secure host subnet 1508 (e.g., the secure host subnet 1408 of FIG. 14). The VCN 1506 can include a local peering gateway (LPG) 1510 (e.g., the LPG 1410 of FIG. 14) that can be communicatively coupled to a secure shell (SSH) VCN 1512 (e.g., the SSH VCN 1412 of FIG. 14) via an LPG 1410 contained in the SSH VCN 1512. The SSH VCN 1512 can include an SSH subnet 1514 (e.g., the SSH subnet 1414 of FIG. 14), and the SSH VCN 1512 can be communicatively coupled to a control plane VCN 1516 (e.g., the control plane VCN 1416 of FIG. 14) via an LPG 1510 contained in the control plane VCN 1516. The control plane VCN 1516 can be contained in a service tenancy 1519 (e.g., the service tenancy 1419 of FIG. 14), and the data plane VCN 1518 (e.g., the data plane VCN 1418 of FIG. 14) can be contained in a customer tenancy 1521 that may be owned or operated by users, or customers, of the system.

The control plane VCN 1516 can include a control plane DMZ tier 1520 (e.g., the control plane DMZ tier 1420 of FIG. 14) that can include LB subnet(s) 1522 (e.g., LB subnet(s) 1422 of FIG. 14), a control plane app tier 1524 (e.g., the control plane app tier 1424 of FIG. 14) that can include app subnet(s) 1526 (e.g., app subnet(s) 1426 of FIG. 14), a control plane data tier 1528 (e.g., the control plane data tier 1428 of FIG. 14) that can include database (DB) subnet(s) 1530 (e.g., similar to DB subnet(s) 1430 of FIG. 14). The LB subnet(s) 1522 contained in the control plane DMZ tier 1520 can be communicatively coupled to the app subnet(s) 1526 contained in the control plane app tier 1524 and an Internet gateway 1534 (e.g., the Internet gateway 1434 of FIG. 14) that can be contained in the control plane VCN 1516, and the app subnet(s) 1526 can be communicatively coupled to the DB subnet(s) 1530 contained in the control plane data tier 1528 and a service gateway 1536 (e.g., the service gateway 1436 of FIG. 14) and a network address translation (NAT) gateway 1538 (e.g., the NAT gateway 1438 of FIG. 14). The control plane VCN 1516 can include the service gateway 1536 and the NAT gateway 1538.

The control plane VCN 1516 can include a data plane mirror app tier 1540 (e.g., the data plane mirror app tier 1440 of FIG. 14) that can include app subnet(s) 1526. The app subnet(s) 1526 contained in the data plane mirror app tier 1540 can include a virtual network interface controller (VNIC) 1542 (e.g., the VNIC of 1442) that can execute a compute instance 1544 (e.g., similar to the compute instance 1444 of FIG. 14). The compute instance 1544 can facilitate communication between the app subnet(s) 1526 of the data plane mirror app tier 1540 and the app subnet(s) 1526 that can be contained in a data plane app tier 1546 (e.g., the data plane app tier 1446 of FIG. 14) via the VNIC 1542 contained in the data plane mirror app tier 1540 and the VNIC 1542 contained in the data plane app tier 1546.

The Internet gateway 1534 contained in the control plane VCN 1516 can be communicatively coupled to a metadata management service 1552 (e.g., the metadata management service 1452 of FIG. 14) that can be communicatively coupled to public Internet 1554 (e.g., public Internet 1454 of FIG. 14). Public Internet 1554 can be communicatively coupled to the NAT gateway 1538 contained in the control plane VCN 1516. The service gateway 1536 contained in the control plane VCN 1516 can be communicatively couple to cloud services 1556 (e.g., cloud services 1456 of FIG. 14).

In some examples, the data plane VCN 1518 can be contained in the customer tenancy 1521. In this case, the IaaS provider may provide the control plane VCN 1516 for each customer, and the IaaS provider may, for each customer, set up a unique compute instance 1544 that is contained in the service tenancy 1519. Each compute instance 1544 may allow communication between the control plane VCN 1516, contained in the service tenancy 1519, and the data plane VCN 1518 that is contained in the customer tenancy 1521. The compute instance 1544 may allow resources, that are provisioned in the control plane VCN 1516 that is contained in the service tenancy 1519, to be deployed or otherwise used in the data plane VCN 1518 that is contained in the customer tenancy 1521.

In other examples, the customer of the IaaS provider may have databases that live in the customer tenancy 1521. In this example, the control plane VCN 1516 can include the data plane mirror app tier 1540 that can include app subnet(s) 1526. The data plane mirror app tier 1540 can reside in the data plane VCN 1518, but the data plane mirror app tier 1540 may not live in the data plane VCN 1518. That is, the data plane mirror app tier 1540 may have access to the customer tenancy 1521, but the data plane mirror app tier 1540 may not exist in the data plane VCN 1518 or be owned or operated by the customer of the IaaS provider. The data plane mirror app tier 1540 may be configured to make calls to the data plane VCN 1518 but may not be configured to make calls to any entity contained in the control plane VCN 1516. The customer may desire to deploy or otherwise use resources in the data plane VCN 1518 that are provisioned in the control plane VCN 1516, and the data plane mirror app tier 1540 can facilitate the desired deployment, or other usage of resources, of the customer.

In some embodiments, the customer of the IaaS provider can apply filters to the data plane VCN 1518. In this embodiment, the customer can determine what the data plane VCN 1518 can access, and the customer may restrict access to public Internet 1554 from the data plane VCN 1518. The IaaS provider may not be able to apply filters or otherwise control access of the data plane VCN 1518 to any outside networks or databases. Applying filters and controls by the customer onto the data plane VCN 1518, contained in the customer tenancy 1521, can help isolate the data plane VCN 1518 from other customers and from public Internet 1554.

In some embodiments, cloud services 1556 can be called by the service gateway 1536 to access services that may not exist on public Internet 1554, on the control plane VCN 1516, or on the data plane VCN 1518. The connection between cloud services 1556 and the control plane VCN 1516 or the data plane VCN 1518 may not be live or continuous. Cloud services 1556 may exist on a different network owned or operated by the IaaS provider. Cloud services 1556 may be configured to receive calls from the service gateway 1536 and may be configured to not receive calls from public Internet 1554. Some cloud services 1556 may be isolated from other cloud services 1556, and the control plane VCN 1516 may be isolated from cloud services 1556 that may not be in the same region as the control plane VCN 1516. For example, the control plane VCN 1516 may be located in "Region 1," and cloud service "Deployment 14," may be located in Region 1 and in "Region 2." If a call to Deployment 14 is made by the service gateway 1536 contained in the control plane VCN 1516 located in Region 1, the call may be transmitted to Deployment 14 in Region 1. In this example, the control plane VCN 1516, or Deployment 14 in Region 1, may not be communicatively coupled to, or otherwise in communication with, Deployment 14 in Region 2.

Figure 16:
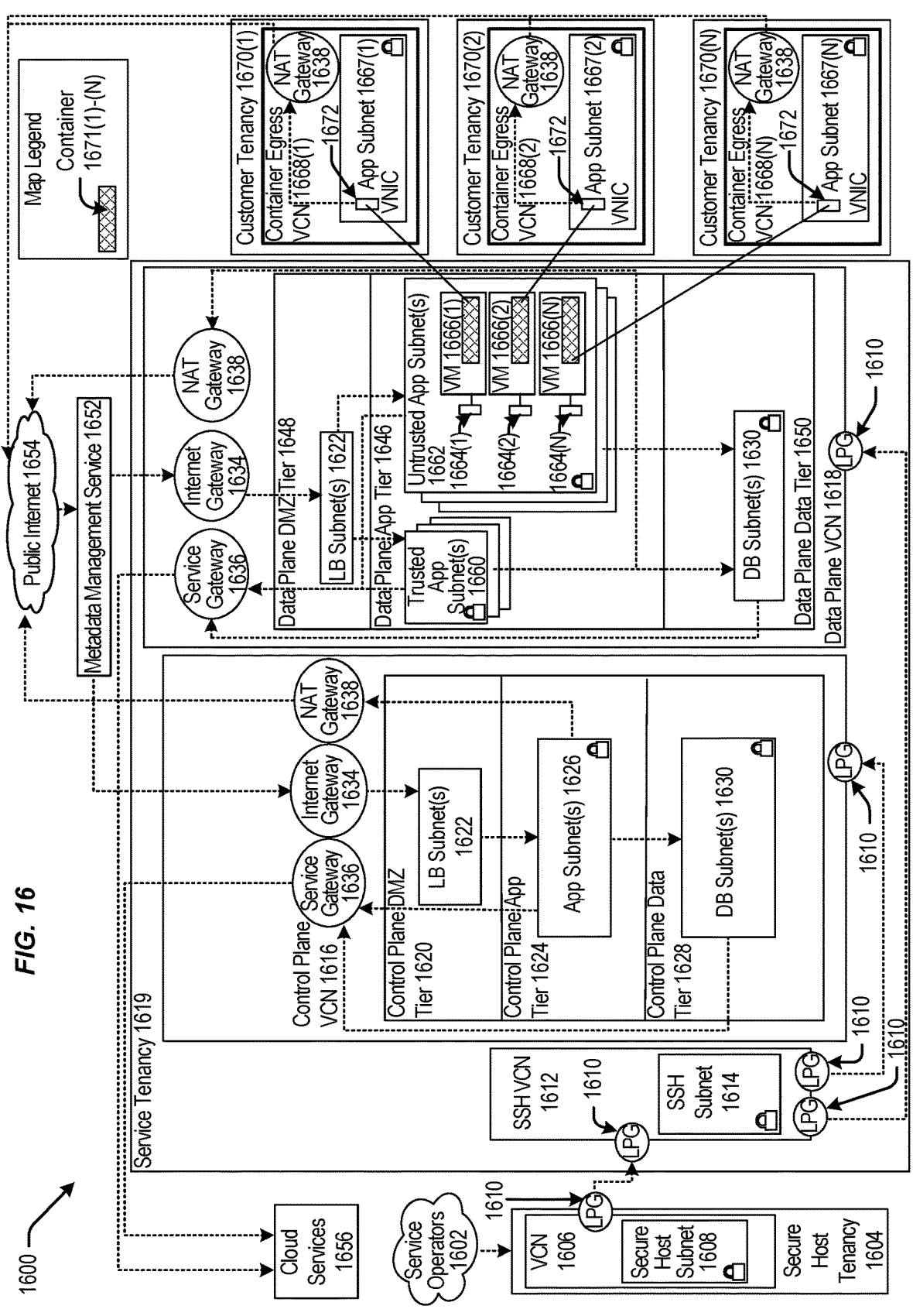
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1402 of FIG. 14) can be communicatively coupled to a secure host tenancy 1604 (e.g., the secure host tenancy 1404 of FIG. 14) that can include a virtual cloud network (VCN) 1606 (e.g., the VCN 1406 of FIG. 14) and a secure host subnet 1608 (e.g., the secure host subnet 1408 of FIG. 14). The VCN 1606 can include an LPG 1610 (e.g., the LPG 1410 of FIG. 14) that can be communicatively coupled to an SSH VCN 1612 (e.g., the SSH VCN 1412 of FIG. 14) via an LPG 1610 contained in the SSH VCN 1612. The SSH VCN 1612 can include an SSH subnet 1614 (e.g., the SSH subnet 1414 of FIG. 14), and the SSH VCN 1612 can be communicatively coupled to a control plane VCN 1616 (e.g., the control plane VCN 1416 of FIG. 14) via an LPG 1610 contained in the control plane VCN 1616 and to a data plane VCN 1618 (e.g., the data plane 1418 of FIG. 14) via an LPG 1610 contained in the data plane VCN 1618. The control plane VCN 1616 and the data plane VCN 1618 can be contained in a service tenancy 1619 (e.g., the service tenancy 1419 of FIG. 14).

The control plane VCN 1616 can include a control plane DMZ tier 1620 (e.g., the control plane DMZ tier 1420 of FIG. 14) that can include load balancer (LB) subnet(s) 1622 (e.g., LB subnet(s) 1422 of FIG. 14), a control plane app tier 1624 (e.g., the control plane app tier 1424 of FIG. 14) that can include app subnet(s) 1626 (e.g., similar to app subnet(s) 1426 of FIG. 14), a control plane data tier 1628 (e.g., the control plane data tier 1428 of FIG. 14) that can include DB subnet(s) 1630. The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1434 of FIG. 14) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 14) and a network address translation (NAT) gateway 1638 (e.g., the NAT gateway 1438 of FIG. 14). The control plane VCN 1616 can include the service gateway 1636 and the NAT gateway 1638.

The data plane VCN 1618 can include a data plane app tier 1646 (e.g., the data plane app tier 1446 of FIG. 14), a data plane DMZ tier 1648 (e.g., the data plane DMZ tier 1448 of FIG. 14), and a data plane data tier 1650 (e.g., the data plane data tier 1450 of FIG. 14). The data plane DMZ tier 1648 can include LB subnet(s) 1622 that can be communicatively coupled to trusted app subnet(s) 1660 and untrusted app subnet(s) 1662 of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include one or more primary VNICs 1664(1)-(N) that can be communicatively coupled to tenant virtual machines (VMs) 1666(1)-(N). Each tenant VM 1666(1)-(N) can be communicatively coupled to a respective app subnet 1667(1)-(N) that can be contained in respective container egress VCNs 1668(1)-(N) that can be contained in respective customer tenancies 1670(1)-(N). Respective secondary VNICs 1672(1)-(N) can facilitate communication between the untrusted app subnet(s) 1662 contained in the data plane VCN 1618 and the app subnet contained in the container egress VCNs 1668(1)-(N). Each container egress VCNs 1668(1)-(N) can include a NAT gateway 1638 that can be communicatively coupled to public Internet 1654 (e.g., public Internet 1454 of FIG. 14).

The Internet gateway 1634 contained in the control plane VCN 1616 and contained in the data plane VCN 1618 can be communicatively coupled to a metadata management service 1652 (e.g., the metadata management system 1452 of FIG. 14) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively couple to cloud services 1656.

In some embodiments, the data plane VCN 1618 can be integrated with customer tenancies 1670. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1646. Code to run the function may be executed in the VMs 1666(1)-(N), and the code may not be configured to run anywhere else on the data plane VCN 1618. Each VM 1666(1)-(N) may be connected to one customer tenancy 1670. Respective containers 1671(1)-(N) contained in the VMs 1666(1)-(N) may be configured to run the code. In this case, there can be a dual isolation (e.g., the containers 1671(1)-(N) running code, where the containers 1671(1)-(N) may be contained in at least the VM 1666(1)-(N) that are contained in the untrusted app subnet(s) 1662), which may help prevent incorrect or otherwise undesirable code from damaging the network of the IaaS provider or from damaging a network of a different customer. The containers 1671(1)-(N) may be communicatively coupled to the customer tenancy 1670 and may be configured to transmit or receive data from the customer tenancy 1670. The containers 1671(1)-(N) may not be configured to transmit or receive data from any other entity in the data plane VCN 1618. Upon completion of running the code, the IaaS provider may kill or otherwise dispose of the containers 1671(1)-(N).

In some embodiments, the trusted app subnet(s) 1660 may run code that may be owned or operated by the IaaS provider. In this embodiment, the trusted app subnet(s) 1660 may be communicatively coupled to the DB subnet(s) 1630 and be configured to execute CRUD operations in the DB subnet(s) 1630. The untrusted app subnet(s) 1662 may be communicatively coupled to the DB subnet(s) 1630, but in this embodiment, the untrusted app subnet(s) may be configured to execute read operations in the DB subnet(s) 1630. The containers 1671(1)-(N) that can be contained in the VM 1666(1)-(N) of each customer and that may run code from the customer may not be communicatively coupled with the DB subnet(s) 1630.

In other embodiments, the control plane VCN 1616 and the data plane VCN 1618 may not be directly communicatively coupled. In this embodiment, there may be no direct communication between the control plane VCN 1616 and the data plane VCN 1618. However, communication can occur indirectly through at least one method. An LPG 1610 may be established by the IaaS provider that can facilitate communication between the control plane VCN 1616 and the data plane VCN 1618. In another example, the control plane VCN 1616 or the data plane VCN 1618 can make a call to cloud services 1656 via the service gateway 1636. For example, a call to cloud services 1656 from the control plane VCN 1616 can include a request for a service that can communicate with the data plane VCN 1618.

Figure 17:
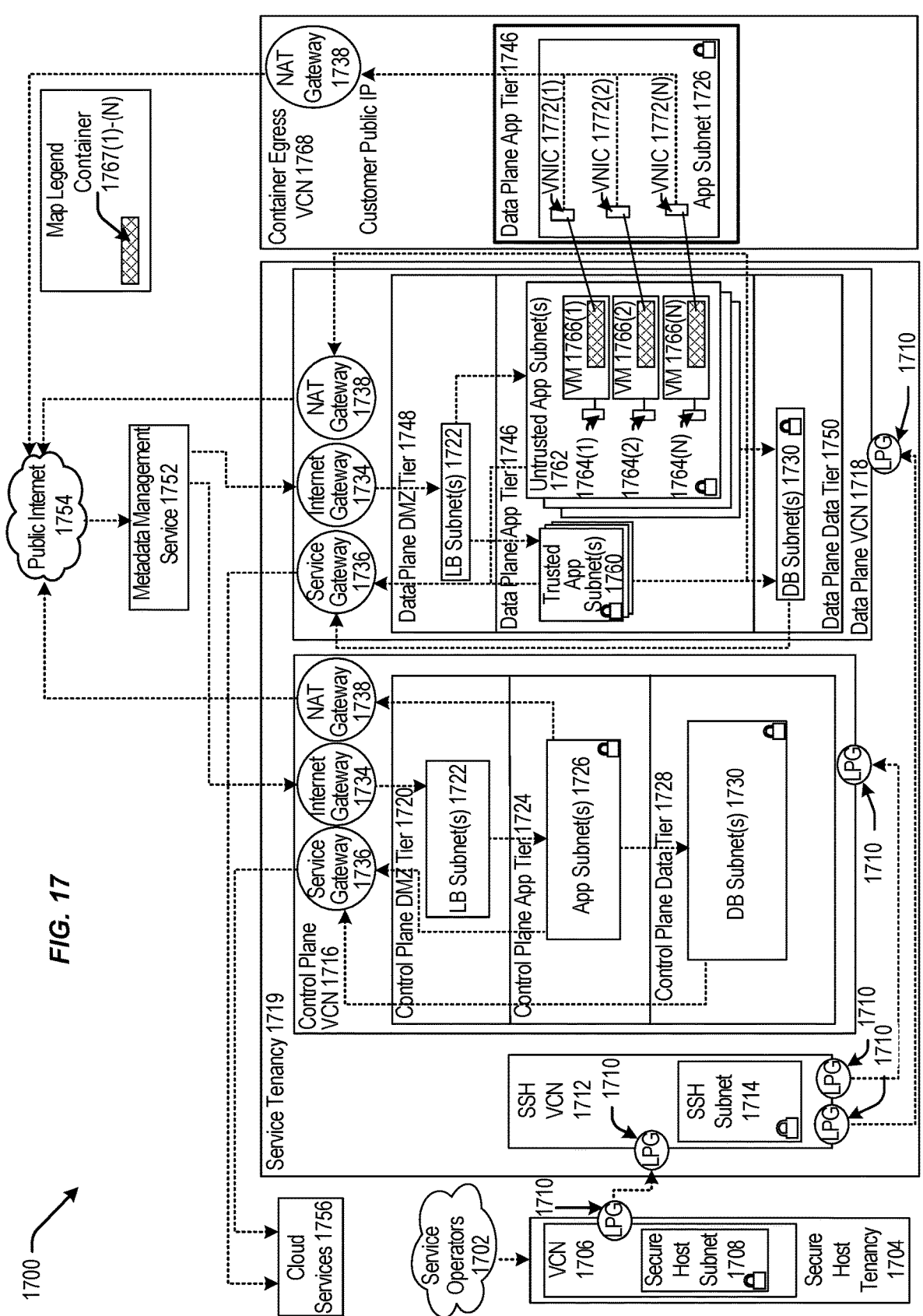
FIG. 17 is a block diagram illustrating another pattern for implementing a cloud infrastructure as a service system, according to at least one embodiment.
Figure 18:
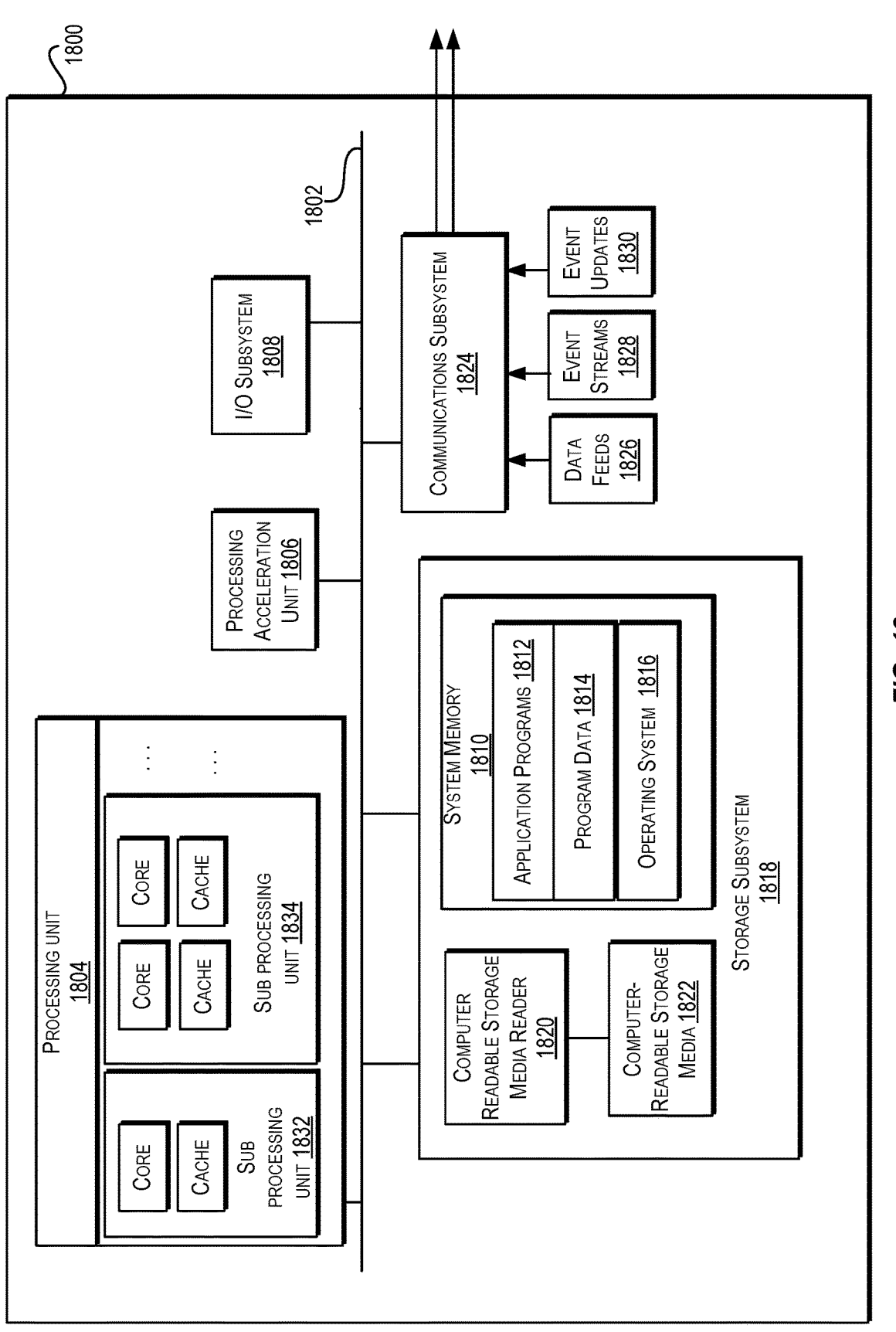
FIG. 18 is a block diagram illustrating an example computer system, according to at least one embodiment.

FIG. 17 is a block diagram 1700 illustrating another example pattern of an IaaS architecture, according to at least one embodiment. Service operators 1702 (e.g., service operators 1402 of FIG. 14) can be communicatively coupled to a secure host tenancy 1704 (e.g., the secure host tenancy 1404 of FIG. 14) that can include a virtual cloud network (VCN) 1706 (e.g., the VCN 1406 of FIG. 14) and a secure host subnet 1708 (e.g., the secure host subnet 1408 of FIG. 14). The VCN 1706 can include an LPG 1710 (e.g., the LPG 1410 of FIG. 14) that can be communicatively coupled to an SSH VCN 1712 (e.g., the SSH VCN 1412 of FIG. 14) via an LPG 1710 contained in the SSH VCN 1712. The SSH VCN 1712 can include an SSH subnet 1714 (e.g., the SSH subnet 1414 of FIG. 14), and the SSH VCN 1712 can be communicatively coupled to a control plane VCN 1716 (e.g., the control plane VCN 1416 of FIG. 14) via an LPG 1710 contained in the control plane VCN 1716 and to a data plane VCN 1718 (e.g., the data plane 1418 of FIG. 14) via an LPG 1710 contained in the data plane VCN 1718. The control plane VCN 1716 and the data plane VCN 1718 can be contained in a service tenancy 1719 (e.g., the service tenancy 1419 of FIG. 14).

The control plane VCN 1716 can include a control plane DMZ tier 1720 (e.g., the control plane DMZ tier 1420 of FIG. 14) that can include LB subnet(s) 1722 (e.g., LB subnet(s) 1422 of FIG. 14), a control plane app tier 1724 (e.g., the control plane app tier 1424 of FIG. 14) that can include app subnet(s) 1726 (e.g., app subnet(s) 1426 of FIG. 14), a control plane data tier 1728 (e.g., the control plane data tier 1428 of FIG. 14) that can include DB subnet(s) 1730 (e.g., DB subnet(s) 1630 of FIG. 16). The LB subnet(s) 1722 contained in the control plane DMZ tier 1720 can be communicatively coupled to the app subnet(s) 1726 contained in the control plane app tier 1724 and to an Internet gateway 1734 (e.g., the Internet gateway 1434 of FIG. 14) that can be contained in the control plane VCN 1716, and the app subnet(s) 1726 can be communicatively coupled to the DB subnet(s) 1730 contained in the control plane data tier 1728 and to a service gateway 1736 (e.g., the service gateway of FIG. 14) and a network address translation (NAT) gateway 1738 (e.g., the NAT gateway 1438 of FIG. 14). The control plane VCN 1716 can include the service gateway 1736 and the NAT gateway 1738.

The data plane VCN 1718 can include a data plane app tier 1746 (e.g., the data plane app tier 1446 of FIG. 14), a data plane DMZ tier 1748 (e.g., the data plane DMZ tier 1448 of FIG. 14), and a data plane data tier 1750 (e.g., the data plane data tier 1450 of FIG. 14). The data plane DMZ tier 1748 can include LB subnet(s) 1722 that can be communicatively coupled to trusted app subnet(s) 1760 (e.g., trusted app subnet(s) 1660 of FIG. 16) and untrusted app subnet(s) 1762 (e.g., untrusted app subnet(s) 1662 of FIG. 16) of the data plane app tier 1746 and the Internet gateway 1734 contained in the data plane VCN 1718. The trusted app subnet(s) 1760 can be communicatively coupled to the service gateway 1736 contained in the data plane VCN 1718, the NAT gateway 1738 contained in the data plane VCN 1718, and DB subnet(s) 1730 contained in the data plane data tier 1750. The untrusted app subnet(s) 1762 can be communicatively coupled to the service gateway 1736 contained in the data plane VCN 1718 and DB subnet(s) 1730 contained in the data plane data tier 1750. The data plane data tier 1750 can include DB subnet(s) 1730 that can be communicatively coupled to the service gateway 1736 contained in the data plane VCN 1718.

The untrusted app subnet(s) 1762 can include primary VNICs 1764(1)-(N) that can be communicatively coupled to tenant virtual machines (VMs) 1766(1)-(N) residing within the untrusted app subnet(s) 1762. Each tenant VM 1766(1)-(N) can run code in a respective container 1767(1)-(N), and be communicatively coupled to an app subnet 1726 that can be contained in a data plane app tier 1746 that can be contained in a container egress VCN 1768. Respective secondary VNICs 1772(1)-(N) can facilitate communication between the untrusted app subnet(s) 1762 contained in the data plane VCN 1718 and the app subnet contained in the container egress VCN 1768. The container egress VCN can include a NAT gateway 1738 that can be communicatively coupled to public Internet 1754 (e.g., public Internet 1454 of FIG. 14).

The Internet gateway 1734 contained in the control plane VCN 1716 and contained in the data plane VCN 1718 can be communicatively coupled to a metadata management service 1752 (e.g., the metadata management system 1452 of FIG. 14) that can be communicatively coupled to public Internet 1754. Public Internet 1754 can be communicatively coupled to the NAT gateway 1738 contained in the control plane VCN 1716 and contained in the data plane VCN 1718. The service gateway 1736 contained in the control plane VCN 1716 and contained in the data plane VCN 1718 can be communicatively couple to cloud services 1756.

In some examples, the pattern illustrated by the architecture of block diagram 1700 of FIG. 17 may be considered an exception to the pattern illustrated by the architecture of block diagram 1600 of FIG. 16 and may be desirable for a customer of the IaaS provider if the IaaS provider cannot directly communicate with the customer (e.g., a disconnected region). The respective containers 1767(1)-(N) that are contained in the VMs 1766(1)-(N) for each customer can be accessed in real-time by the customer. The containers 1767(1)-(N) may be configured to make calls to respective secondary VNICs 1772(1)-(N) contained in app subnet(s) 1726 of the data plane app tier 1746 that can be contained in the container egress VCN 1768. The secondary VNICs 1772(1)-(N) can transmit the calls to the NAT gateway 1738 that may transmit the calls to public Internet 1754. In this example, the containers 1767(1)-(N) that can be accessed in real-time by the customer can be isolated from the control plane VCN 1716 and can be isolated from other entities contained in the data plane VCN 1718. The containers 1767(1)-(N) may also be isolated from resources from other customers.

In other examples, the customer can use the containers 1767(1)-(N) to call cloud services 1756. In this example, the customer may run code in the containers 1767(1)-(N) that requests a service from cloud services 1756. The containers 1767(1)-(N) can transmit this request to the secondary VNICs 1772(1)-(N) that can transmit the request to the NAT gateway that can transmit the request to public Internet 1754. Public Internet 1754 can transmit the request to LB subnet(s) 1722 contained in the control plane VCN 1716 via the Internet gateway 1734. In response to determining the request is valid, the LB subnet(s) can transmit the request to app subnet(s) 1726 that can transmit the request to cloud services 1756 via the service gateway 1736.

It should be appreciated that IaaS architectures 1400, 1500, 1600, 1700 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 18 illustrates an example computer system 1800, in which various embodiments may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1804 provide the functionality described above. Storage subsystem 1818 may also provide a repository for storing data used in accordance with the present disclosure.

As depicted in the example in FIG. 18, storage subsystem 1818 can include various components including a system memory 1810, computer-readable storage media 1822, and a computer readable storage media reader 1820. System memory 1810 may store program instructions that are loadable and executable by processing unit 1804. System memory 1810 may also store data that is used during the execution of the instructions and/or data that is generated during the execution of the program instructions. Various different kinds of programs may be loaded into system memory 1810 including but not limited to client applications, Web browsers, mid-tier applications, relational database management systems (RDBMS), virtual machines, containers, etc.

System memory 1810 may also store an operating system 1816. Examples of operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1800 executes one or more virtual machines, the virtual machines along with their guest operating systems (GOSs) may be loaded into system memory 1810 and executed by one or more processors or cores of processing unit 1804.

System memory 1810 can come in different configurations depending upon the type of computer system 1800. For example, system memory 1810 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1810 may include a basic input/output system (BIOS) containing basic routines that help to transfer information between elements within computer system 1800, such as during start-up.

Computer-readable storage media 1822 may represent remote, local, fixed, and/or removable storage devices plus storage media for temporarily and/or more permanently containing, storing, computer-readable information for use by computer system 1800 including instructions executable by processing unit 1804 of computer system 1800.

Computer-readable storage media 1822 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Machine-readable instructions executable by one or more processors or cores of processing unit 1804 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

prior to communication of a first packet from a source compute node, receiving, by a network performance analysis system and via a user interface, path information specifying a first path from the source compute node to a destination compute node to cause the first packet to traverse the first path for calculating a performance metric for a first segment of a first plurality of segments in the first path, the path information including a specification of a plurality of nodes, including a set of one or more router nodes, defining the first plurality of segments in the first path, each segment of the first plurality of segments being bounded by a start node and an end node, wherein the start node and the end node for the segment are nodes from the plurality of nodes and at least one of the start node or the end node is a router node, the first segment bounded by a node from the plurality of nodes that is a first router node;

generating, by the network performance analysis system, based upon the path information, a first packet header for the first packet, wherein the first packet header comprises an address of each node in the plurality of nodes in the first path, the first packet header comprising a plurality of header sections including a header section for each segment of the first plurality of segments in the first path, each header section in the plurality of header sections storing information identifying a communication protocol to be used for routing the first packet for the corresponding segment from the corresponding start node of the segment to the corresponding end node of the segment, the plurality of header sections comprising a first header section corresponding to the first segment, the first header section storing first information identifying a first communication protocol to be used for routing the first packet for the first segment from the start node of the first segment to the end node of the first segment, and wherein the first packet is communicated, after the receiving the path information by the network performance analysis system, from the source compute node to the destination compute node along the first path including each segment in the first plurality of segments based on a path as fixed by the first packet header generated based on the path information;

measuring, by the network performance analysis system, a first time for the first packet at the source compute node, the first time indicative of a time when the first packet is communicated from the source compute node;

measuring, by the network performance analysis system, a second time for the first packet at the destination compute node, the second time indicative of a time when the first packet is received at the destination compute node after traversing the first path starting at the source compute node and traversing the first plurality of segments as per the first packet header; and calculating, by the network performance analysis system, the performance metric for the first segment using the first time and the second time.

2. The method of claim 1 wherein a compute node in a data center is both the source compute node and the destination compute node.

3. The method of claim 1 wherein:
the first segment is between a first start node and a first end node;
the first router node from the set of one or more router nodes is the first end node for the first segment; and
the first header section includes information identifying a first tunnel and information identifying the first router node as an endpoint for the first tunnel.

4. The method of claim 3 wherein:
the information identifying the first tunnel identifies a first tunneling protocol; and
the information identifying the first router node as the endpoint for the first tunnel comprises a first address associated with the first router node.

5. The method of claim 4 wherein:
the first tunneling protocol is Generic Routing Encapsulation (GRE); and
the first address associated with the first router node is an Internet Protocol (IP) address associated with the first router node.

6. The method of claim 3 wherein the source compute node is the first start node of the first segment.

7. The method of claim 3 wherein another router node from the set of one or more router nodes is the first start node of the first segment.

8. The method of claim 3, wherein:
the first start node of the first segment is the source compute node or another router node from the set of one or more router nodes; and
the method further comprises:
determining, by the first start node of the first segment and from the first packet header, the information identifying the first tunnel and the information identifying the first router node as the endpoint for the first tunnel;
encapsulating, by the first start node, the first packet to generate a first encapsulated packet; and
communicating the first encapsulated packet from the first start node to the first end node via the first tunnel.

9. The method of claim 1 wherein:
the first segment is between a first start node and an first end node;
the first router node from the set of one or more router nodes is the first end node for the first segment; and
the first header section includes information identifying a first label.

10. The method of claim 9 wherein the first start node of the first segment is the source compute node or another router node from the set of one or more router nodes.

11. The method of claim 9, wherein:
the first start node of the first segment is the source compute node or another router node from the set of one or more router nodes; and
the method further comprises:
determining, by the first start node of the first segment and from the first packet header, the first label;
accessing, by the first start node, label-to-port mapping information configured for the first start node, the label-to-port mapping information mapping the first label to a first egress port of the first start node; and communicating the first packet from the first start node using the first egress port.

12. The method of claim 1 wherein:

the destination compute node is same as the source compute node;

the first plurality of segments includes a second segment;

the first segment is between the source compute node and the first router node;

the second segment is between the first router node and the source compute node; and the method further comprises:

calculating, by the network performance analysis system, the performance metric for the first segment using the first time and the second time comprises:

computing a latency metric for the first segment using the first time and the second time.

13. The method of claim 1, further comprising configuring a router node from the set of one or more router nodes as a tunnel termination endpoint.

14. The method of claim 1, further comprising, for a router node from the set of one or more router nodes, creating a mapping between a label and an interface of the router node.

15. The method of claim 1, further comprising configuring, by the network performance analysis system, the first packet header for the first packet, wherein due to the configuring, the first packet header comprises the plurality of header sections including a header section for each segment in the first path, the plurality of header sections comprising the first header section corresponding to the first segment, the first header section storing information indicative of a manner for routing the first packet for the first segment.

16. The method of claim 1, wherein:

the first plurality of segments includes a second segment;

the plurality of header sections further comprises a second header section, corresponding to the second segment, the second header section storing information indicative of a manner for routing the first packet for the second segment, the stored information identifying a second communication protocol; and the first communication protocol is different from the second communication protocol.

17. The method of claim 1, further comprising executing, by the network performance analysis system, a command to cause a corrective action in response to the performance metric indicating a performance degradation along the first path.

18. The method of claim 1, wherein each router node of the set of one or more router nodes is unable to be configured as a source compute node or a destination compute node.

19. A non-transitory computer-readable medium storing computer-executable instructions that, when executed by one or more computer devices, cause the computing devices to perform processing comprising:

prior to communication of a first packet from a source compute node, receiving, by a network performance analysis system and via a user interface, path information specifying a first path from the source compute node to a destination compute node to cause the first packet to traverse the first path for calculating a performance metric for a first segment of a first plurality of segments in the first path, the path information including a specification of a plurality of nodes, including a set of one or more router nodes, defining the first plurality of segments in the first path, each segment of the first plurality of segments being bounded by a start node and an end node, wherein the start node and the end node for the segment are nodes from the plurality of nodes and at least one of the start node or the end node is a router node, the first segment bounded by a node from the plurality of nodes that is a first router node;

generating, by the network performance analysis system, based upon the path information, a first packet header for the first packet, wherein the first packet header comprises an address of each node in the plurality of nodes in the first path, the first packet header comprising a plurality of header sections including a header section for each segment of the first plurality of segments in the first path, each header section in the plurality of header sections storing information identifying a communication protocol to be used for routing the first packet for the corresponding segment from the corresponding start node of the segment to the corresponding end node of the segment, the plurality of header sections comprising a first header section corresponding to the first segment, the first header section storing first information indicative of a manner for routing the first packet for the first segment, the stored information identifying a first communication protocol to be used for routing the first packet for the first segment from the start node of the first segment to the end node of the first segment, and wherein the first packet is communicated, after the receiving the path information by the network performance analysis system, from the source compute node to the destination compute node along the first path including each segment in the first plurality of segments based on a path as fixed by the first packet header generated based on the path information;

measuring, by the network performance analysis system, a first time for the first packet at the source compute node, the first time indicative of a time when the first packet is communicated from the source compute node;

measuring, by the network performance analysis system, a second time for the first packet at the destination compute node, the second time indicative of a time when the first packet is received at the destination compute node after traversing the first path starting at the source compute node and traversing the first plurality of segments as per the first packet header; and calculating, by the network performance analysis system, the performance metric for the first segment using the first time and the second time.

20. A network performance analysis system comprising:

one or more computer systems, wherein the one or more computer systems are configured to perform processing comprising:

prior to communication of a first packet from a source compute node, receiving, by the network performance analysis system and via a user interface, path information specifying a first path from the source compute node to a destination compute node to cause the first packet to traverse the first path for calculating a performance metric for a first segment of a first plurality of segments in the first path, the path information including a specification of a plurality of nodes, including a set of one or more router nodes, defining the first plurality of segments in the first path, each segment of the first plurality of segments being bounded by a start node and an end node, wherein the start node and the end node for the segment are nodes from the plurality of nodes and at least one of the start node or the end node is a router node, the first segment bounded by a node from the plurality of nodes that is a first router node;

generating, by the network performance analysis system, based upon the path information, a first packet header for the first packet, wherein the first packet header comprises an address of each node in the plurality of nodes in the first path, the first packet header comprising a plurality of header sections including a header section for each segment of the first plurality of segments in the first path, each header section in the plurality of header sections storing information identifying a communication protocol to be used for routing the first packet for the corresponding segment from the corresponding start node of the segment to the corresponding end node of the segment, the plurality of header sections comprising a first header section corresponding to the first segment, the first header section storing first information identifying a first communication protocol to be used for routing the first packet for the first segment from the start node of the first segment to the end node of the first segment, and wherein the first packet is communicated, after the receiving the path information by the network performance analysis system, from the source compute node to the destination compute node along the first path including each segment in the first plurality of segments based on a path as fixed by the first packet header generated based on the path information;

measuring, by the network performance analysis system, a first time for the first packet at the source compute node, the first time indicative of a time when the first packet is communicated from the source compute node;

measuring, by the network performance analysis system, a second time for the first packet at the destination compute node, the second time indicative of a time when the first packet is received at the destination compute node after traversing the first path starting at the source compute node and traversing the first plurality of segments as per the first packet header; and calculating, by the network performance analysis system, the performance metric for the first segment using the first time and the second time.

* * * * *